United States Patent
Yang

(10) Patent No.: US 6,531,247 B1
(45) Date of Patent: Mar. 11, 2003

(54) ELECTRICITY STORAGE/DISCHARGE DEVICE WITH LOW INTERNAL RESISTANCE CURRENT COLLECTOR STRUCTURE

(76) Inventor: Tai-Her Yang, No. 32 Lane 29, Taipin St., Si-Hu Town, Dzan-Hwa (TW)

( * ) Notice: Subject to any disclaimer, the term of this patent is extended or adjusted under 35 U.S.C. 154(b) by 42 days.

(21) Appl. No.: 09/671,797

(22) Filed: Sep. 28, 2000

Related U.S. Application Data

(63) Continuation of application No. 09/010,493, filed on Jan. 21, 1998, now Pat. No. 6,159,633.

(51) Int. Cl.$^7$ ................................................ H01M 2/26
(52) U.S. Cl. ...................... 429/211; 429/152; 429/160; 429/161
(58) Field of Search .................................. 429/120, 161, 429/209, 211, 152, 160, 158

(56) References Cited

U.S. PATENT DOCUMENTS

| | | |
|---|---|---|
| 2,527,888 A | 10/1950 | Milnes |
| 3,597,277 A | 8/1971 | Dickfeldt et al. |
| 4,646,430 A | 3/1987 | Clarke |
| 5,667,915 A | 9/1997 | Loustau et al. |
| RE36,102 E | * 2/1999 | Dougherty .............. 429/161 X |

* cited by examiner

Primary Examiner—John S. Maples
(74) Attorney, Agent, or Firm—Bacon & Thomas

(57) ABSTRACT

An electricity storage/discharge device includes a plurality of electrode plates separated by isolator members. Each of the electrode plates includes at least two outwardly extending current collecting terminals, at least one conductor through-hole, and at least one isolating opening. The electrode plates can be circular, partially circular, or polygonal, and are electrically connected in series or parallel combinations to plates of opposite or same polarity by a plurality of conductor rods arranged to pass through and be electrically connected to selected ones of said through-holes to form multiple input/output circuits. Isolating openings in the form of notches or additional through-holes having a size larger than the size of the conductor rods are provided to permit passage of the conductor rods through plates to which the rods are not electrically connected. Electrical connection of the conductor rods to the electrode plates via the through-holes can be achieved by welding or press-fitting of the rods, and insulator members can further be provided between the rods and the isolating openings.

11 Claims, 90 Drawing Sheets

ELECTRICITY STORAGE/DISCHARGE DEVICE WITH LOW INTERNAL RESISTANCE CURRENT COLLECTOR STRUCTURE

This application is a continuation of U.S. patent application Ser. No. 09/010,493, filed Jan. 21, 1998, now issued as U.S. Pat. No. 6,159,533 dated Dec. 12, 2000.

BACKGROUND OF THE INVENTION

Conventional electricity storage and discharge devices such as the primary or secondary side batteries or capacitors are usually provided with a current collecting terminal on a single side of each electrode plate for collecting the output or input current or for using as a joint node of a series or parallel combination with other electrodes. Because the electrode plate has only a single side input or output current, in case of a larger current input and output transfer, the region close to the current collecting terminal and the region farther away from the current collecting terminal have non-uniformed current densities, thus deteriorating the performance of the electricity storage and discharge device. In addition, for parallel combinations of electrode plates having the same polarities, or series combinations of electrode plates having different polarities, the current collecting terminals of the individual electrode plates are mutually connected or connected with the electricity conducting terminals by welding or pressure joining methods, resulting in a higher internal resistance.

SUMMARY OF THE INVENTION

An electricity storage/discharge device with a low internal resistance current collector structure includes an electrode plate having at least two current collecting terminals arranged to form at least two input or output current circuits to reduce the internal resistance of the electricity storage/discharge device. The two or more current collecting terminals of the electrode plates include externally extending current terminals, sides of the electrode plate, or solid or hollow tube-shaped conductor rods made from a conducting material and having circular, square or other geometric shapes to penetrate the conductor through-holes provided in the electrode plates. By using the at least two current collecting terminals, electrode plates of the same polarity may be parallel connected, and electrode plates of different polarities may be series connected, or the electrode plates may be connected in a mixture of series and parallel combinations.

The structural characteristics of this design include all or part of the following features:

1. The positive and negative electrode plates may be circular, partially circular, elliptical, or in the form of polygons having three sides or more than three sides (including triangles, quadrilaterals, pentagons, hexagons, heptagons, octagons or polygons with more than eight sides). Each of these low internal resistance current collector embodiments include the following: (1) the two or more sides of the electrode plates may be respectively installed with one or more outwardly extending current collecting terminals; and (2) one or more conductor through-holes are individually provided in selected areas of two or more sides, or near to the central region of the positive or negative electrode plates, so that selected areas of the two or more sides or central region of the aforesaid positive or negative electrode plates are respectively provided with one or more isolating spaces, notches or through-holes having a size larger than the conductor rods designed to allow for the penetration of the conductor rods without contact after the electrode plates are cross laminated, and thereby allow the electrode plates to have two or more input or output current circuits in order to lower the internal resistance of the electricity storage device.
2. Should conductor rods be used as the current collecting terminals, the conductor through-hole and the conductor rod can be joined by pressure or welding, by a press fit resulting from forced elastic deformation of an inserted tube shape conductor rod against the conductor through-hole in different geometric shapes, or by a press fit resulting from forced elastic deformation of a non-closed hollow tube structure with an axial opening clearance against the conductor through-holes.
3. Should conductor rods be used as the current collecting terminals, the positive or negative electrode plates may alternatively be provided with isolating spaces, notches or through-holes having a size larger than the conductor rod to allow for penetration of the conductor rod without contact after electrode plates of different polarities are cross laminated.
4. Should conductor rods be used as the current collecting terminals, the respective electrode plates may also be joined by penetrating the conductor rod through the conductor through-holes of the electrode plates to be in parallel combinations or series combinations or mixture of series-and parallel combinations.
5. Should conductor rods be used as the current collecting terminals, both ends of the conductor rod can be installed with press lock screws and matched with press lock nuts or unidirectional pressing washers to lock the conductor rod in place and enhance the structural stability of the electrode plates.
6. Should the conductor rods be used as the current collecting terminals, the conductor rods may be constructed of tube-shaped material, and cooling air or fluid can be pumped through the tube structure to cool the electrode plate.
7. By respectively installing one or more outwardly extending current collector terminals on two or more sides of the individual electrode plates to provide multiple parallel combination circuits between electrode plates having the same polarities, or series combination circuits between electrode plates having different polarities, the same electrode plate in the electricity storage device may be provided with two or more current circuits for input and output, thereby reducing the internal resistance during the electricity storage device input and output process.

BRIEF DESCRIPTION OF THE DRAWINGS

FIG. 120 is a side view of the embodiment of FIG. 119.

FIG. 121 is an exploded isometric view of an embodiment of the invention in which two sides of the electrode plate are respectively installed with a current collecting terminal near to the middle.

FIG. 122 is a side view of the embodiment of FIG. 119.

FIG. 123 is an exploded isometric view of an embodiment of the invention in which two sides of the electrode plate are respectively installed with two current collecting terminals near to both ends of respective sides.

FIG. 124 is a side view of the embodiment of FIG. 123.

FIG. 125 is an exploded isometric view of an embodiment of the invention in which two sides of the electrode plate are respectively cross installed with two current collecting terminals.

FIG. 126 is a side view of the embodiment of FIG. 125.

FIG. 127 is an exploded isometric view of an embodiment of the invention in which four sides of the electrode plate are respectively installed with a current collecting terminal at the middle.

FIG. 128 is a side view of the embodiment of FIG. 127.

FIG. 129 is an isometric view of a non-closed elastic hollow tube conducting structure with an axial opening clearance.

FIG. 130 is an isometric view of an insulated ring shape structure.

DETAILED DESCRIPTION OF THE PREFERRED EMBODIMENTS

Figure 1:
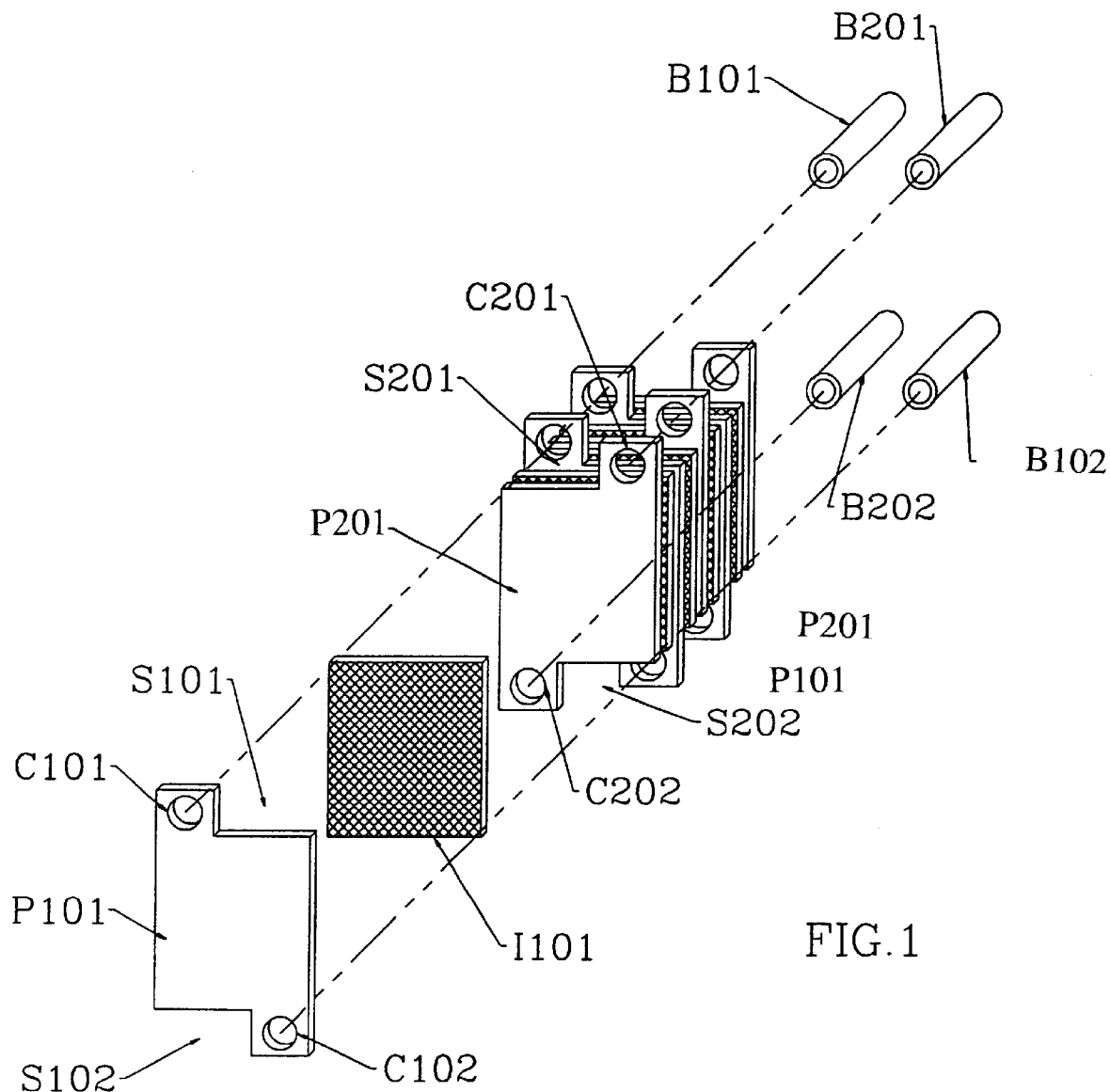
FIG. 1 is an exploded isometric view of an embodiment of the invention in which the electrode collecting plate is includes conductor through-holes and isolating spaces.
Figure 2:
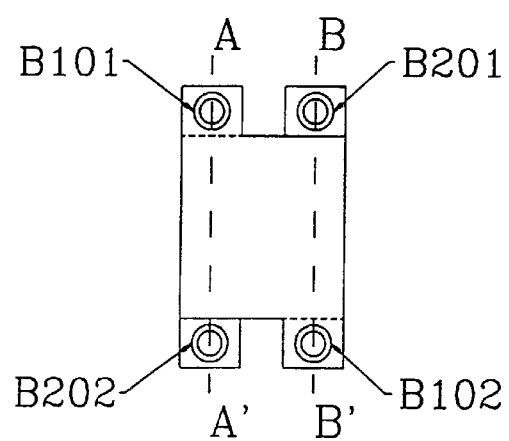
FIG. 2 is a front view of the embodiment of FIG. 1.
Figure 3:
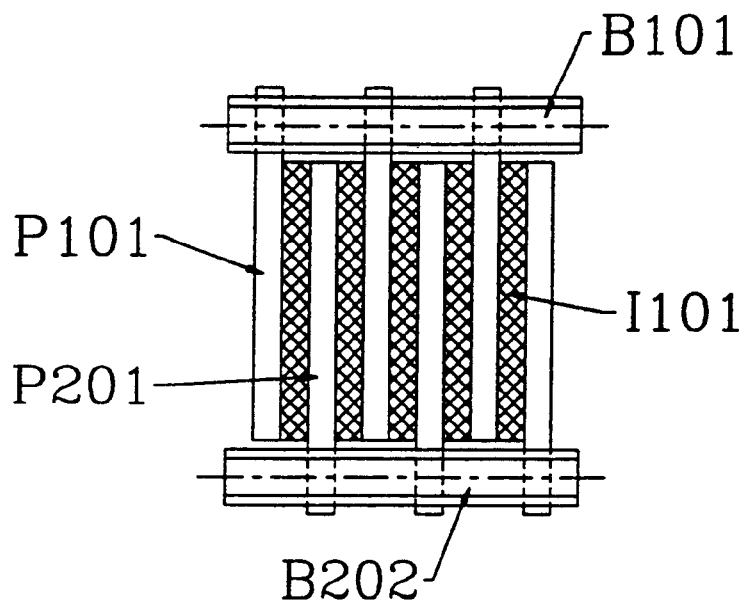
FIG. 3 is the A–A' sectional view of FIG. 2.
Figure 4:
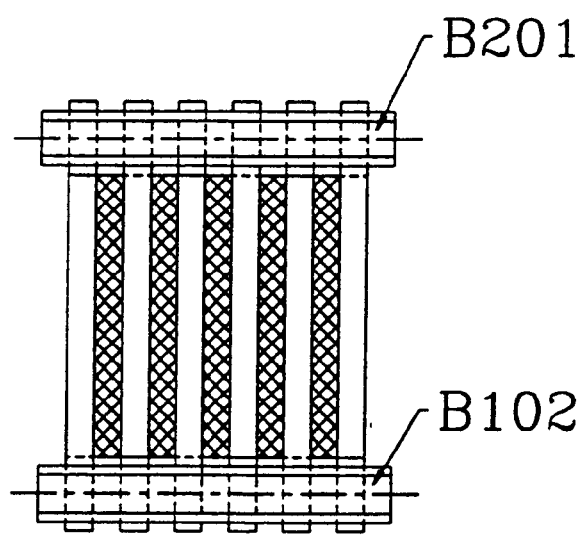
FIG. 4 is the B–B' sectional view of FIG. 2.
Figure 5:
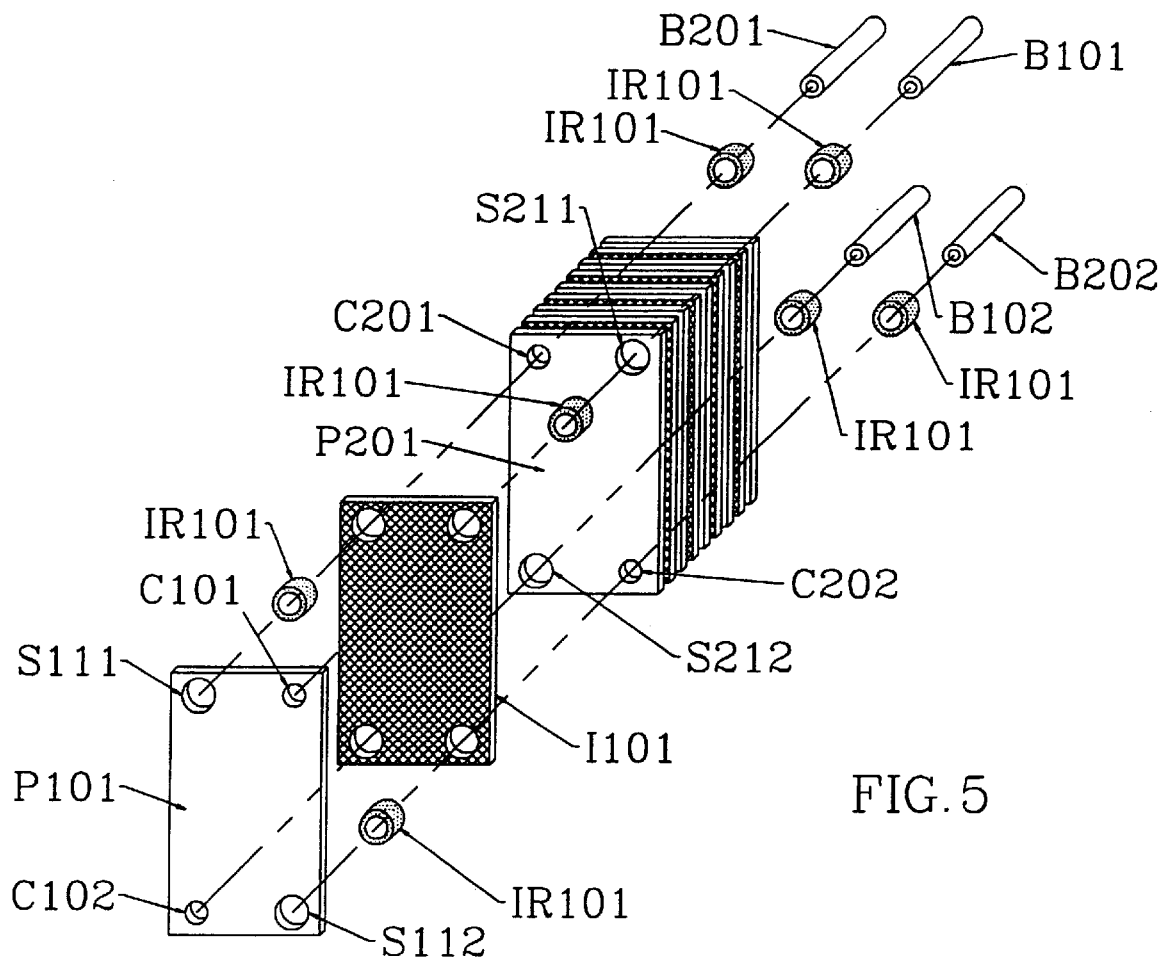
FIG. 5 is an exploded isometric view of an embodiment of the invention in which two sides of the electrode plate are respectively installed with a conductor through-hole and an isolating through-hole.
Figure 6:
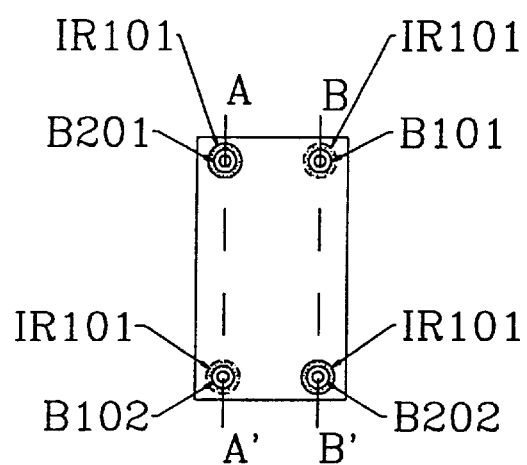
FIG. 6 is a front view of the embodiment of FIG. 5.
Figure 7:
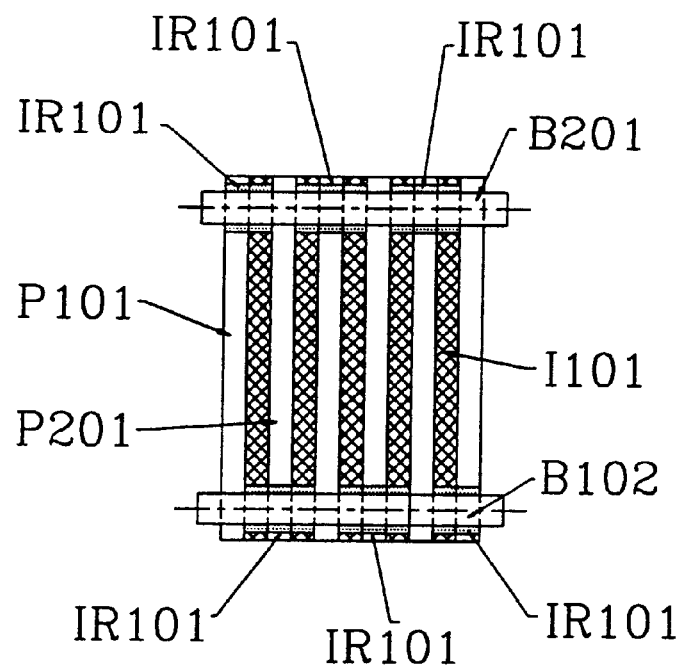
FIG. 7 is the A–A' sectional view of FIG. 6.
Figure 8:
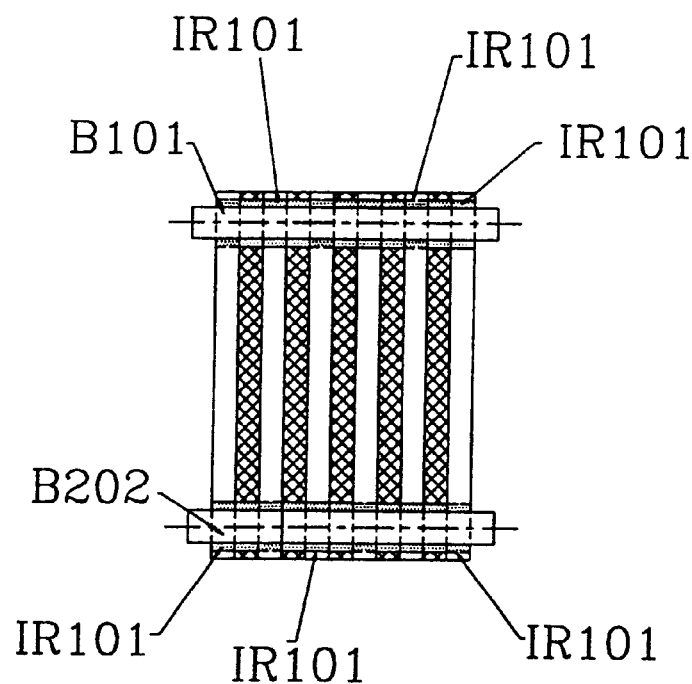
FIG. 8 is the B–B' sectional view of FIG. 6.
Figure 9:
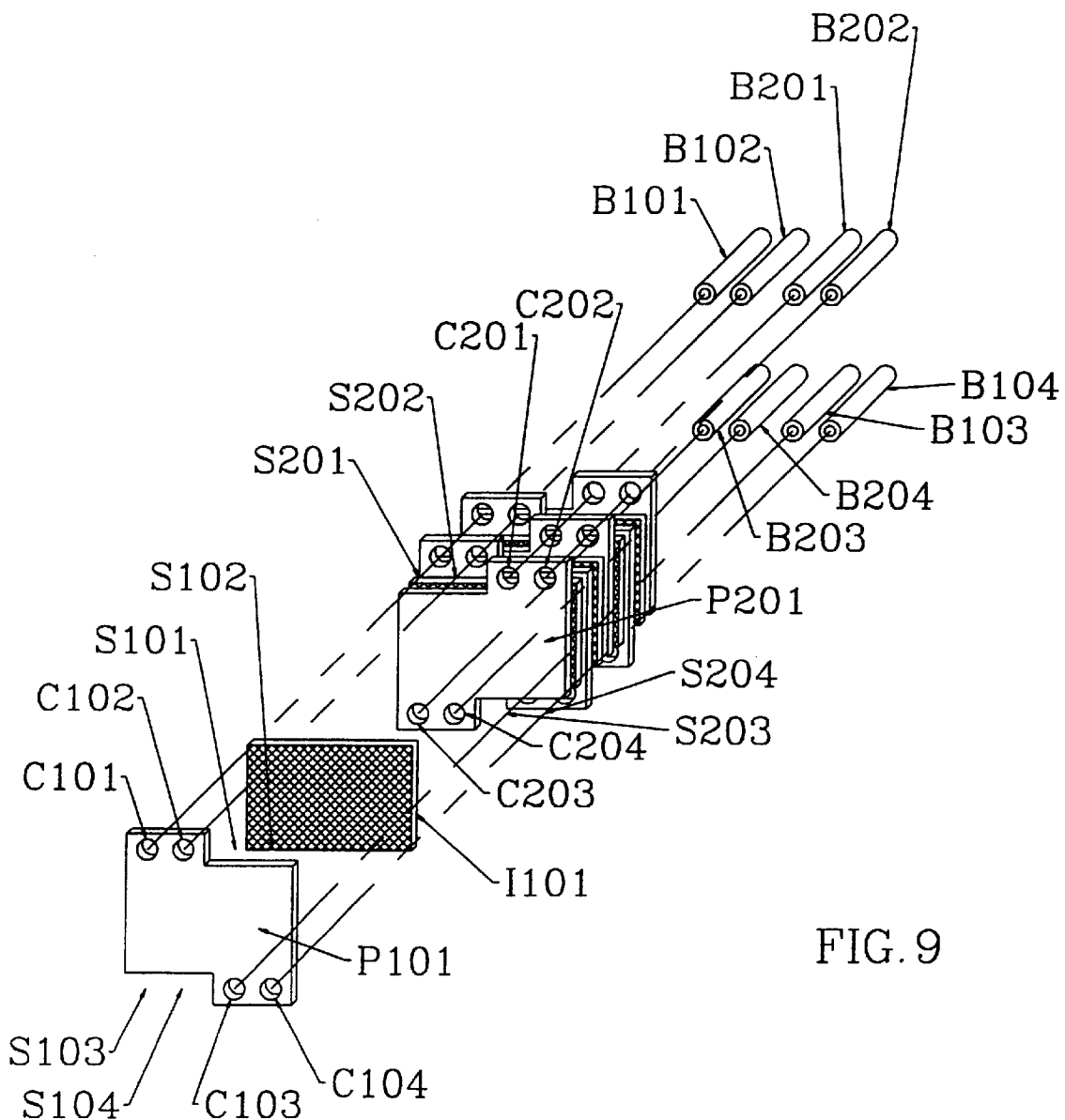
FIG. 9 is an exploded isometric view of an embodiment of the invention in which two sides of the electrode plate are respectively provided with two in-line conductor through-holes an d an isolating space.
Figure 10:
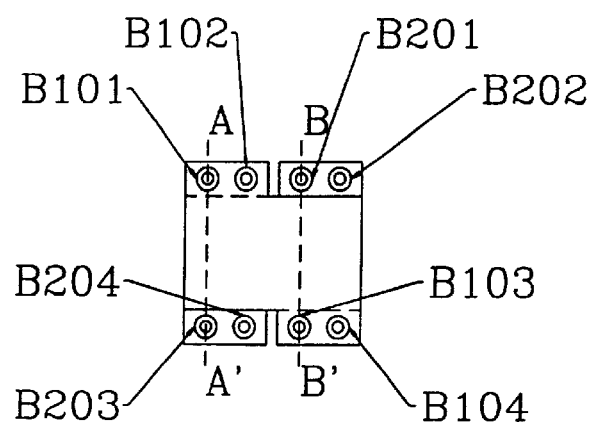
FIG. 10 is a front view of the embodiment of FIG. 9.
Figure 11:
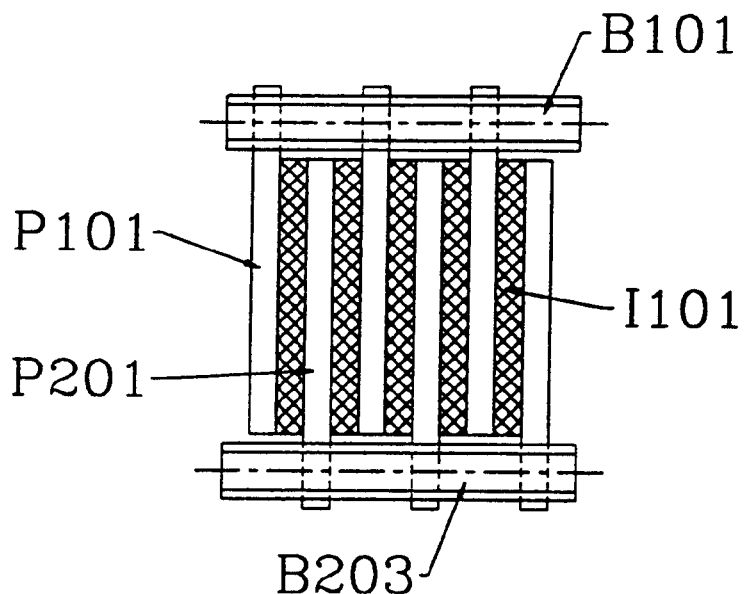
FIG. 11 is the A–A' sectional view of FIG. 10.
Figure 12:
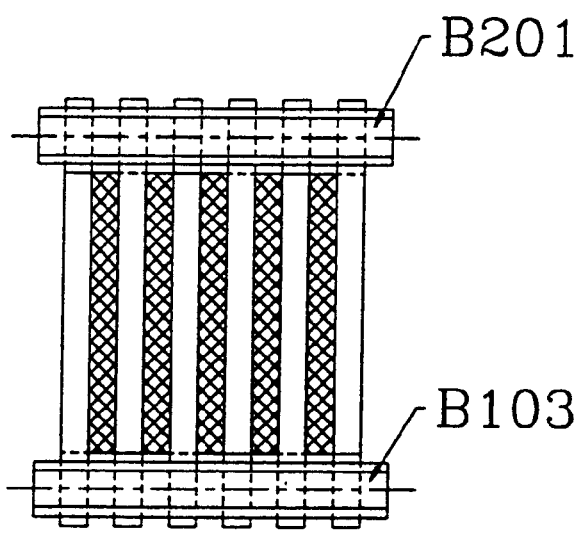
FIG. 12 is the B–B' sectional view of FIG. 10.
Figure 13:
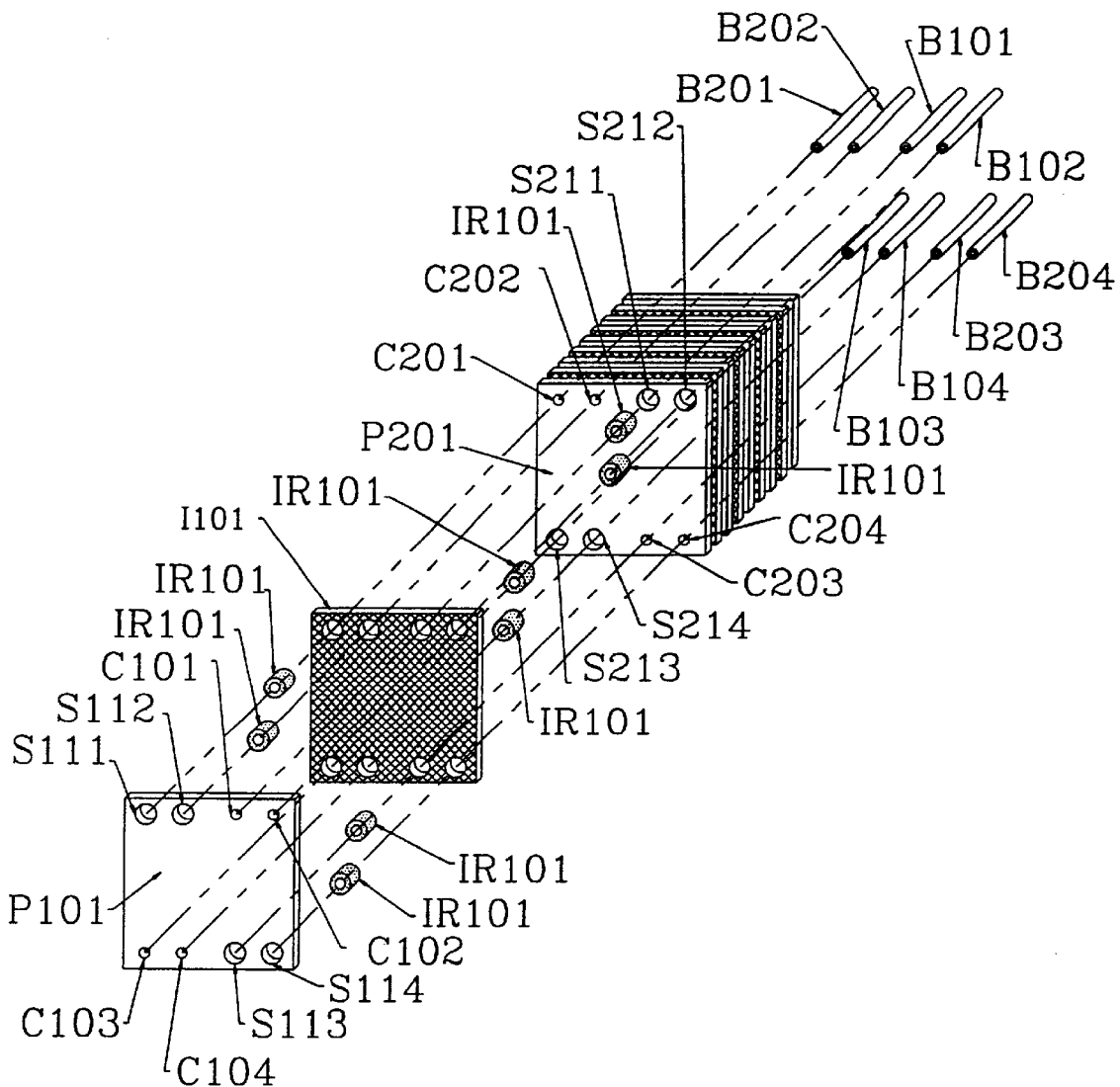
FIG. 13 is an exploded isometric view of an embodiment of the invention in which two sides of the electrode plate are respectively installed with two in-line conductor through-holes and two isolating through-holes.
Figure 14:
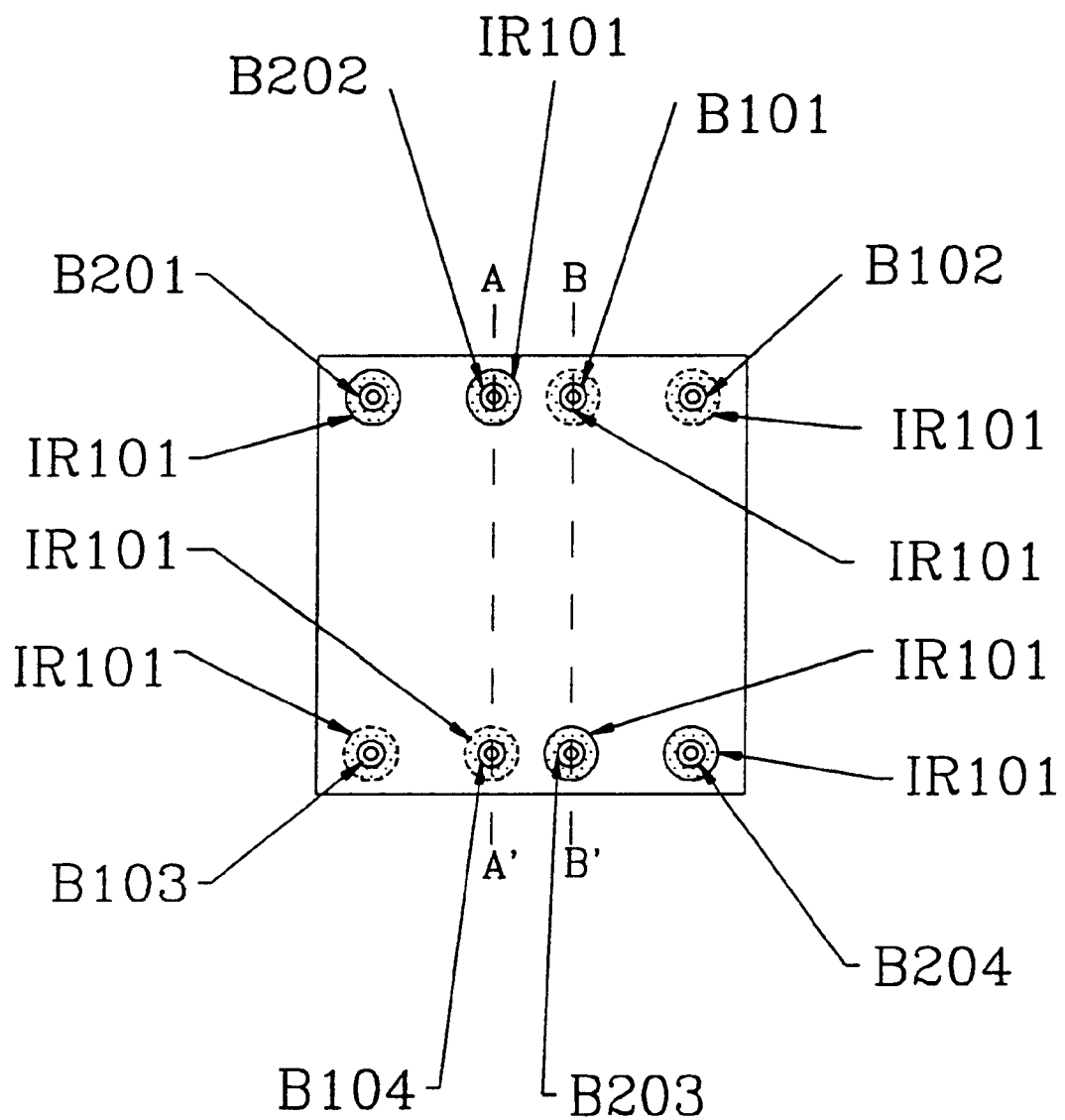
FIG. 14 is a front view of the embodiment of FIG. 13.
Figure 15:
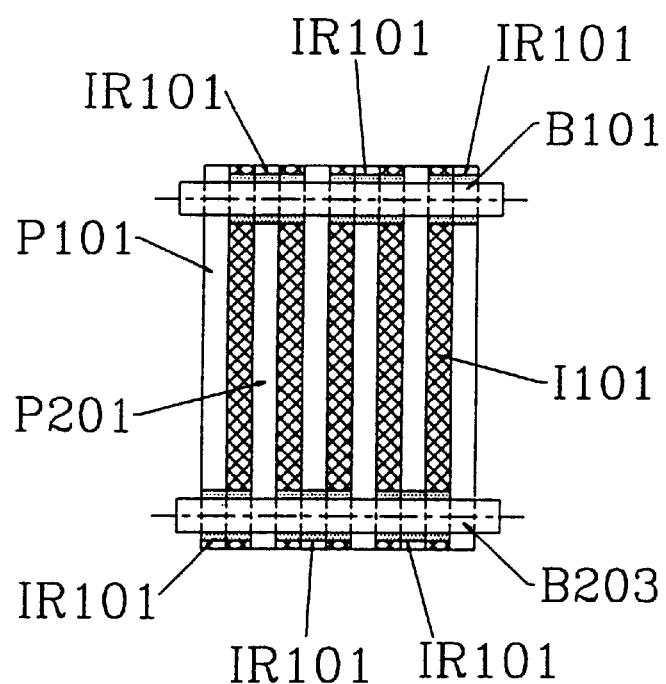
FIG. 15 is the A–A' sectional view of FIG. 14.
Figure 16:
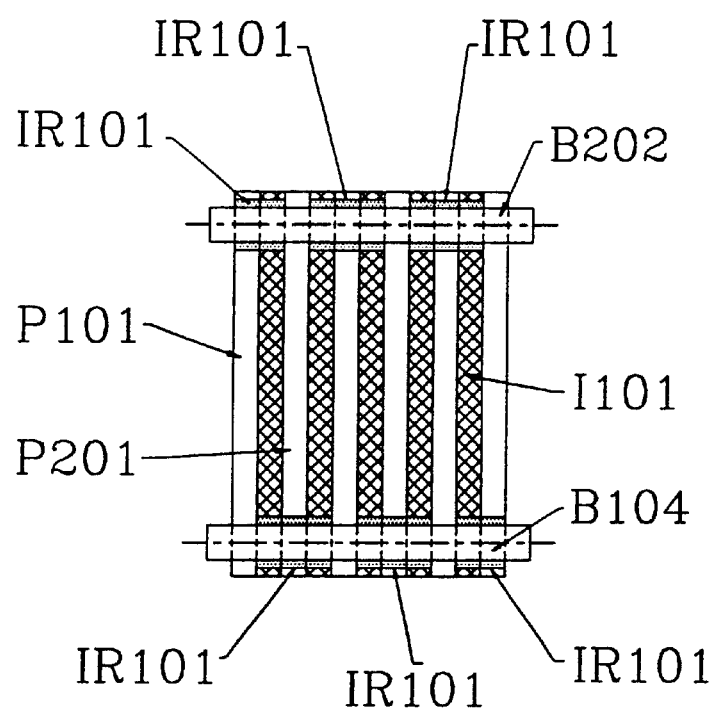
FIG. 16 is the B–B' sectional view of FIG. 14.
Figure 17:
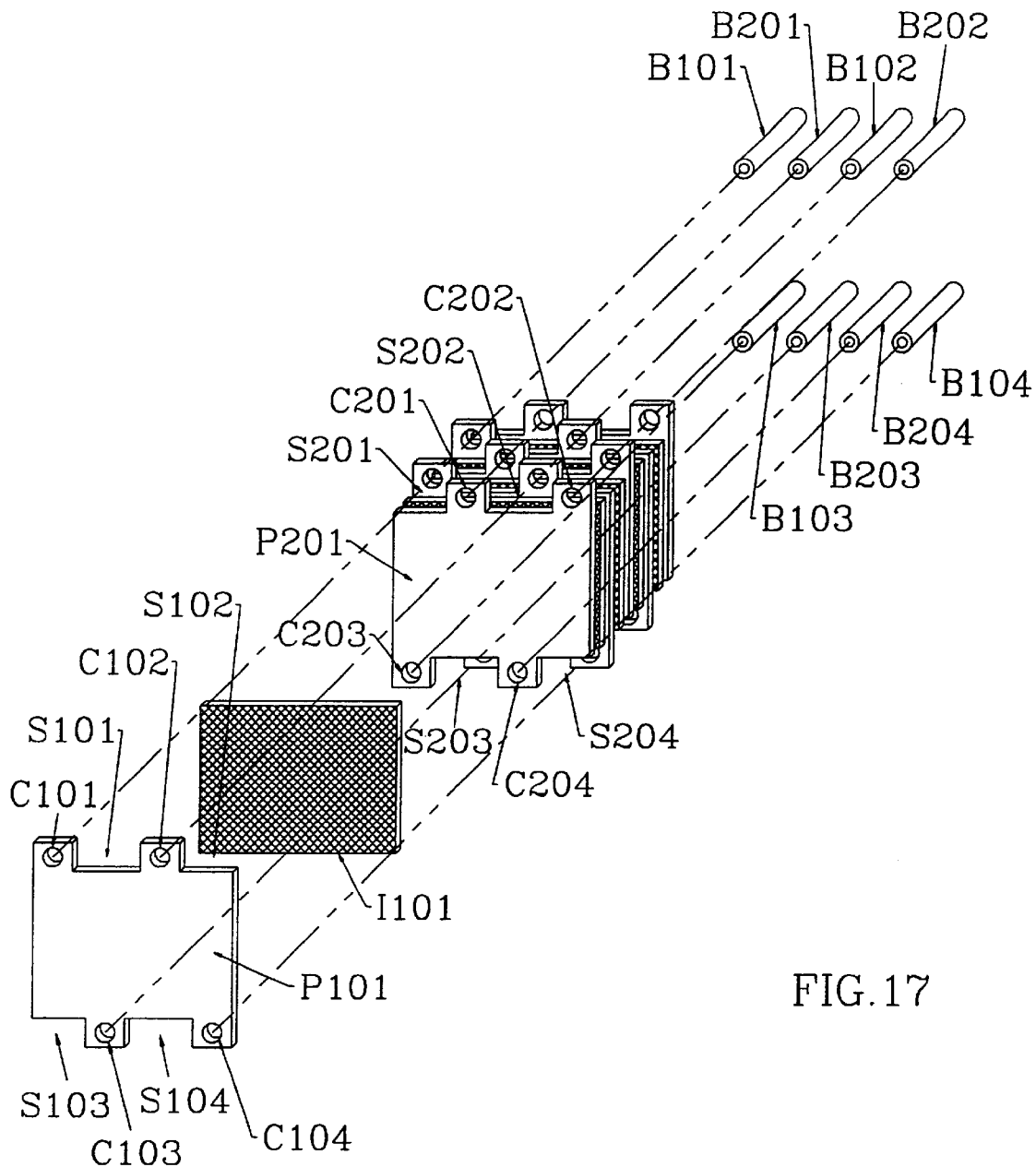
FIG. 17 is an exploded three-dimensional view of an embodiment of the invention in which two sides of the electrode plate are respectively cross installed with two conducting through-holes and two isolating notches and spaces.
Figure 18:
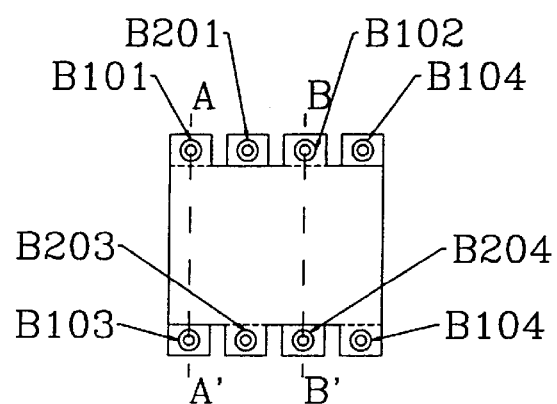
FIG. 18 is a front view of the embodiment of FIG. 17.
Figure 19:
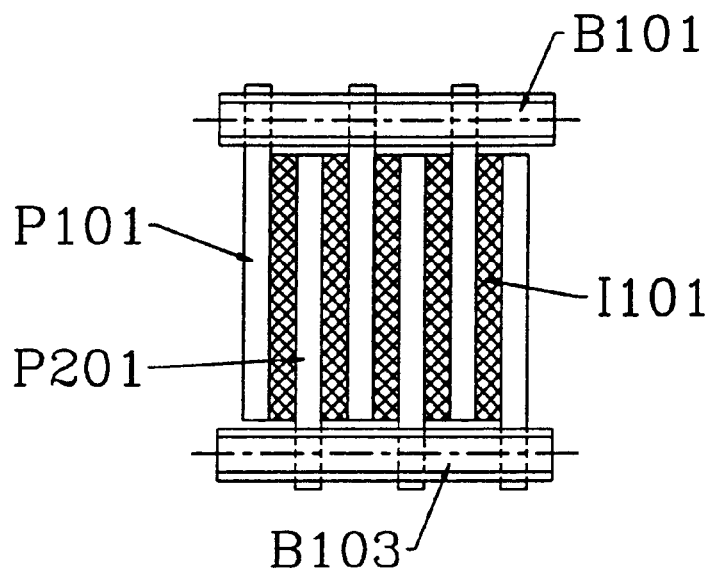
FIG. 19 is the A–A' sectional view of FIG. 18.
Figure 20:
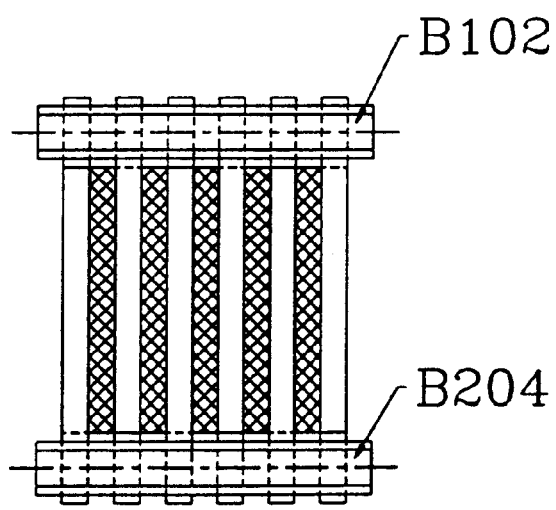
FIG. 20 is the B–B' sectional view of FIG. 19.
Figure 21:
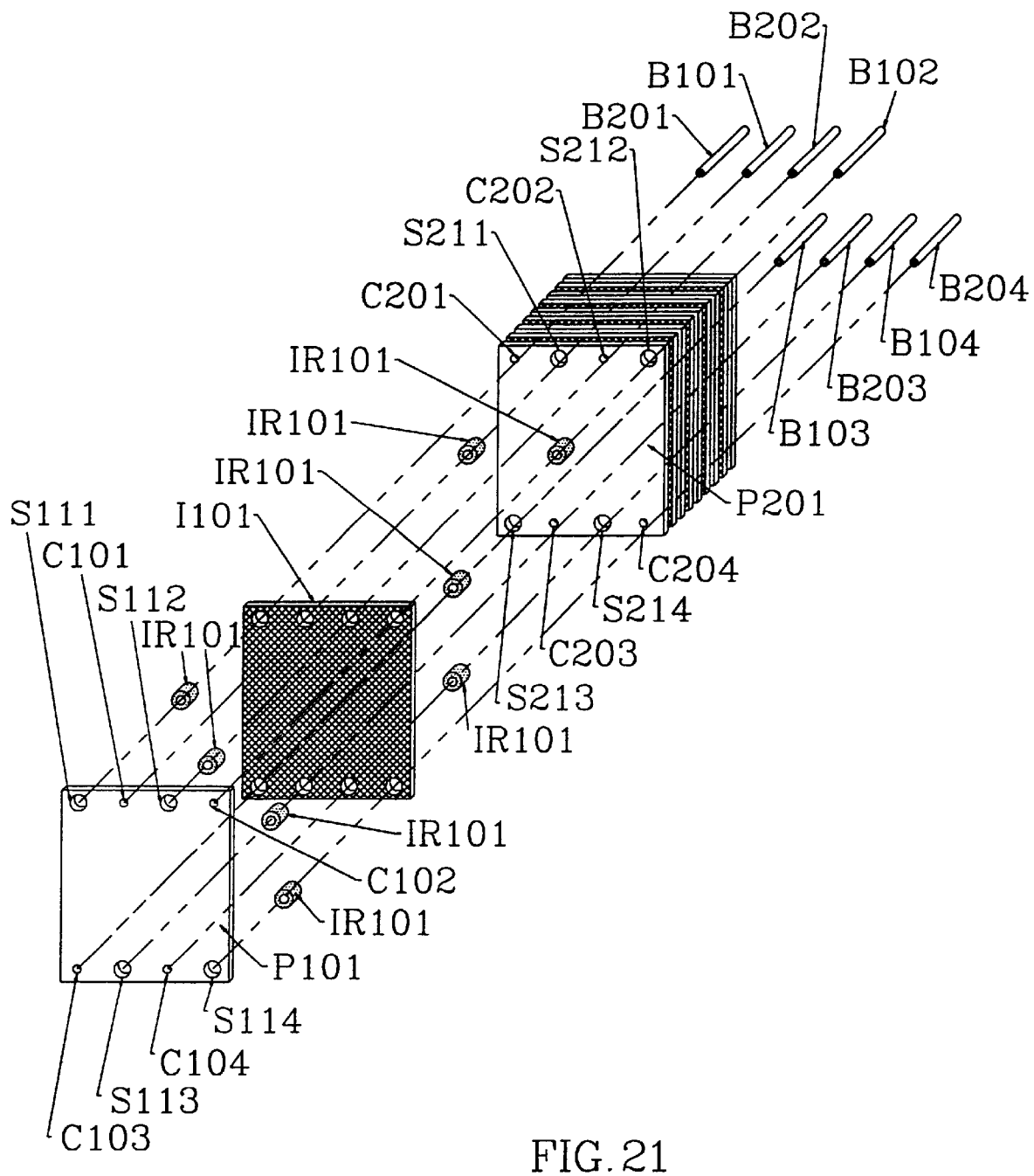
FIG. 21 is an exploded isometric view of an embodiment of the invention in which two sides of the electrode plate are respectively cross installed with two conductor through-holes and two isolating through-holes.
Figure 22:
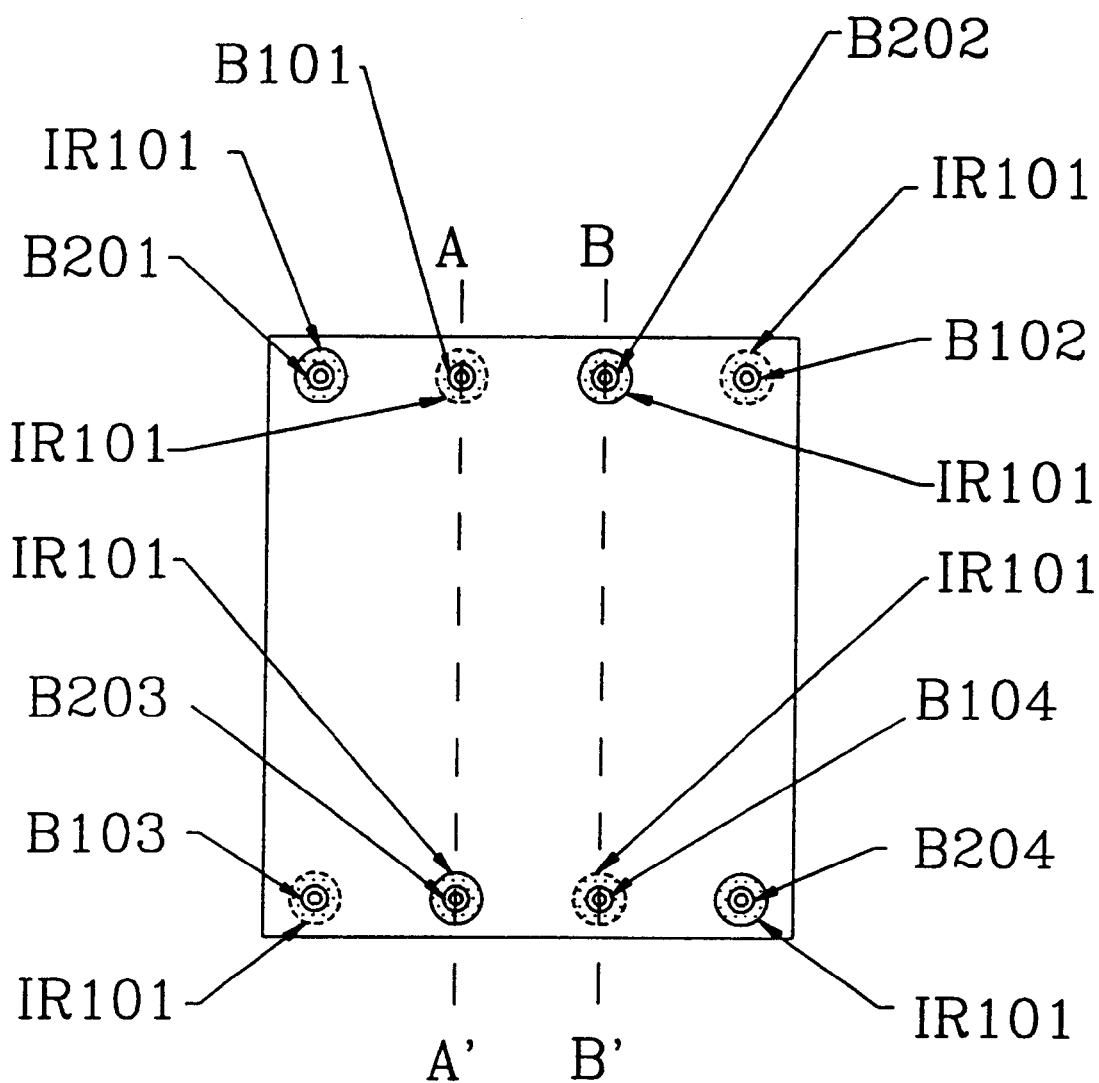
FIG. 22 is a front view of the embodiment of FIG. 21.
Figure 23:
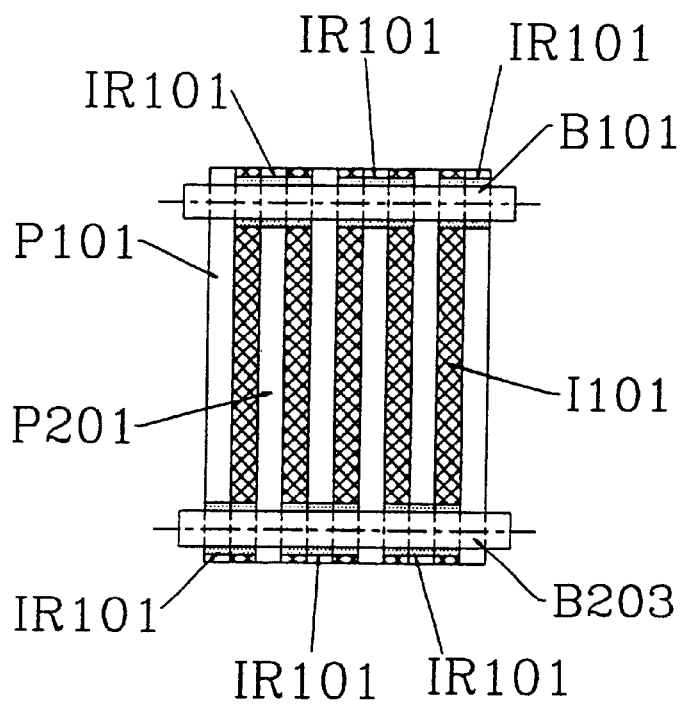
FIG. 23 is the A–A' sectional view of FIG. 22.
Figure 24:
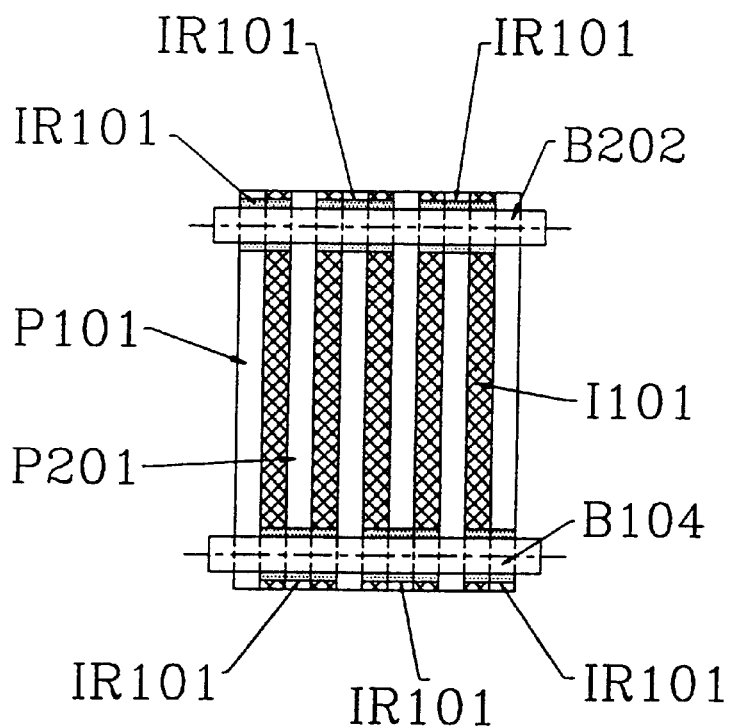
FIG. 24 is the B–B' sectional view of FIG. 22.
Figure 25:
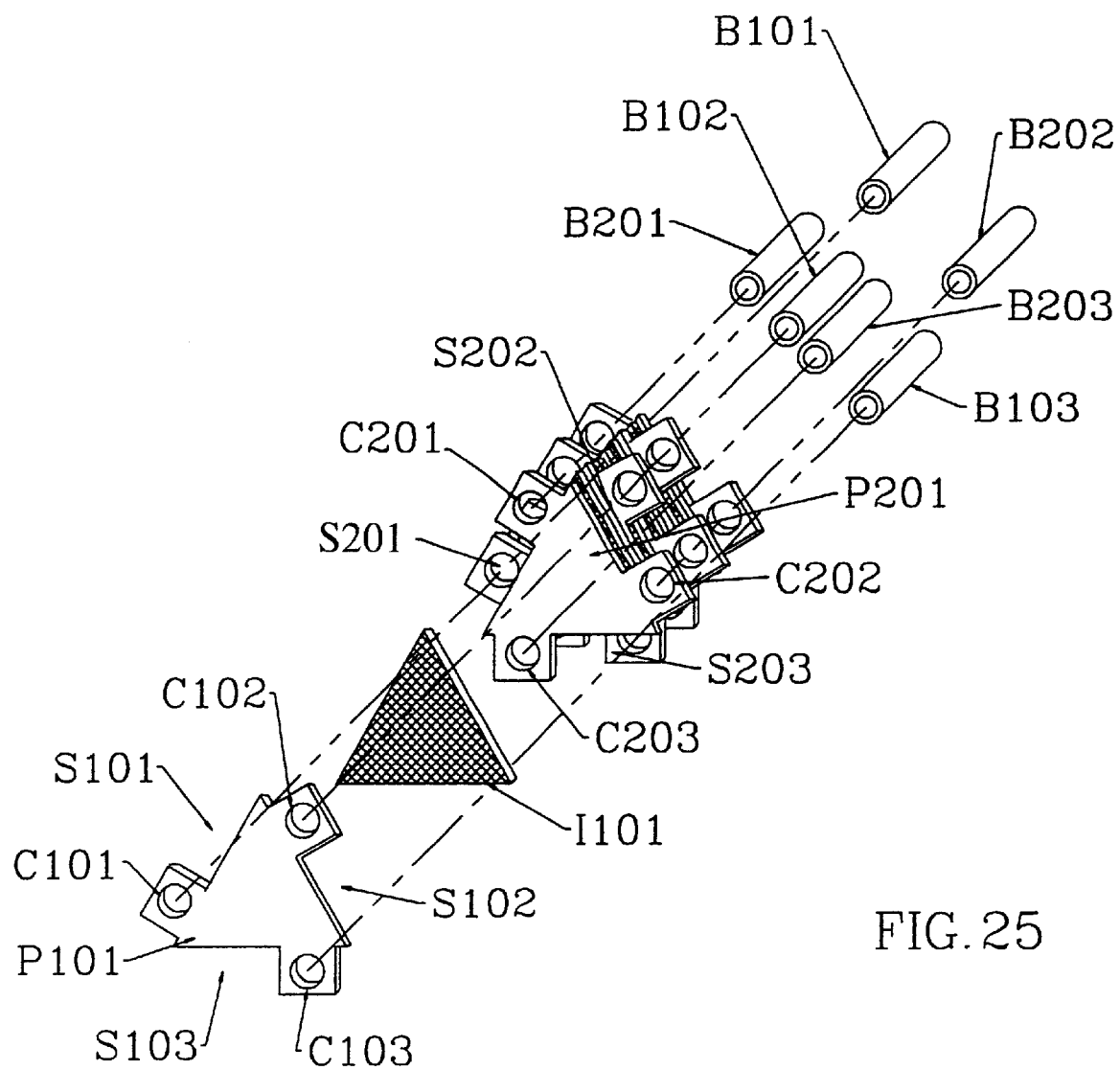
FIG. 25 is an exploded isometric view of an embodiment of the invention in which three sides of a triangular electrode plate are respectively installed with conductor through-holes and isolating space.
Figure 26:
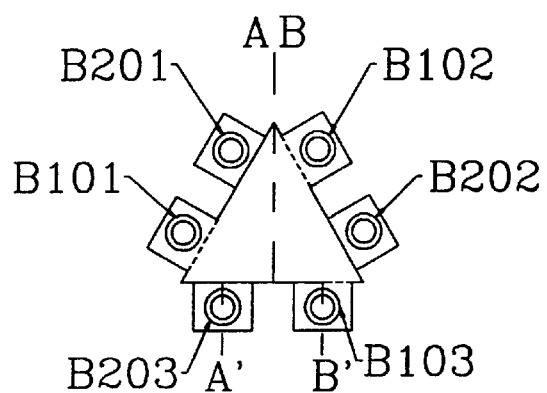
FIG. 26 is a front view of the embodiment of FIG. 25.
Figure 27:
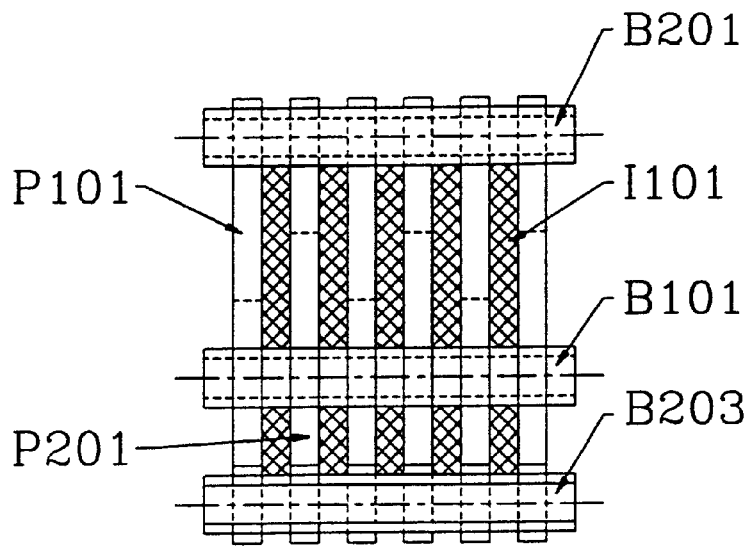
FIG. 27 is the A–A' sectional view of FIG. 26.
Figure 28:
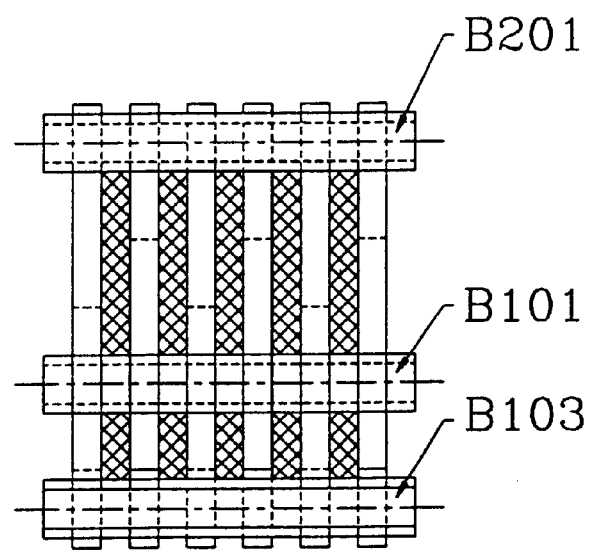
FIG. 28 is the B–B' sectional view of FIG. 26.
Figure 29:
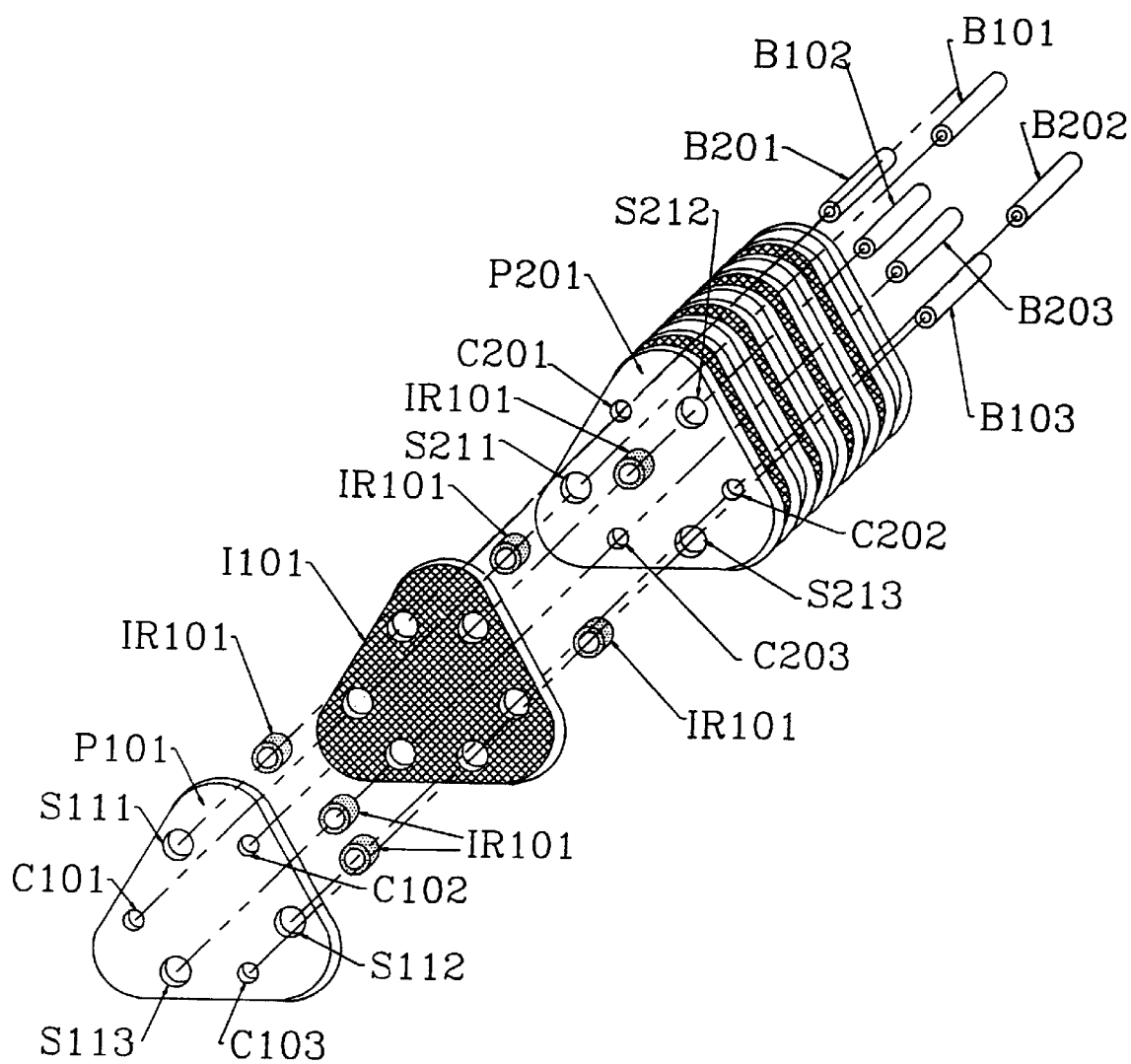
FIG. 29 is an exploded isometric view of an embodiment of the invention in which three sides of a triangular shape electrode plate are respectively installed with a conductor through-hole and an isolating through-hole.
Figure 30:
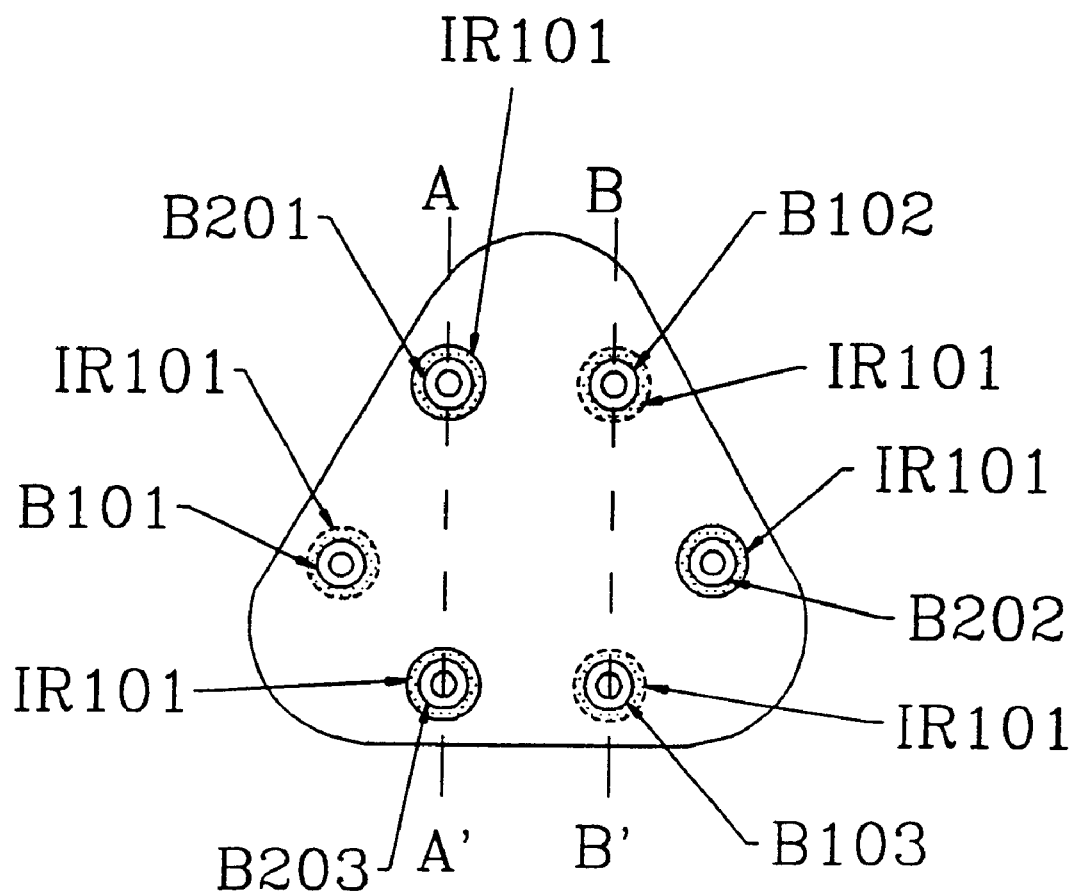
FIG. 30 is a front view of the embodiment of FIG. 29.
Figure 31:
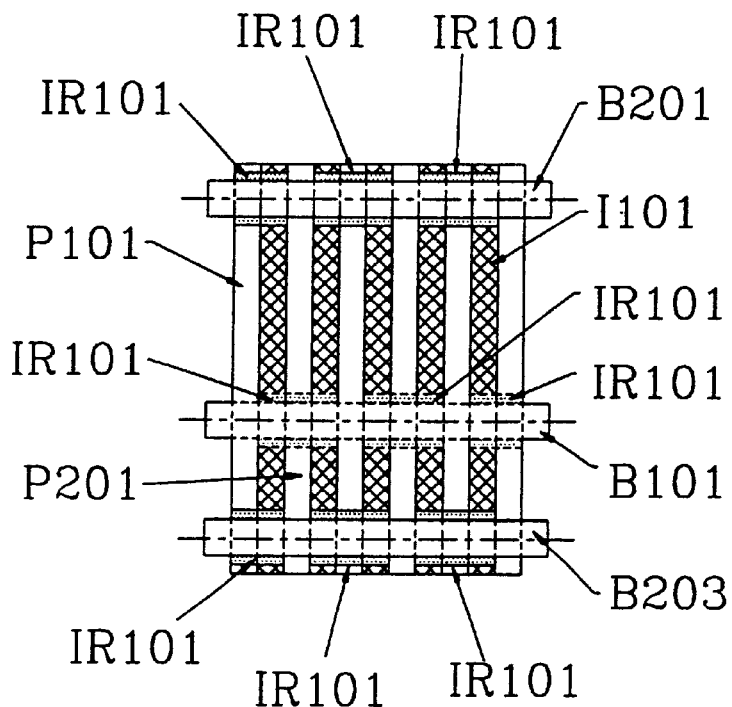
FIG. 31 is the A–A' sectional view of FIG. 30.
Figure 32:
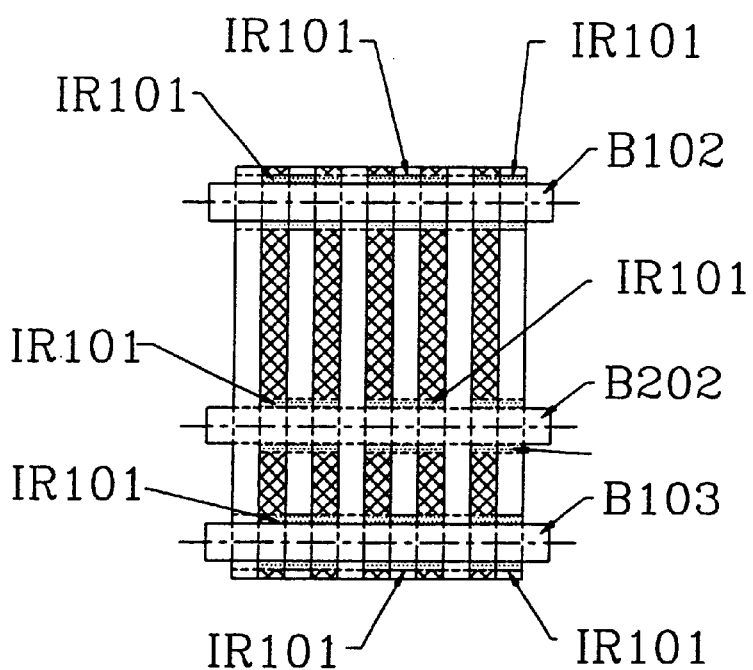
FIG. 32 is the B–B' sectional view of FIG. 30.
Figure 33:
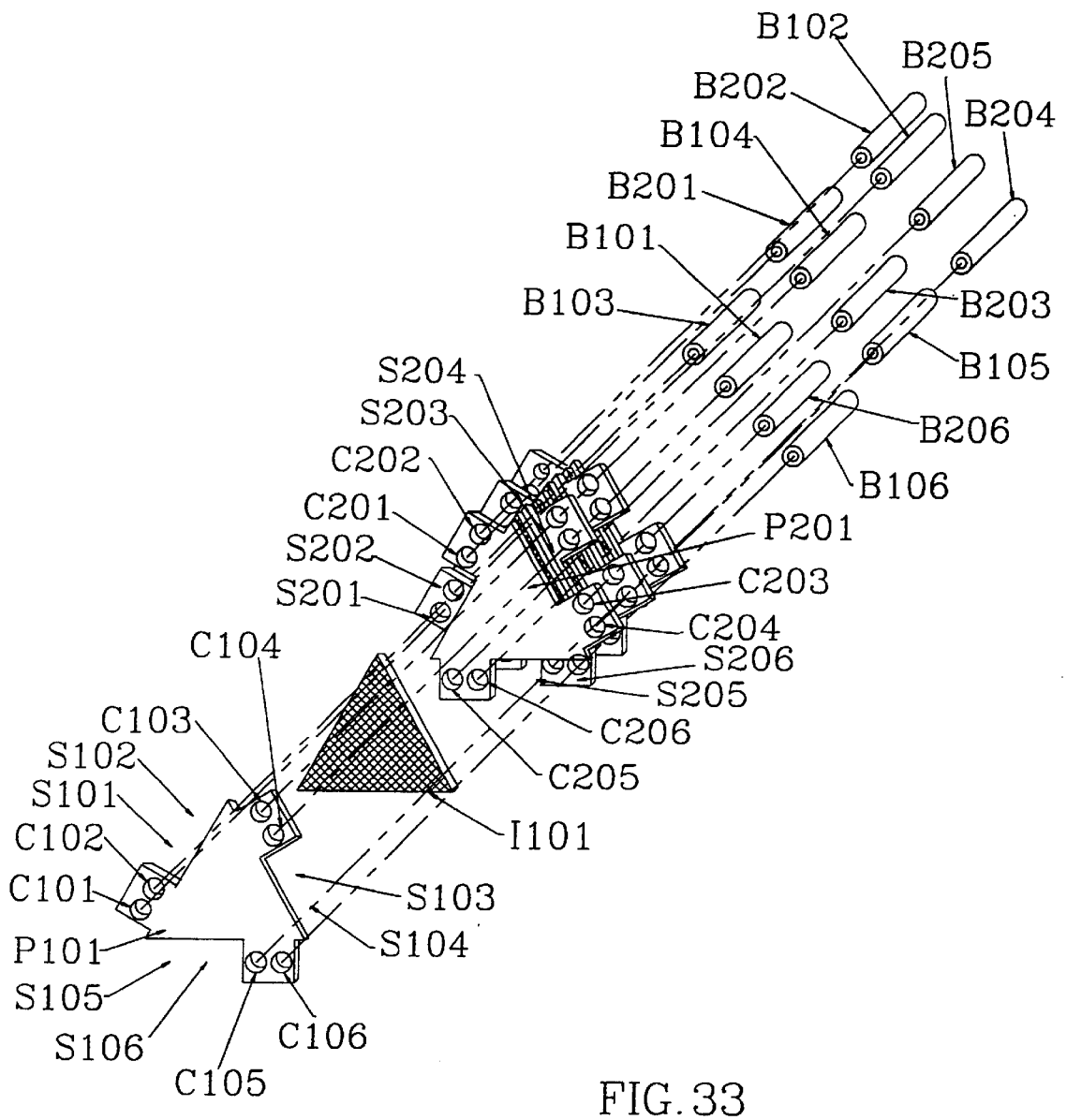
FIG. 33 is an exploded isometric view of an embodiment of the invention in which three sides of the triangular electrode plate are respectively installed with two in-line conductor through-holes and an isolating space.
Figure 34:
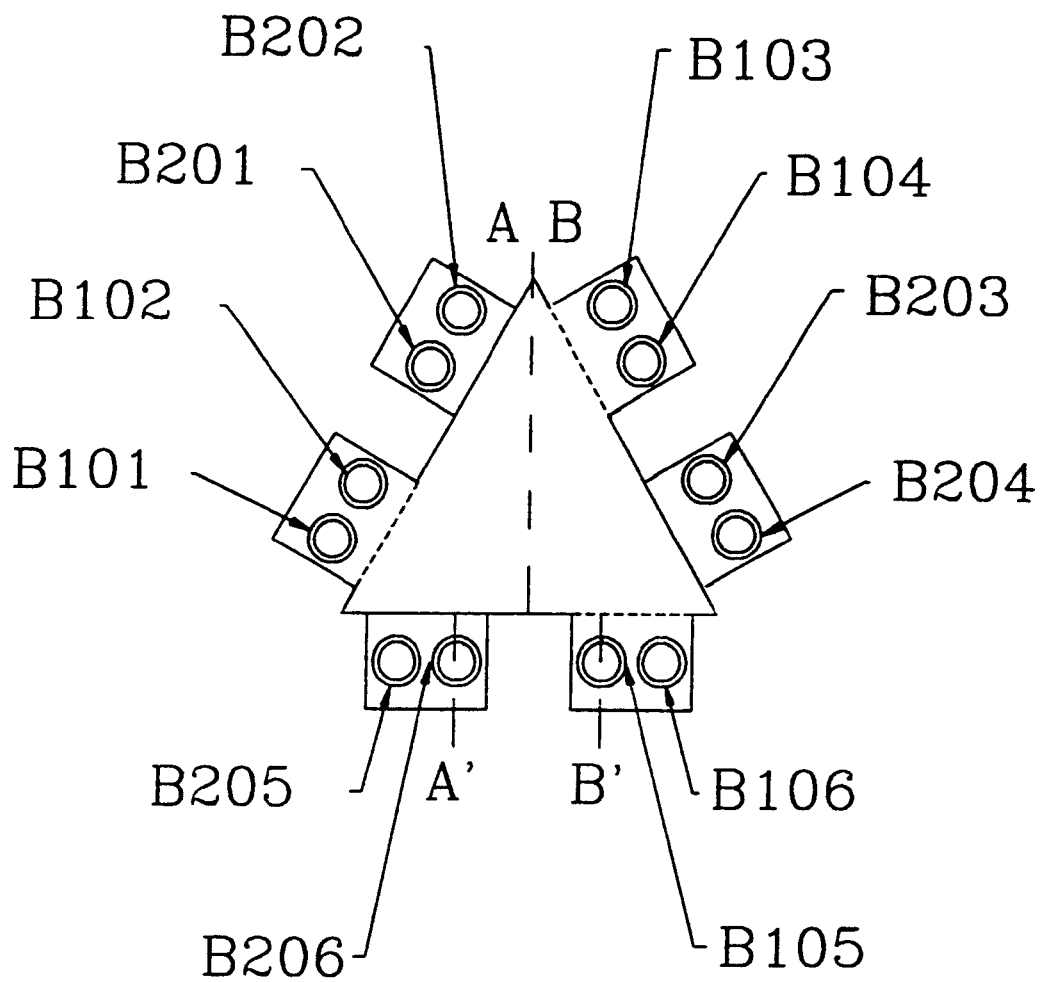
FIG. 34 is a front view of the embodiment of FIG. 33.
Figure 35:
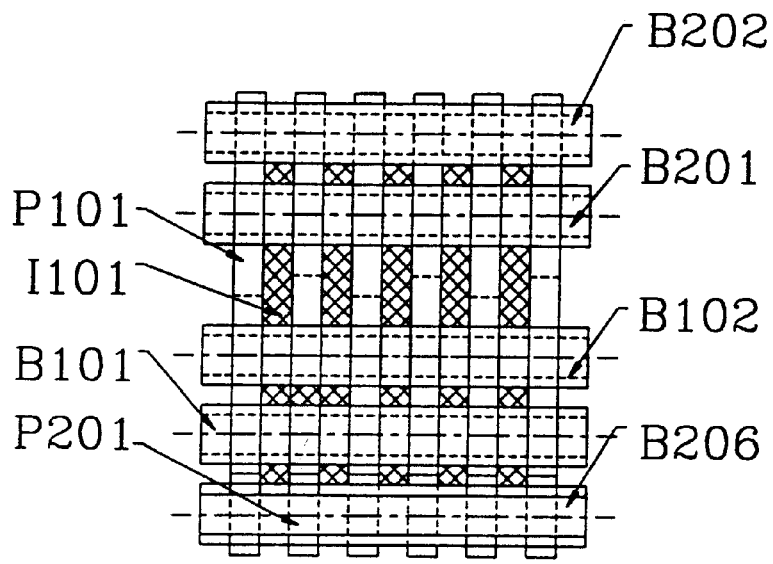
FIG. 35 is the A–A' sectional view of FIG. 34.
Figure 36:
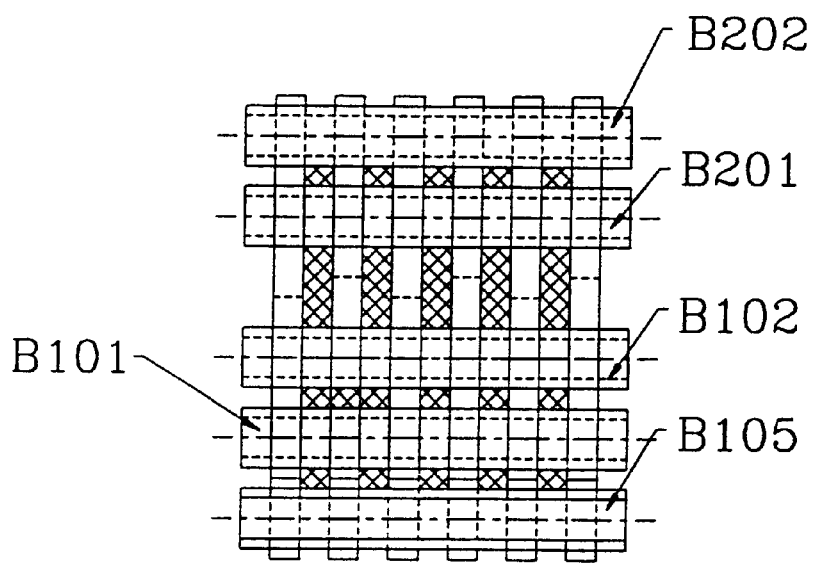
FIG. 36 is the B–B' sectional view of FIG. 34.
Figure 37:
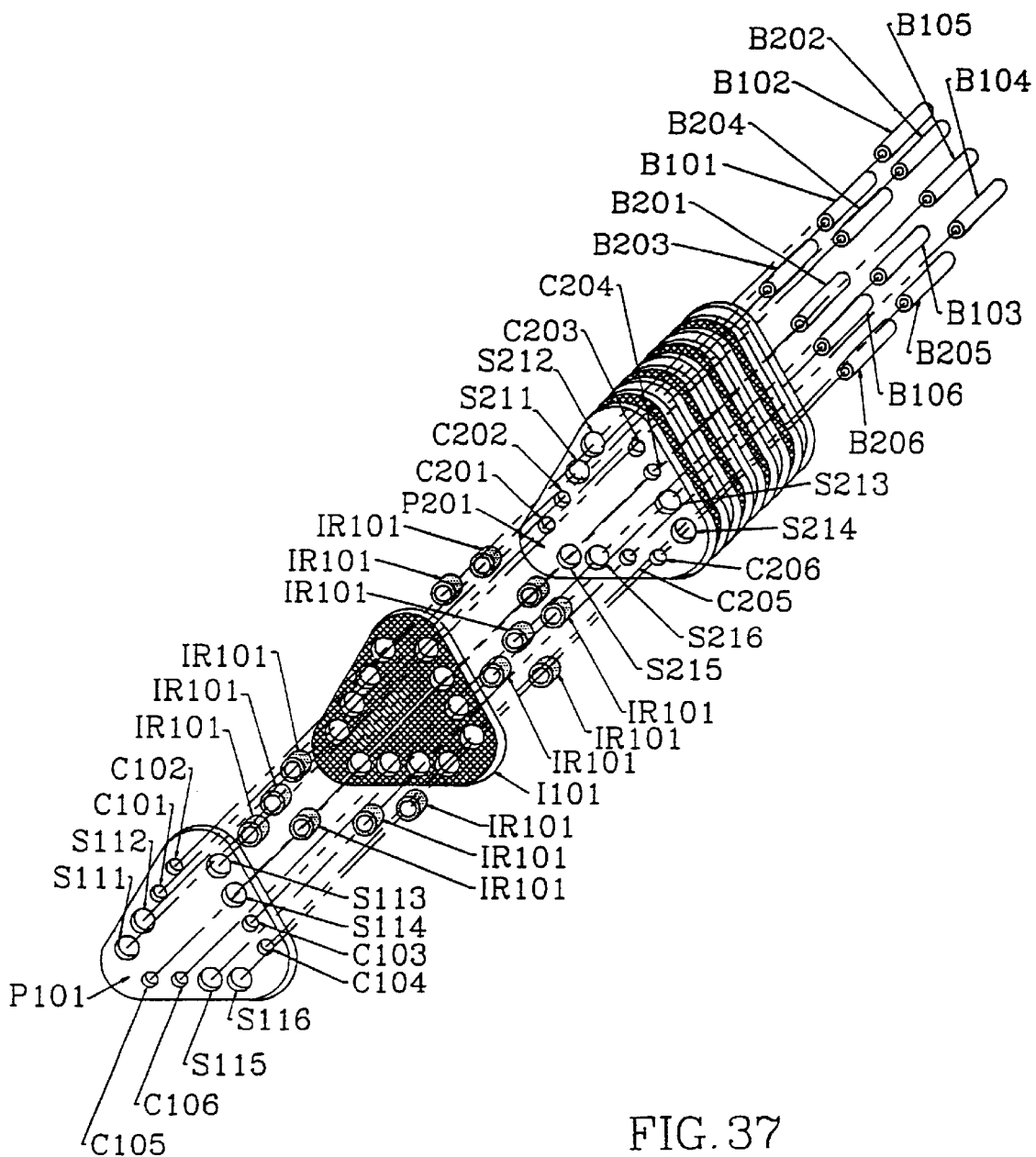
FIG. 37 is an exploded isometric view of an embodiment of the invention in which three sides of the triangular electrode plate are respectively installed with two in-line conductor through-holes and two isolating through-holes.
Figure 38:
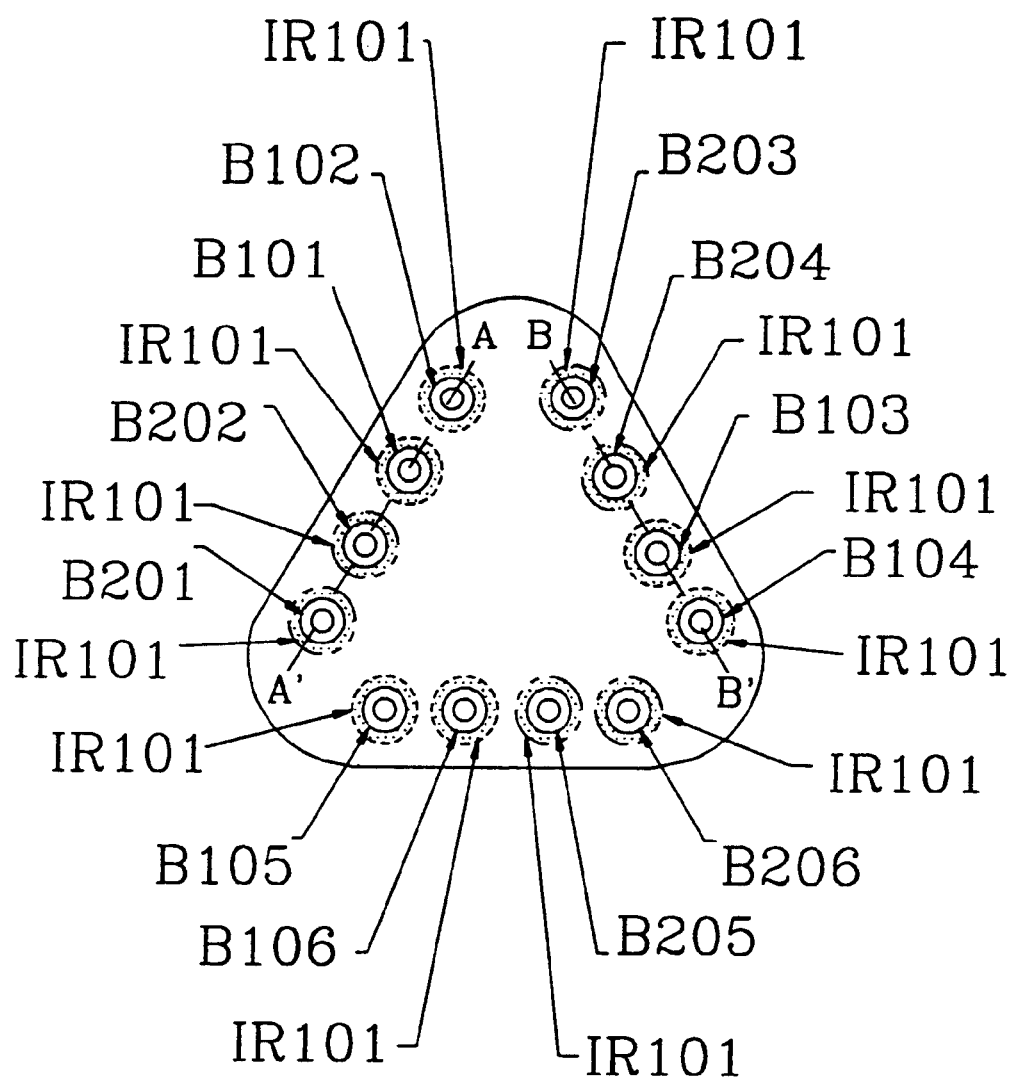
FIG. 38 is a front view of the embodiment of FIG. 37.
Figure 39:
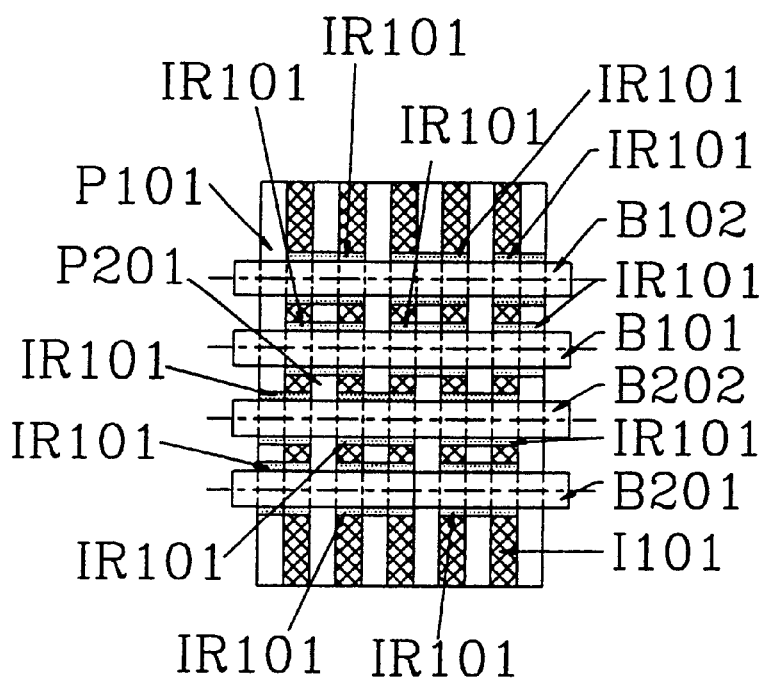
FIG. 39 is the A–A' sectional view of FIG. 38.
Figure 40:
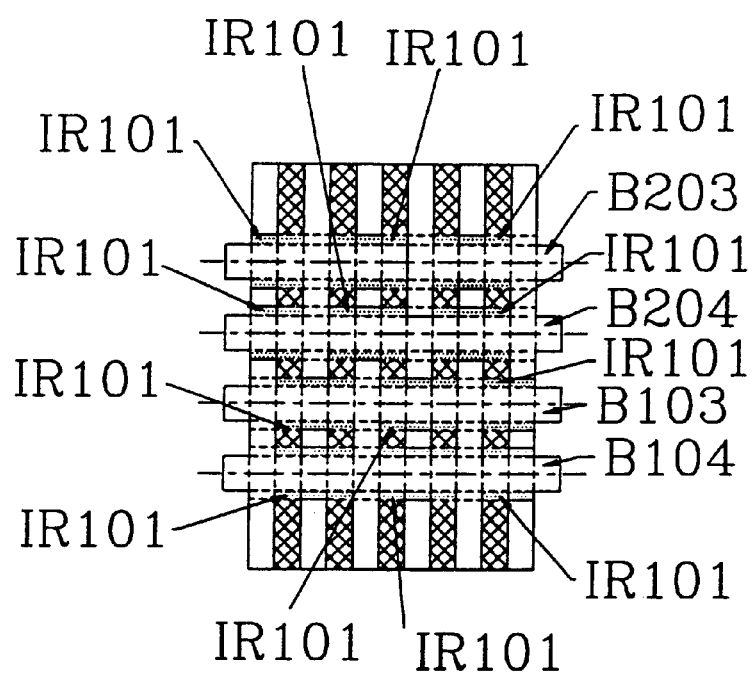
FIG. 40 is the B–B' sectional view of FIG. 38.
Figure 41:
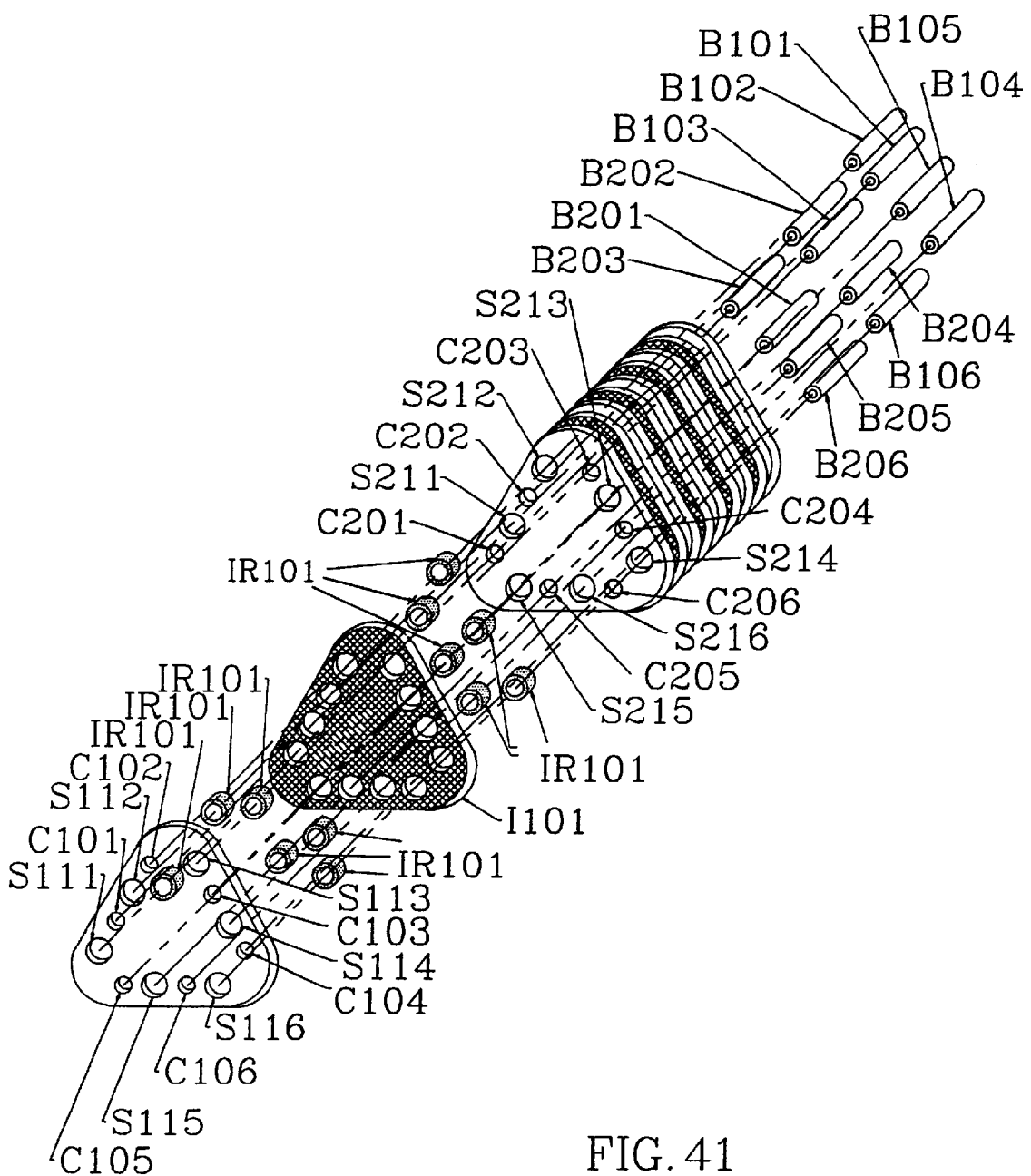
FIG. 41 is an exploded isometric view of an embodiment of the invention in which three sides of the triangular electrode plate are respectively cross installed with two conductor through-holes and two isolating through-holes.
Figure 42:
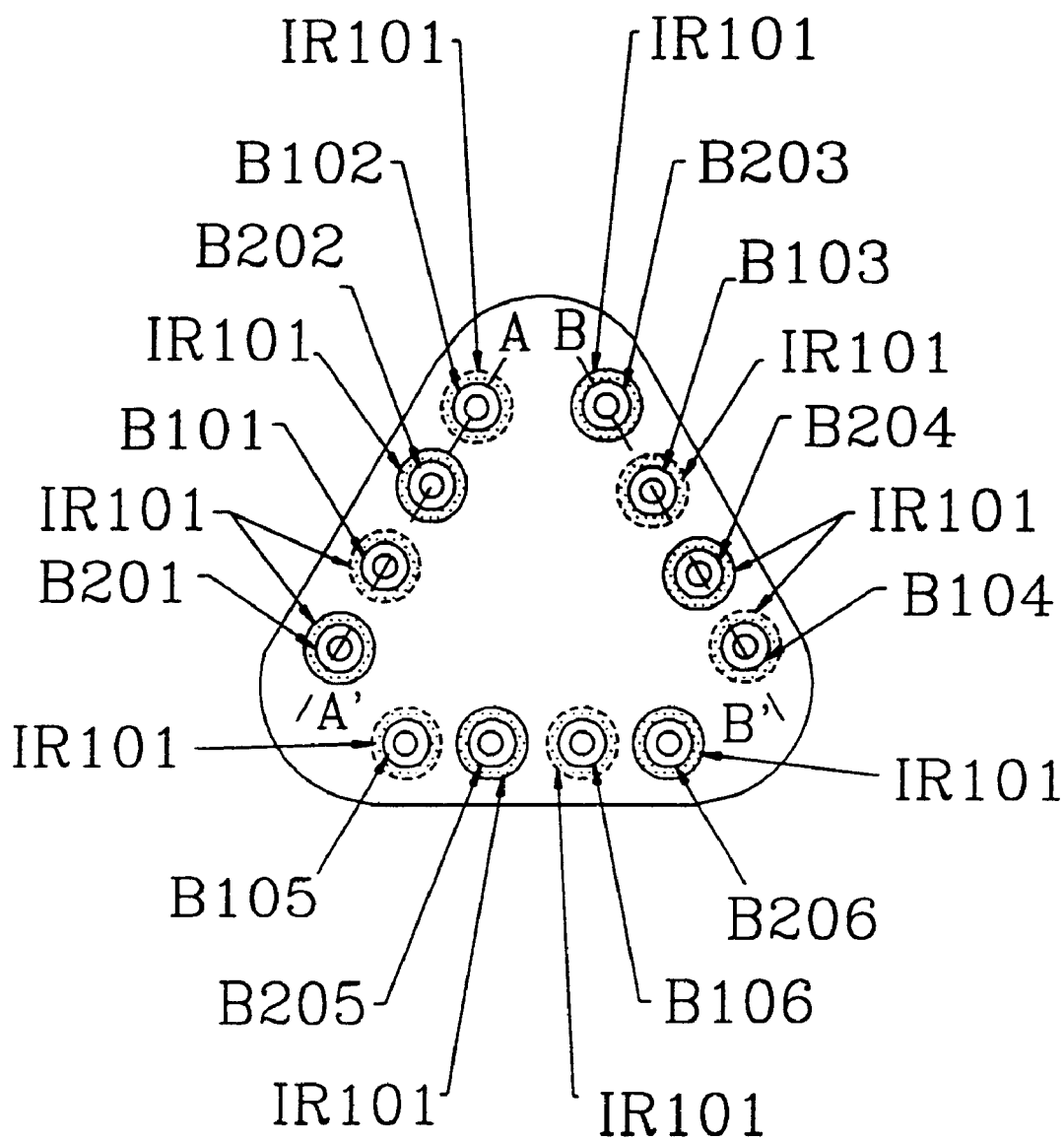
FIG. 42 is a front view of the embodiment of FIG. 41.
Figure 43:
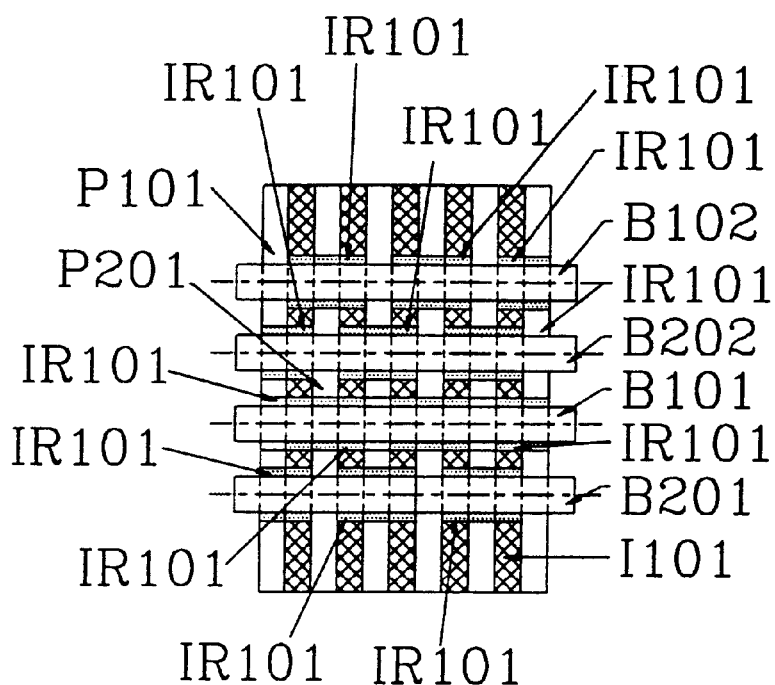
FIG. 43 is the A–A' sectional view of FIG. 42.
Figure 44:
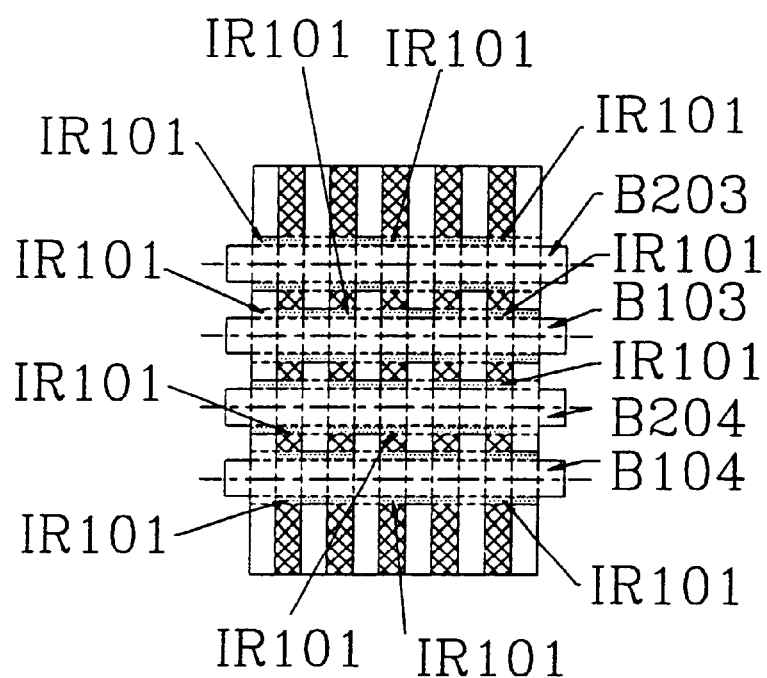
FIG. 44 is the B–B' sectional view of FIG. 42.
Figure 45:
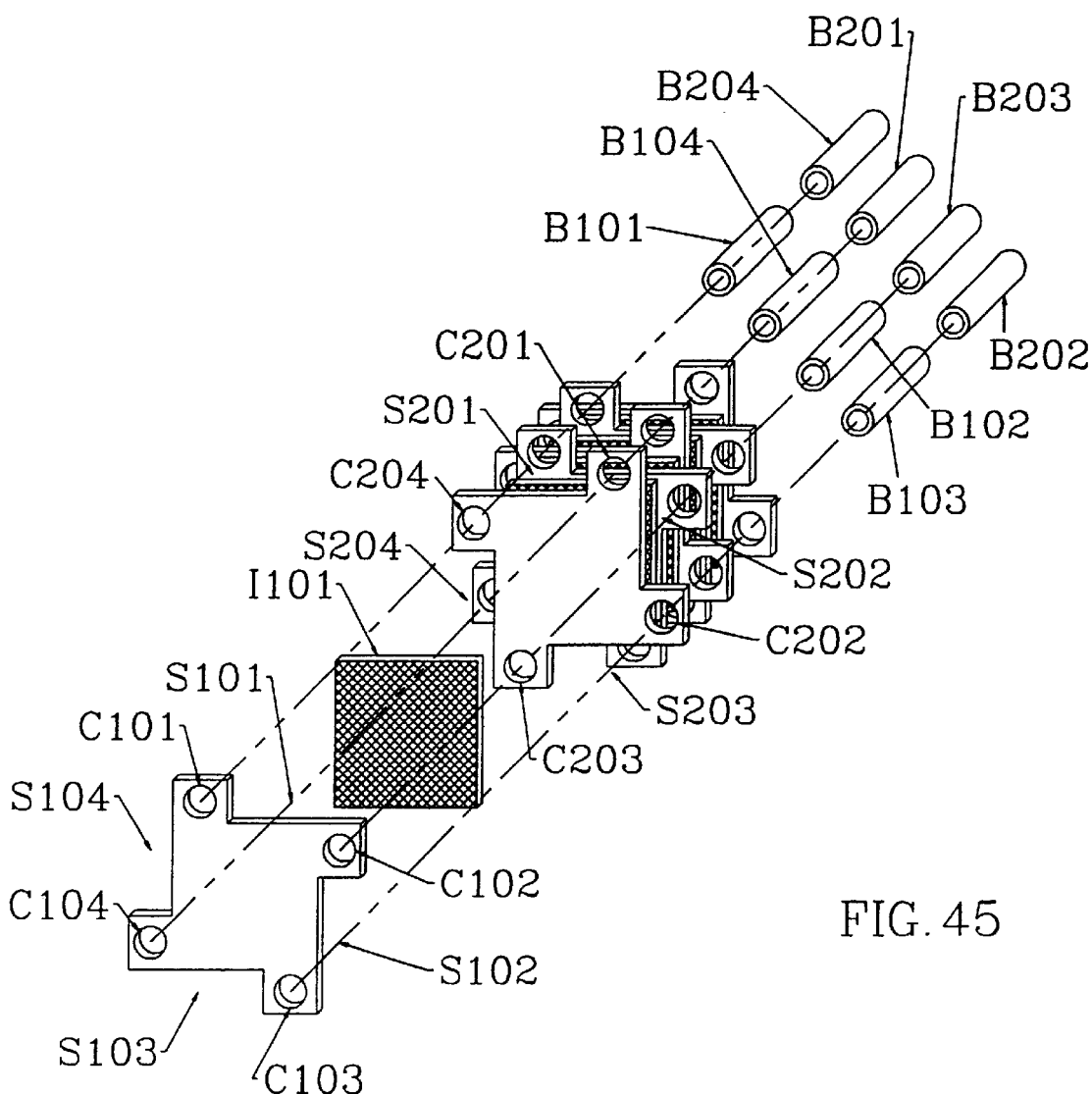
FIG. 45 is an exploded isometric view of an embodiment of the invention in which four sides of a quadrilateral electrode plate are respectively installed with conductor through-holes and an isolating space.
Figure 46:
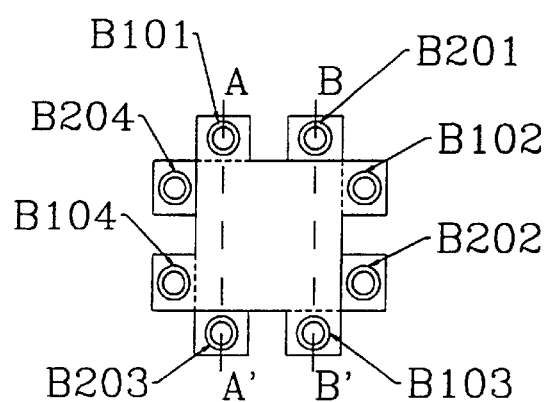
FIG. 46 is a front view of the embodiment of FIG. 45.
Figure 47:
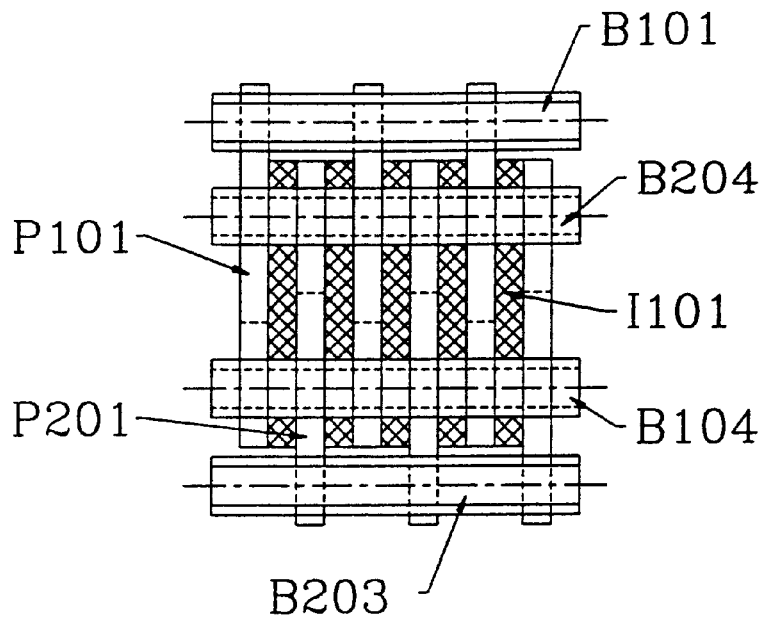
FIG. 47 is the A–A' sectional view of FIG. 46.
Figure 48:
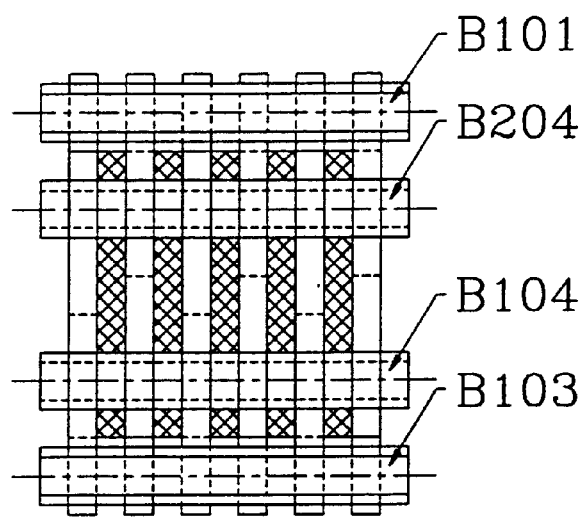
FIG. 48 is the B–B' sectional view of FIG. 46.
Figure 49:
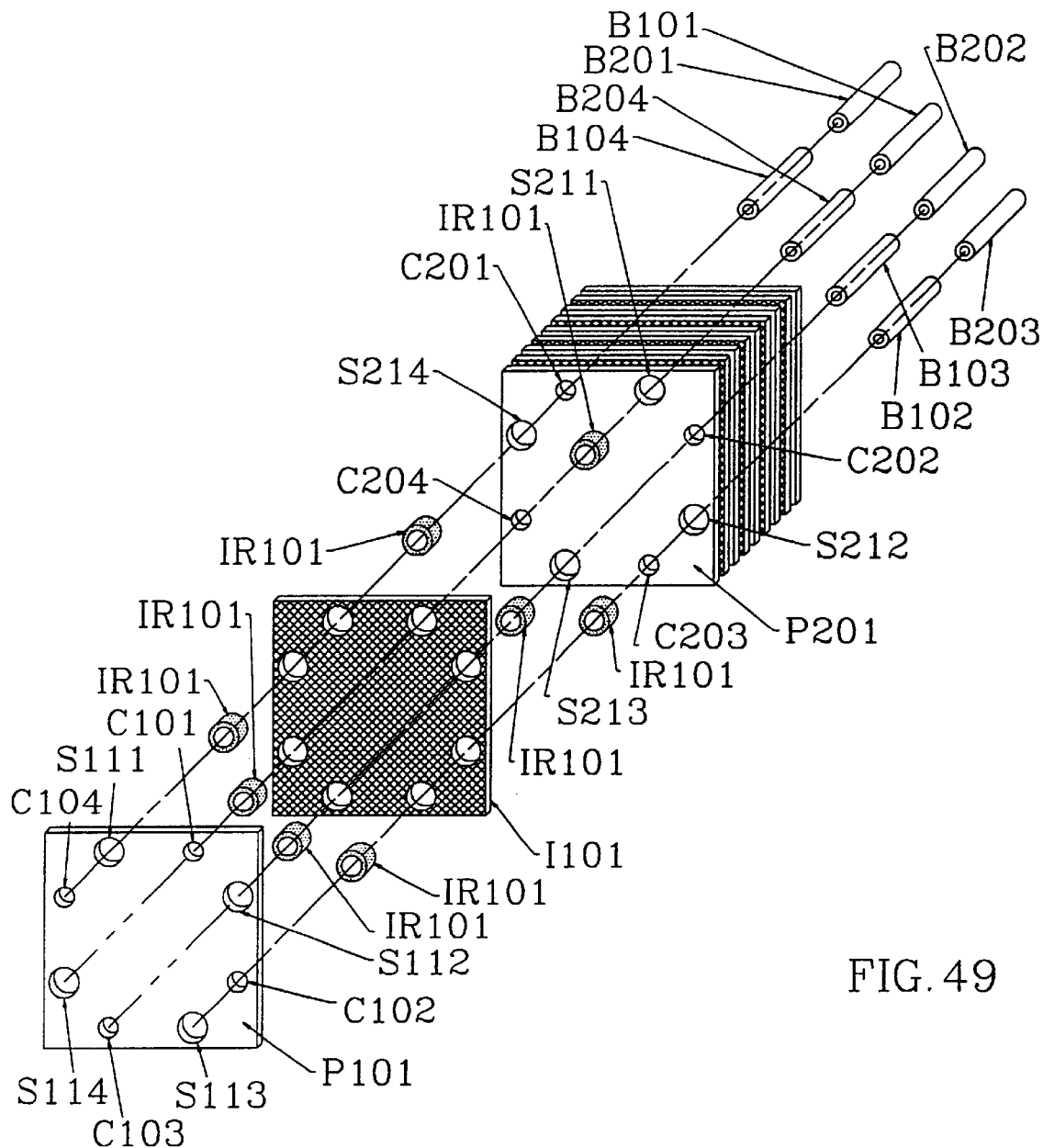
FIG. 49 is an exploded isometric view of an embodiment of the invention in which four sides of the quadrilateral electrode plate are respectively installed with a conductor through-hole and an isolating through-hole.
Figure 50:
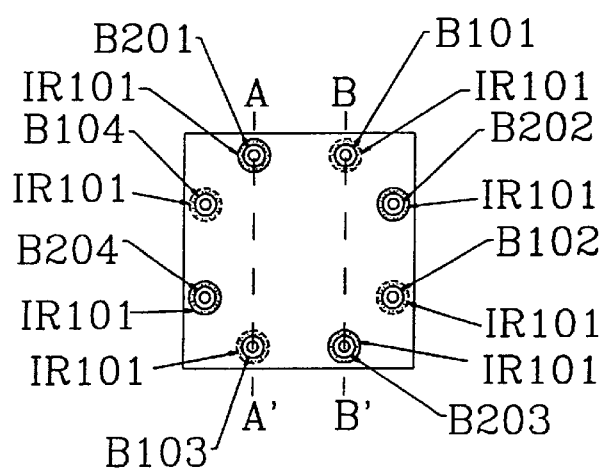
FIG. 50 is a front view of the embodiment of FIG. 49.
Figure 51:
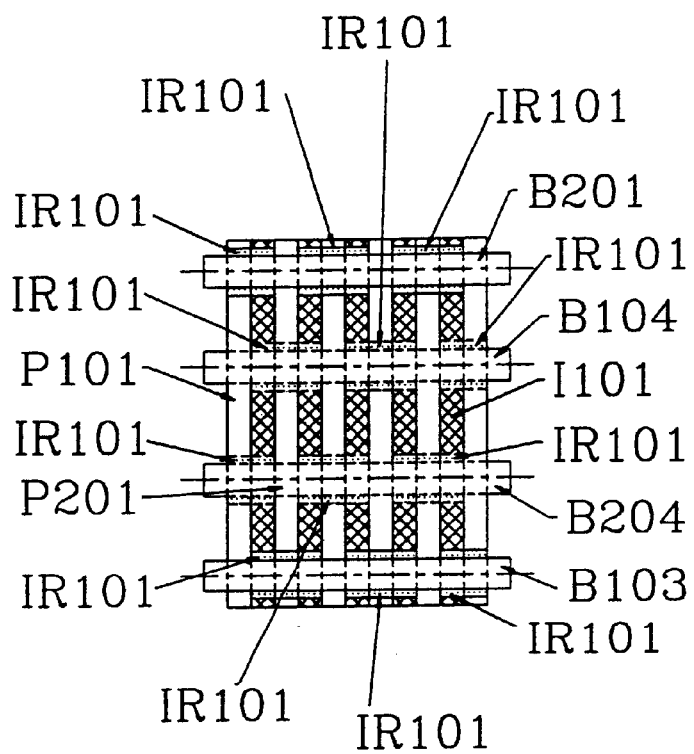
FIG. 51 is the A–A' sectional view of FIG. 50.
Figure 52:
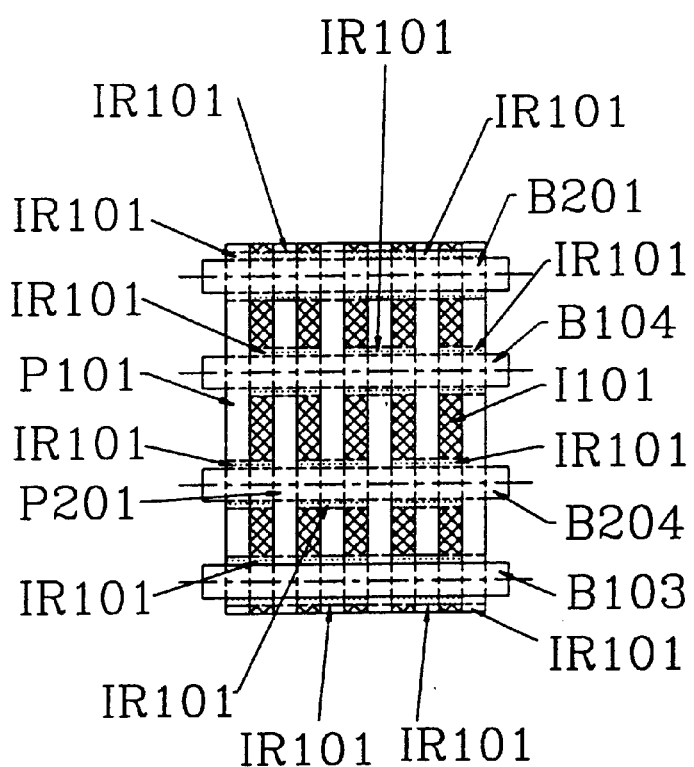
FIG. 52 is the B–B' sectional view of FIG. 50.

An electricity storage/discharge device with a low internal resistance common current collector structure includes an electrode plate having at least two current collecting terminals, thus providing two or more output current circuits in order to reduce internal resistance. The at least two current collecting terminals of the electrode plates include outwardly extending current terminals, the electrode plate sides, or solid or hollow tube shape conductor rods made from a conducting material in circular, square or other geometric shapes to penetrate through the conductor through-holes. The electrode plates of the electricity storage and discharge device may be connected to electrode plates having the same polarities for parallel combination, or connected to electrode plates having different polarities for series combination, or connected in a mixture of series and parallel combinations.

Various embodiments having different structural characteristics to provide an electricity storage/discharge device with a low internal resistance current collector structure are described below. To emphasize the structural characteristics of this case, the exterior casings and the insulation plates, sheets or films between the electrode plates of different polarities have been omitted from the illustrations of the preferred embodiments. The preferred embodiments are as follows.

A. The first group of embodiments is made up of embodiments in which two sides of a quadrilateral or quasi-quadrilateral shaped electrode plate are respectively installed with current conductor through-holes.

1) For the embodiment illustrated in FIGS. 1–4, two sides of positive electrode plates P101 of the electricity storage and discharge device are respectively installed with conductor through-hole C101, C102 and isolating spaces S101, S102, while two sides of negative electrode plates P201 are respectively installed with a conductor through-hole C201, C202 and isolating spaces S201, S202. The positive and negative electrode plates are cross laminated, and an isolator plate I101 is installed between two neighboring electrode plates of different polarity. Positive electrode conductor rods B101, B102 and the negative electrode conductor rods B201, B202 are respectively inserted through the aforesaid conductor through-holes, to join electrode plates having the same polarity for parallel current collection, or to join electrode plates of different polarities for series combinations.

2) In the embodiment illustrated in FIGS. 5–8, two sides of the positive electrode plates P101 of the electricity storage and discharge device are respectively installed with conductor through-holes C101 C102 and isolating through-holes S111, S112, and two sides of the negative electrode plates P201 are respectively installed with conductor through-holes C201, C202 and isolating through-holes S211, S212. The positive and negative electrode plates are cross laminated, and an isolator plate I101 is installed between two neighboring electrode plates of different polarity. The positive electrode conductor rods B101, B1C2 and the negative electrode conductor rods B201, B202 are respectively inserted through the aforesaid conductor through-holes to join electrode plates having the same polarity for parallel current collection, or to joint electrode plates of different polarities for series combinations.

3) In the embodiment illustrated in FIGS. 9–12, two sides of the positive electrode plates P101 of the electricity storage and discharge device are respectively installed with two neighboring conductor through-holes C101, C102, C103, C104 and two isolating spaces S101, S102, S103, S104, while two sides of the negative electrode plates P201 are respectively installed with two neighboring conductor through-holes C201, C202, C203, C204 and two isolating spaces S201, S202, S203, S204. The positive and negative electrode plates are cross laminated, and an isolator plate I101 is installed between two neighboring electrode plates of different polarity. The positive electrode conductor rods B101, B102, B103, B104 and the negative electrode conductor rods B201, B202, B203, B204 are respectively inserted through the aforesaid conductor through-holes to join electrode plates having the same polarities for parallel combination current collection, or to join electrode plates of different polarities for series combination.

4) In the embodiment of FIGS. 13–16, two sides of the positive electrode plates P101 of the electricity storage and discharge device are respectively installed with two neighboring conductor through-holes C101, C102, C103, C104 and two neighboring isolating through-holes S111, S112, S113, S114, while two sides of the negative electrode plates P201 are respectively installed with two neighboring conductor through-holes C201, C202, C203, C204 and two neighboring isolating through-holes S211, S212, S213, S214. The positive and negative electrode plates are cross laminated, and an isolator plate I101 is installed between each two neighboring electrode plates of different polarity. The positive electrode conductor rods B101, B102, B103, B104 and the negative electrode conductor rods B201, B202, B203, B204 are respectively inserted through the aforesaid conductor through-holes to join electrode plates of the same polarity for parallel combination current collection, or to join electrode plates of different polarities for series combination.

5) In the embodiment illustrated in FIGS. 17–20, two sides of the positive electrode plates P101 of the electricity storage and discharge device are respectively cross installed with two conductor through-holes C101, C102, C103, C104 and two isolating notches and through-holes S101, S102, S103, S104, while two sides of the negative electrode plates P201 are respectively cross installed with two conductor through-holes C201, C202, C203, C204 and two isolating notches and through-holes S201, S202, S203, S204. The positive and negative electrode plates are cross laminated, and an isolator plate I101 is installed between each two neighboring electrode plates of different polarity. The positive electrode conductor rods B101, B102, B103, B104 and the negative electrode conductor rods B201, B202, B203, B204 are respectively inserted through the aforesaid conductor through-holes, to join electrode plates of the same polarity for parallel combination current collection, or to join electrode plates of different polarities for series combination.

6) In the embodiment illustrated in FIGS. 21–24, two sides of the positive electrode plates P101 of the electricity storage and discharge device are respectively cross installed with two conductor through-holes C101, C102, C103, C104 and two isolating through-holes S111, S112, S113, S114, while two sides of the negative electrode plates P201 are respectively cross installed with two conductor through-holes C201, C202, C203, C204 and two isolating through-holes S211, S212, S213, S214. The positive and negative electrode plates are cross laminated, and an isolator plate I101 is installed between each two neighboring electrode plates of different polarities. The positive electrode conductor rods B101, B102, B103, B104 and the negative electrode conductor rods B201, B202, B203, B204 are respectively inserted through the aforesaid conductor through-holes and joined with electrode plates of the same polarity for parallel combination current collection, or with electrode plates of different polarities for series combination.

B. The second group of embodiments is made up of embodiments in which three sides of triangle or quasi-triangle shaped electrode plates are respective installed with current conductor through-holes.

1) In the embodiment illustrated in FIGS. 25–28, three sides of positive electrode plates P101 of the electricity storage and discharge device are respectively installed with conductor through-holes C101, C102, C103 and insulating through-holes S111, S112, S113, S114, while three sides of negative electrode plates P102 are respectively installed with conductor through-holes C201, C202, C203 and insulating through-holes S211, S212, S213, S214. The positive and negative electrode plates are cross laminated, and an isolator plate I101 is installed between each two neighboring electrode plates of different polarity. The positive electrode conductor rods B101, B102, B103, B104 and the negative electrode conductor rods B201, B202, B203, B204 are respectively inserted through the aforesaid conductor through-holes and joined with electrode plates of the same polarity for parallel combination current collection, or with electrode plates having different polarities for series combination.

2) In the embodiment illustrated in FIGS. 29–32, three sides of positive electrode plates P101 of the electricity storage and discharge device are respectively installed with conductor through-holes C101, C102, C103 and isolating through-holes S111, S112, S113, while three sides of negative electrode plates P201 are respectively installed with conductor through-holes C201, C202, C203 and isolating through-holes S211, S212, S213. The positive and negative electrode plates are cross laminated, and an isolator plate I101 is installed between each two neighboring electrode plates of different polarity. The positive electrode conductor rods B101, B102, B103 and the negative electrode conductor rods B201, B202, B203 are respectively inserted through the aforesaid conductor through-holes and joined with electrode plates of the same polarity for parallel combination current collection, or with electrode plates having different polarities for series combination.

3) In the embodiment illustrated in FIGS. 33–36, three sides of positive electrode plates P101 of the electricity storage and discharge device are respectively installed with two neighboring conductor through-holes C101, C102, C103, C104, C105, C106 and isolating spaces S101, S102, S103, while three sides of the negative electrode plates P201 are respectively installed with two neighboring conductor through-holes C201, C202, C203, C204, C205, C206 and isolating spaces S201, S202, S203. The positive and negative electrode plates are cross laminated, and an isolator plate I101 is installed between each two neighboring electrode plates of different polarity. The positive electrode conductor rods B101, B102, B103, B104, B105, B106 and the negative electrode conductor rods B201, B202, B203, B204, B205, B206 are respectively inserted through the aforesaid conductor through-holes and joined with electrode plates of the same polarity for parallel combination current collection, or with electrode plates having different polarities for series combination.

4) In the embodiment illustrated in FIGS. 37–40, three sides of positive electrode plates P101 of the electricity storage and discharge device are respectively installed with two neighboring conductor through-holes C101, C102, C103, C104, C105, C106 and two neighboring isolating holes S111, S112, S113, S114, S115, S116, while three sides of negative electrode plates P201 are respectively installed with two neighboring conductor through-holes C201, C202, C203, C204, C205, C206 and two neighboring isolating through-holes S211, S212, S213, S214, S215, S216. The positive and negative electrode plates are cross laminated, and an isolator plate I101 is installed between each two neighboring electrode plates of different polarity. The positive electrode conductor rods B101, B102, B103, B104, B105, B106 and the negative electrode conductor rods B201, B202, B203, B204, B205, B206 are respectively inserted through the aforesaid conductor through-holes and joined with electrode plates of the same polarity for parallel combination current collection, or with electrode plates having different polarities for series combination.

3) In the embodiment illustrated in FIGS. 41–44, three sides of positive electrode plates P101 of the electricity storage and discharge device are respectively cross installed with two conductor through-holes C101, C102, C103, C104, C105, C106 and with two isolating holes S111, S112, S113, S114, S115, S116, while three sides of the negative electrode plates P201 are respectively cross installed with two conductor through-holes C201, C202, C203, C204, C205, C206 and with two isolating through-holes S211, S212, S213, S214, S215, S216. The positive and negative electrode plates are cross laminated, and an isolator plate I101 is installed between each two neighboring electrode plates of different polarity. The positive electrode conductor rods B101, B102, B103, B104, B105, B106 and the negative electrode conductor rods B201, B202, B203, B204, B205, B206 are respectively inserted through the aforesaid conductor through-holes and joined with electrode plates of the same polarity for parallel combination current collection, or with electrode plates having different polarities for series combination.

C. The third group of embodiments includes embodiments in which four sides of quadrilateral or quasi-quadrilateral shaped electrode plates are respectively installed with current conductor through-holes.

1) In the embodiment illustrated in FIGS. 45–48, four sides of positive electrode plates P101 of the electricity storage and discharge device are respectively installed with conductor through-holes C101, C102, C103, C104 and isolating spaces S101, S102, S103, S104, while four sides of negative electrode plates P201 are respectively installed with conductor through-holes C201, C202, C203, C204 and isolating spaces S201, S202, S203, S204. The positive and negative electrode plates are cross laminated, and an isolator plate I101 is installed between each two neighboring electrode plates of different polarity. The positive electrode conductor rods B101, B102, B103, B104 and the negative electrode conductor rods B201, B202, B203, B204 are respectively inserted through the aforesaid conductor through-holes and joined with electrode plates of the same polarity for parallel combination current collection, or with electrode plates having different polarities for series combination.

2) In the embodiments illustrated in FIGS. 49–52, four sides of positive electrode plates P101 of the electricity storage and discharge device are respectively installed with conductor through-holes C101, C102, C103, C104 and isolating through-holes S111, S112, S113, S114, while four sides of the negative electrode plate P201 are respectively installed with conductor through-holes C201, C202, C203, C204 and isolating through-holes S211, S212, S213, S214. The positive and negative electrode plates are cross laminated, and an isolator plate I101 is installed between each two neighboring electrode plates of different polarity. The positive electrode conductor rods B101, B102, B103, B104 and the negative electrode conductor rods B201, B202, B203, B204 are respectively inserted through the aforesaid conductor through-holes and joined with electrode plates of the same polarity for parallel combination current collection, or with electrode plates having different polarities for series combination.

D. The fourth group of embodiments include embodiments in which circular or quasi-circular shaped electrode plates are respectively cross installed with current conductor through-holes.

Figure 53:
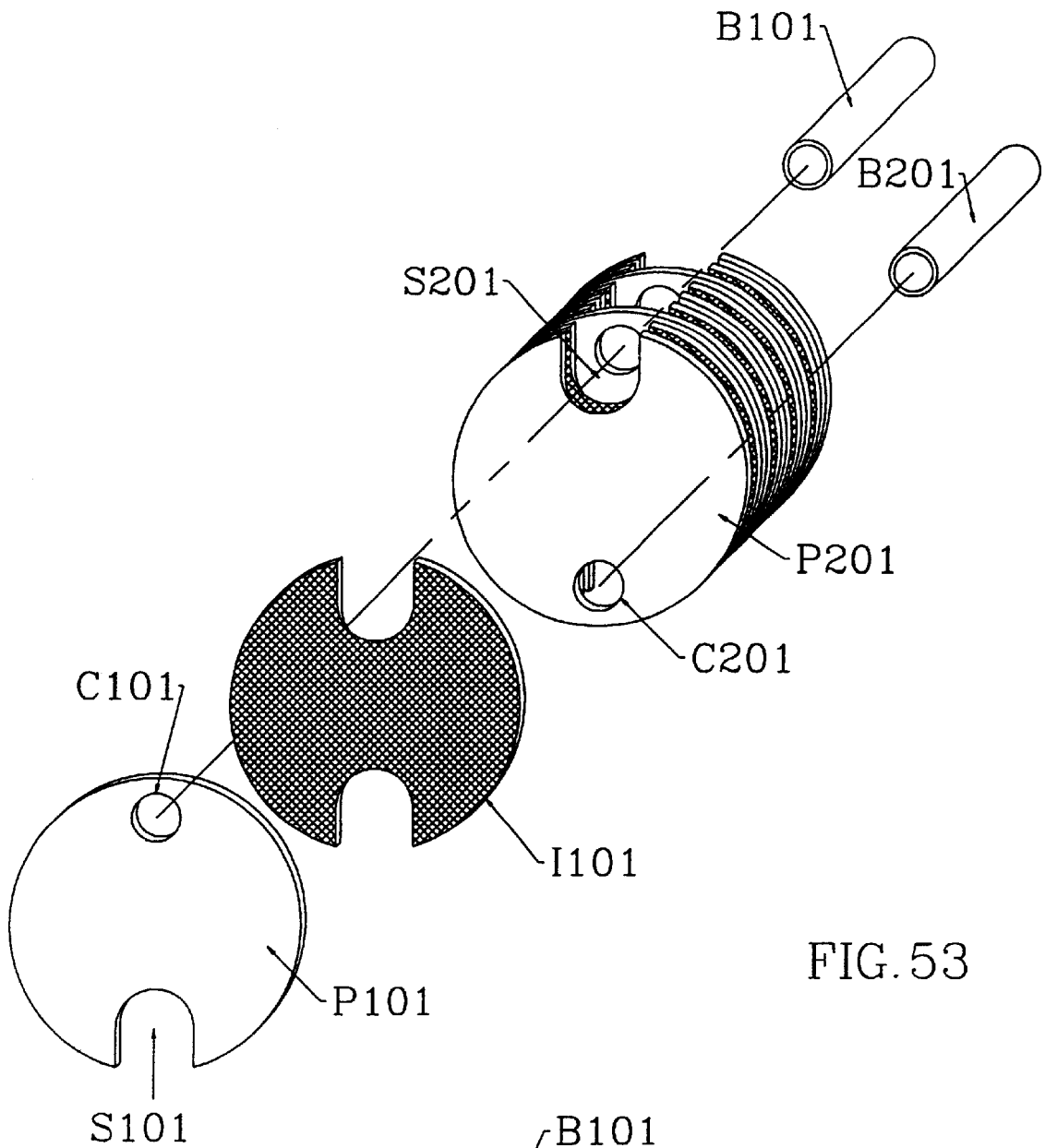
FIG. 53 is an exploded isometric view of an embodiment of the invention in which circular or partially circular electrode plates of different polarities are respectively cross installed with a conductor through-hole and an isolating notch.
Figure 54:
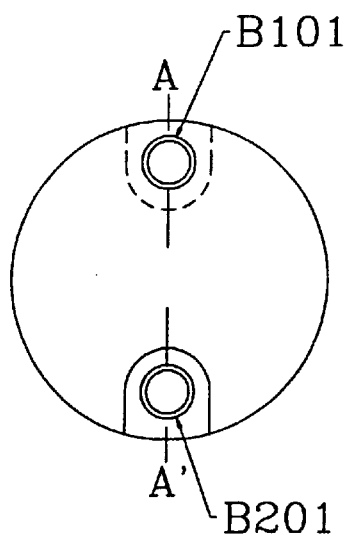
FIG. 54 is a front view of the embodiment of FIG. 53.
Figure 55:
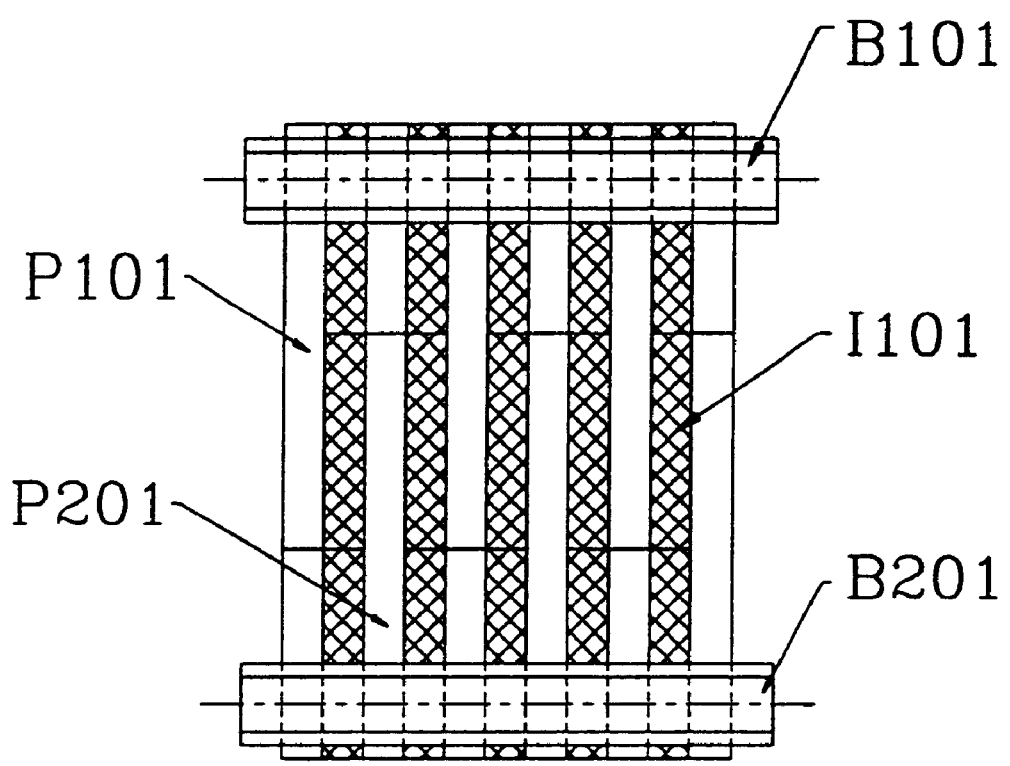
FIG. 55 is the A–A' sectional view of FIG. 54.

1) In the embodiment illustrated in FIGS. 53–55, one end of each of the circular or quasi-circular positive electrode plates P101 of the electricity storage and discharge device is installed with conductor through-hole C101, and the other end is provided with an isolating space S101, while one end of each of the circular or quasi-circular negative electrode plates P201 is installed with a conductor through-hole C201, and the other end is provided with an isolating space S201. The positive and negative electrode plates are cross laminated, and an isolator plate I101 is installed between each two neighboring electrode plates of different polarity. The positive electrode conductor rod B101 and the negative electrode conductor rod B201 are respectively inserted through the aforesaid conductor through-holes and joined with electrode plates of the same polarity for parallel combination current collection, or with the electrode plates having different polarities for series combination. As a result, electric current on the electrode plate is either the output current flowing from the surrounding area in multiple circuits to the conductor rod for collected output, or the input current diffused from the conductor rod to the surrounding area in multiple circuits, thereby reducing the internal resistance of the storage/discharge device.

Figure 56:
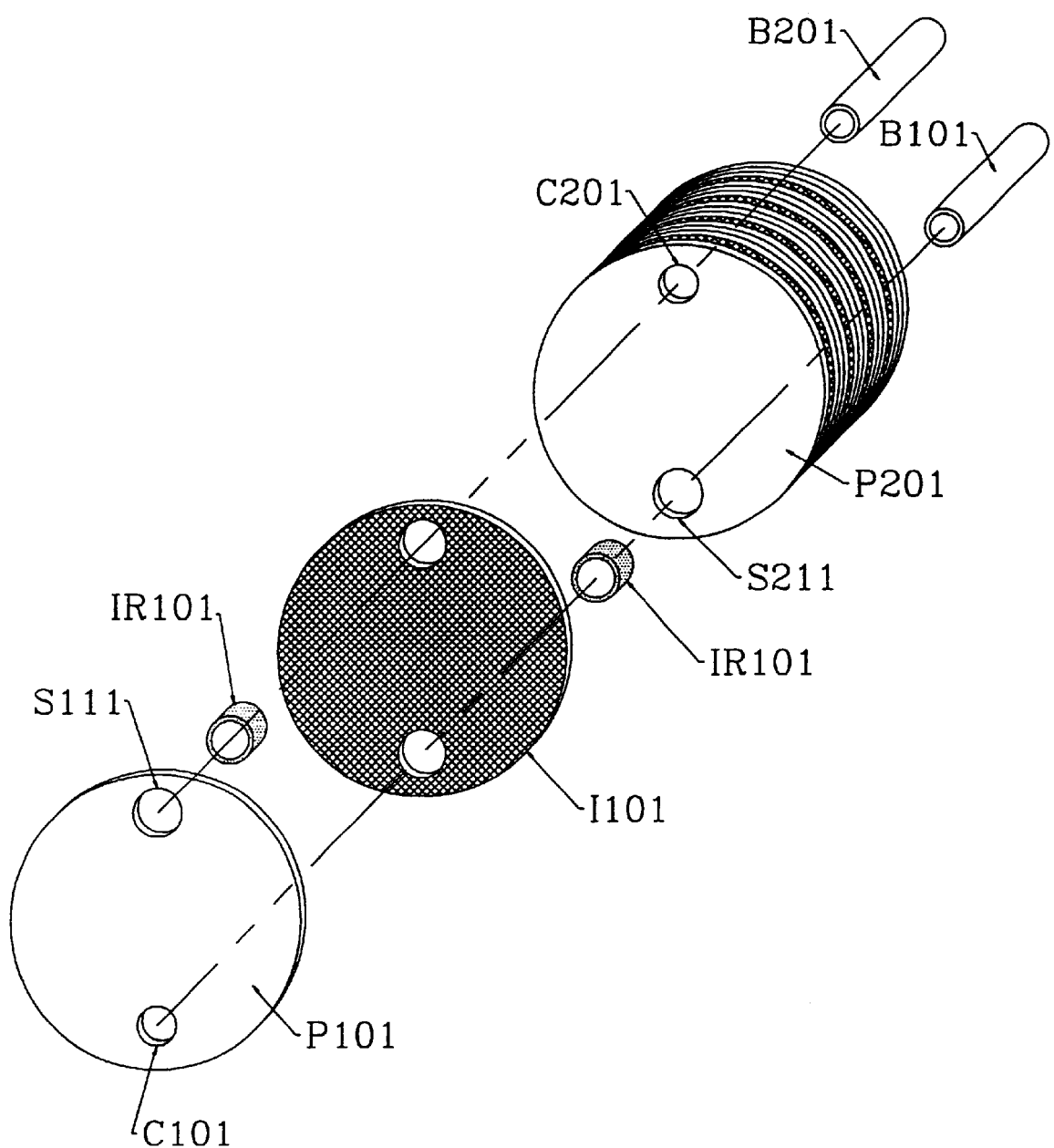
FIG. 56 is an exploded isometric view of an embodiment of the invention in which circular or partially circular electrode plates of different polarities are respectively inter-cross installed with a conductor through-hole and an isolating through-hole near to the plate central region.
Figure 57:
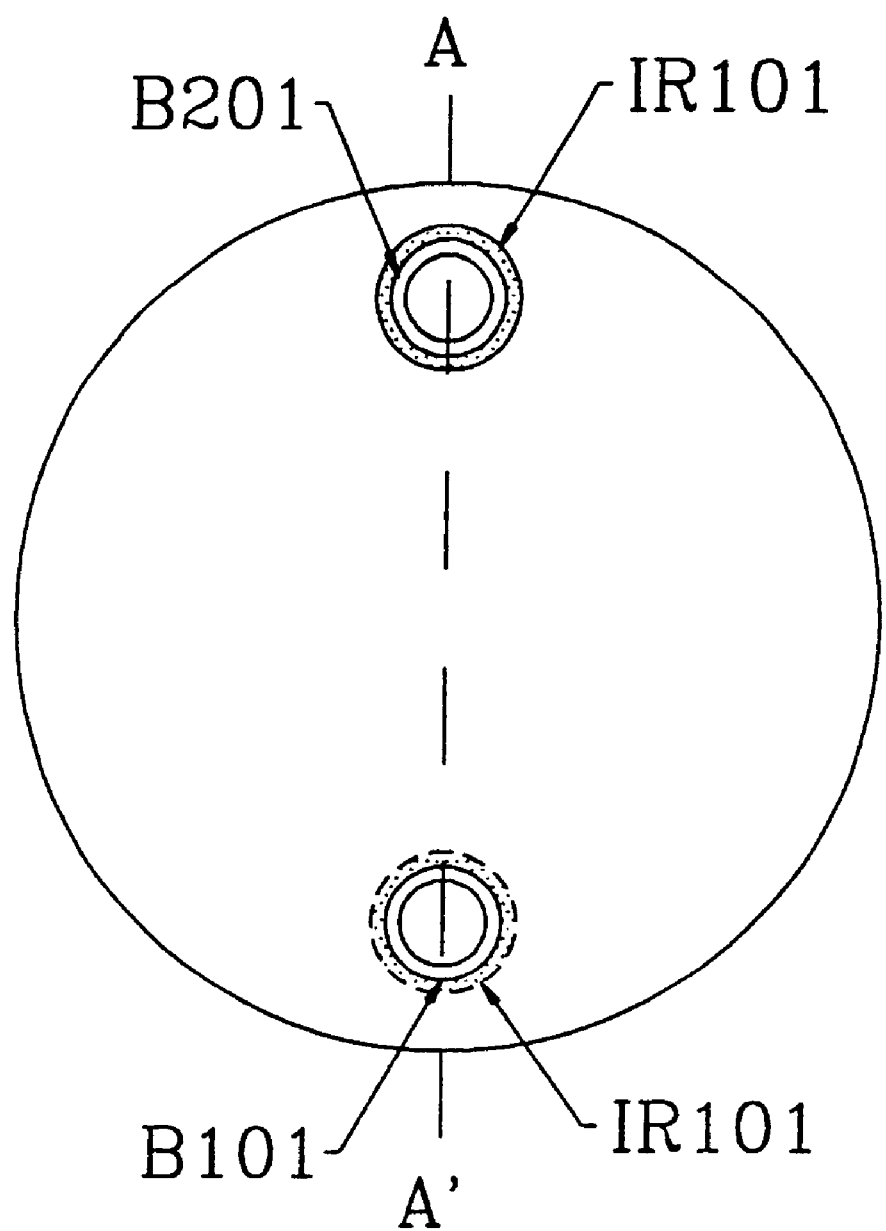
FIG. 57 is a front view of the embodiment of FIG. 56.
Figure 58:
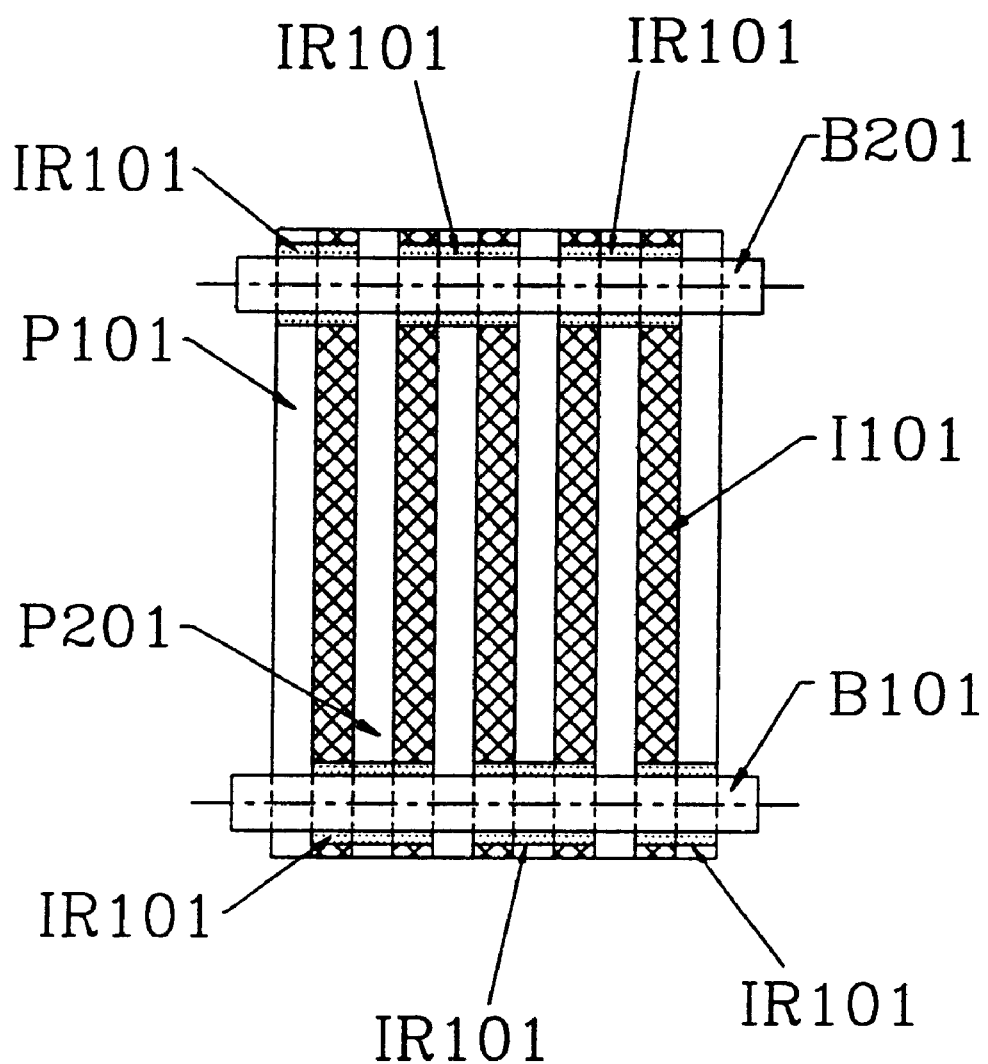
FIG. 58 is the A–A' sectional view of FIG. 57.

2) In the embodiment of FIGS. 56–58, one end of each of the circular or quasi-circular positive electrode plates P101 of the electricity storage and discharge device is installed with a conductor through-hole C101 and the other end is provided with an isolating through-hole S111, while one end of each of the circular or quasi-circular negative electrode plates P201 is installed with a conductor through-hole C201 and the other end is provided with an isolating through-hole S211. The positive and negative electrode plates are cross laminated, and an isolator plate I101 is installed between each two neighboring electrode plates of different polarity. The positive electrode conductor rod B101 and the negative electrode conductor rod B201 are respectively inserted through the aforesaid conductor through-holes and joined with electrode plates of the same polarity for parallel combination current collection, or with electrode plates having different polarities for series combination. As a result, the electric current on the electrode plate is either the output current flowing from the surrounding area in multiple circuits to the conductor rod for collected output, or the input current diffused from the conductor rod to the surrounding area in multiple circuits, thereby reducing the internal resistance.

Figure 59:
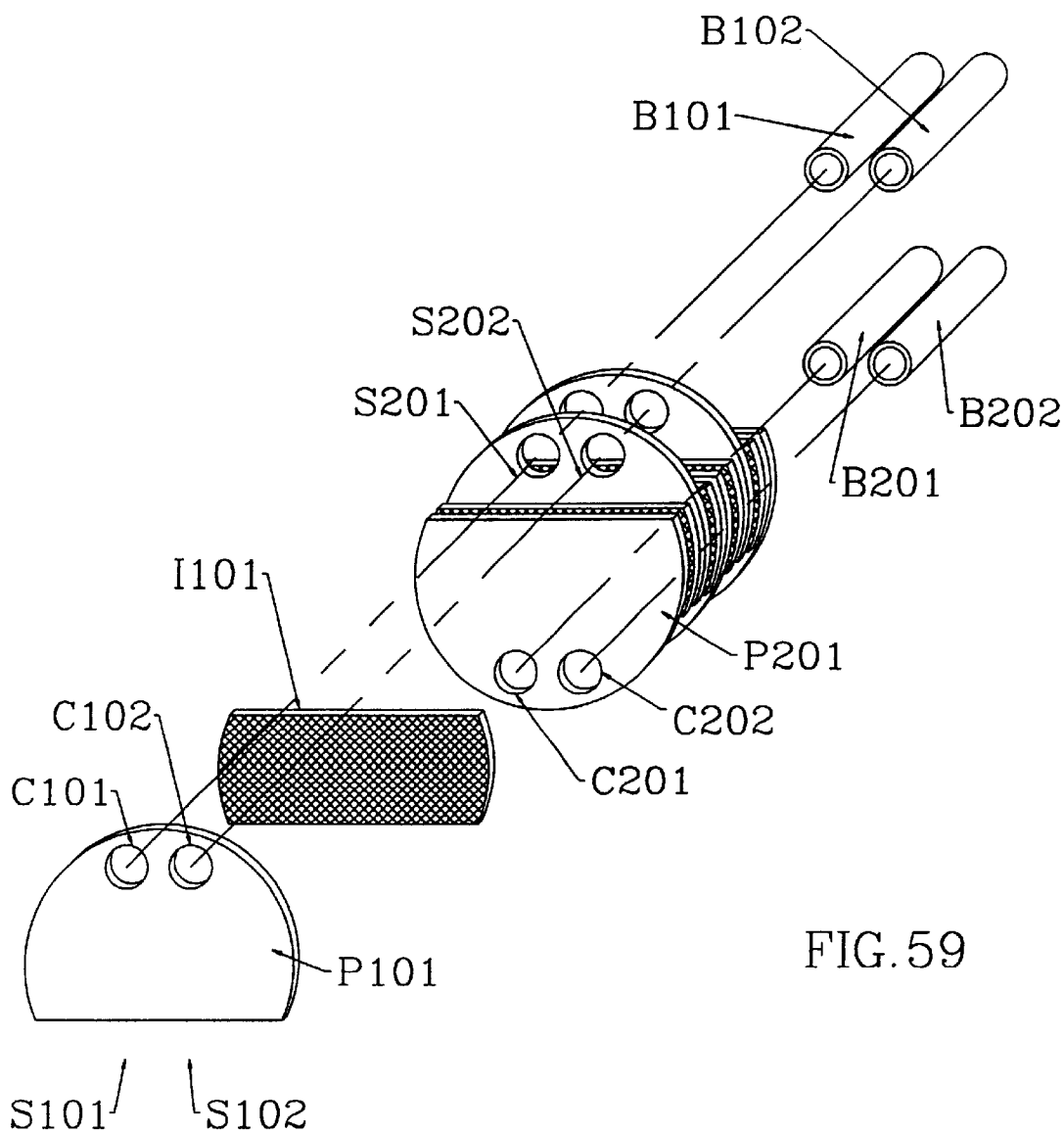
FIG. 59 is an exploded isometric view of an embodiment of the invention in which circular or partially circular electrode plates of different polarities are respectively installed with two in-line conductor through-holes and an isolating space at the exterior sides of plates.
Figure 60:
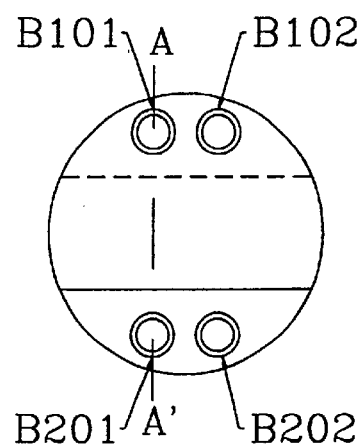
FIG. 60 is a front view of the embodiment of FIG. 59.
Figure 61:
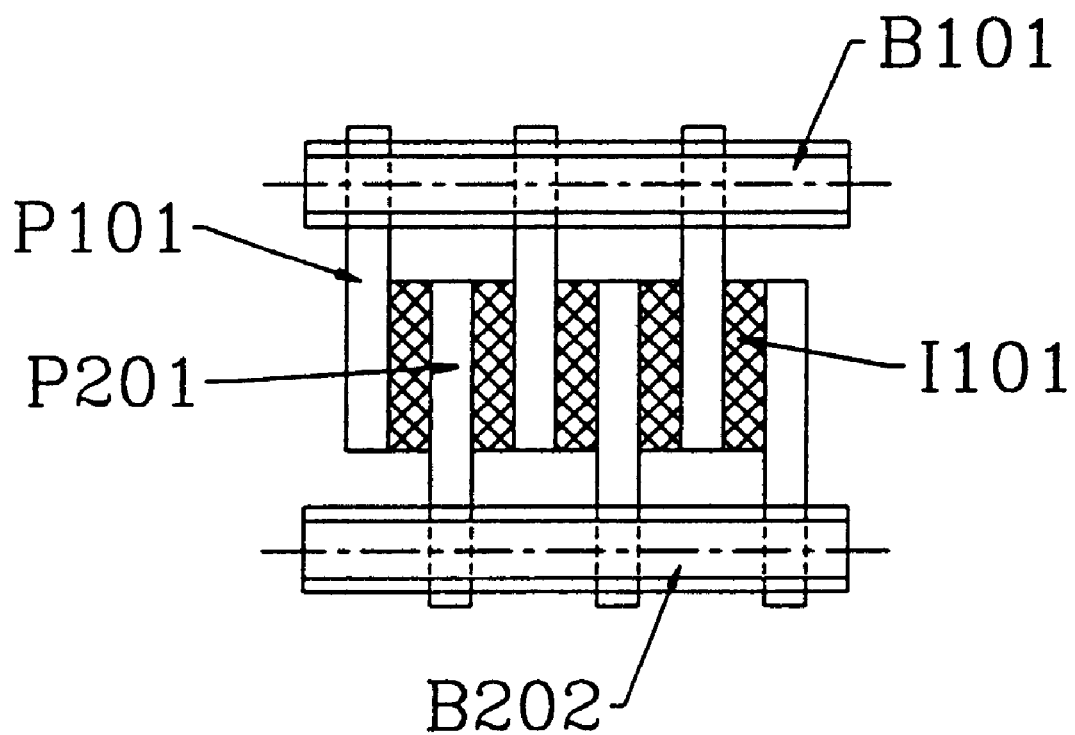
FIG. 61 is the A–A' sectional view of FIG. 60.

3) In the embodiment illustrated in FIGS. 59–61, exterior ends of the circular or quasi-circular positive electrode plates P101 of the electricity storage and discharge device are respectively cross installed with two neighboring conductor through-holes C101, C102 as well as respectively cross installed with two isolating spaces S101, S102, while exterior ends of the circular or quasi-circular negative electrode plates P201 are respectively cross installed with two neighboring conductor through-holes C201, C202 as well as respectively cross installed with two isolating spaces S201, S202. The positive and negative electrode plates are cross laminated, and an isolator plate I101 is installed between each two neighboring electrode plates of different polarity. The positive electrode conductor rods B101, B102 and the negative electrode conductor rods B201, B202 are respectively inserted through the aforesaid conductor through-holes and joined with electrode plates of the same polarity for parallel combination current collection, or with electrode plates having different polarities for series combination. As a result, the electric current on the electrode plate is either the output current flowing from the surrounding area in multiple circuits to the conductor rod for collected output, or the input current diffused from the conductor rod to the surrounding area in multiple circuits, thereby reducing the internal resistance.

Figure 62:
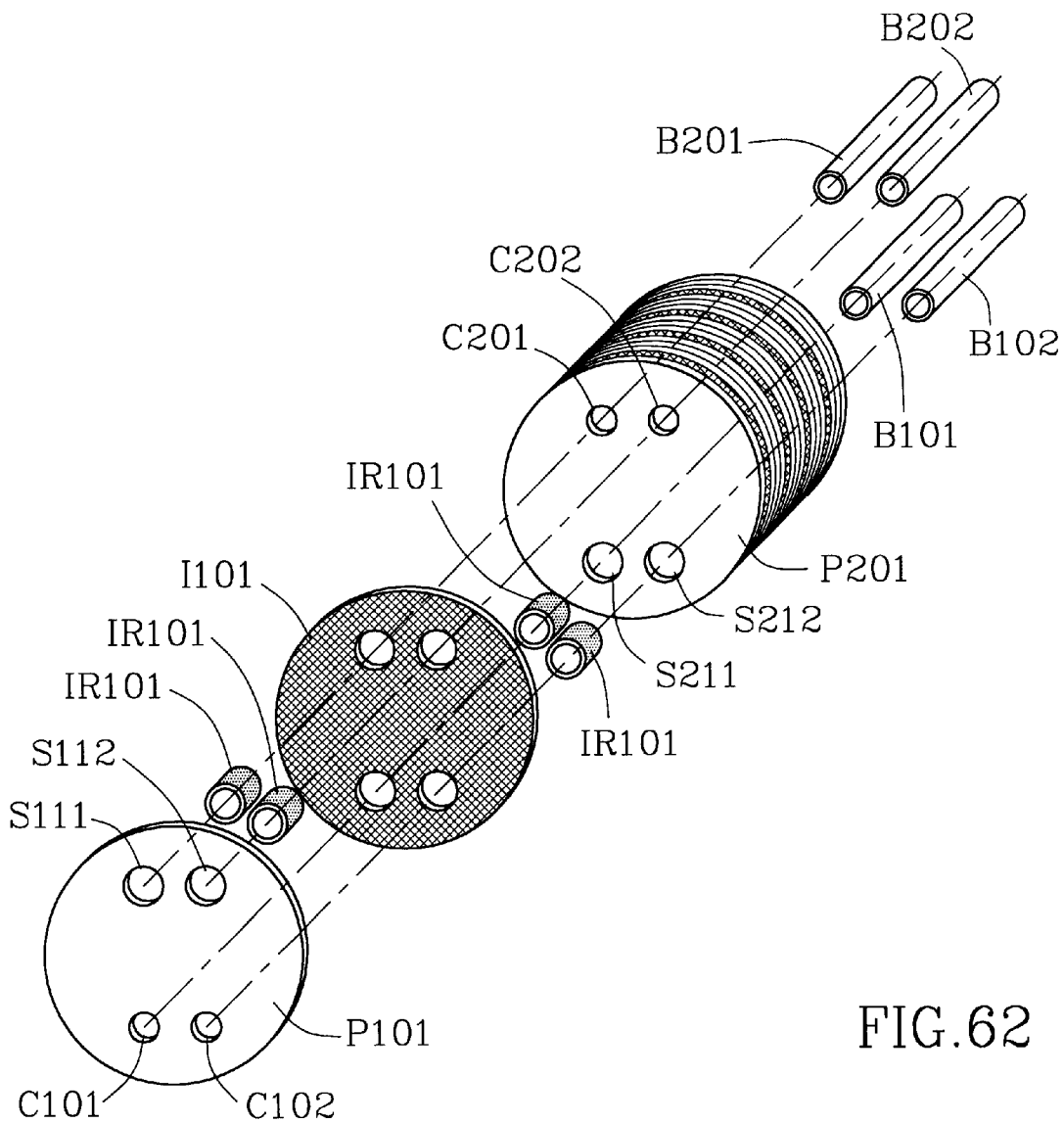
FIG. 62 is an exploded isometric view of an embodiment of the invention in which circular or partially circular electrode plates of different polarities are respectively installed with two in-line conductor through-holes and an isolating space at the exterior sides of plates.
Figure 63:
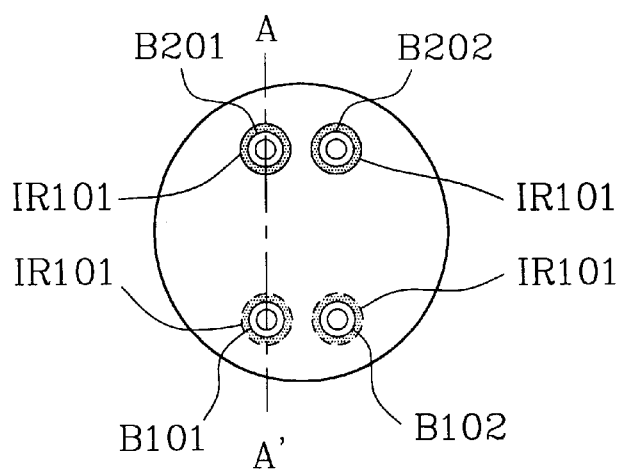
FIG. 63 is a front view of the embodiment of FIG. 59.
Figure 64:
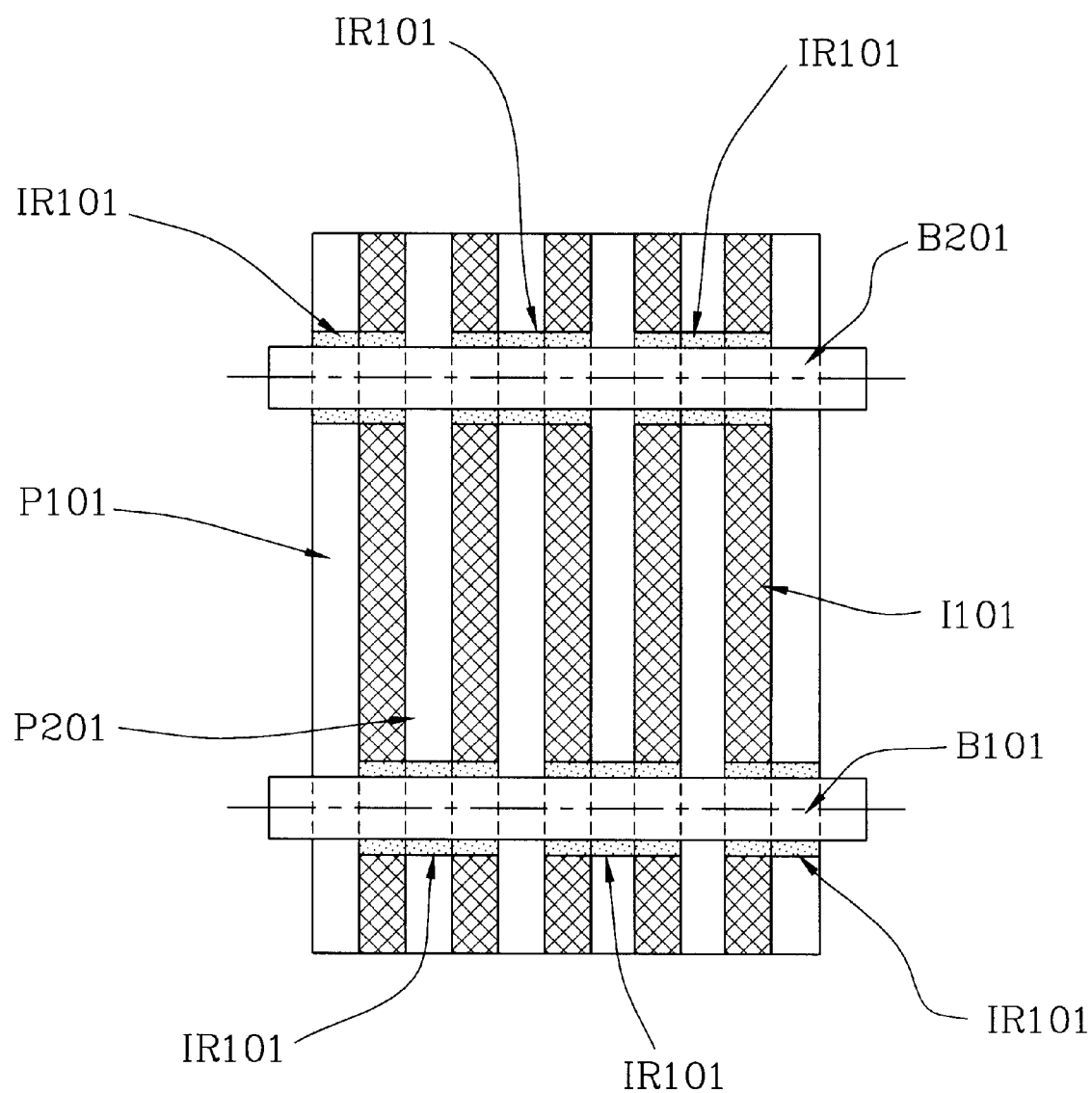
FIG. 64 is the A–A' sectional view of FIG. 60.
Figure 65:
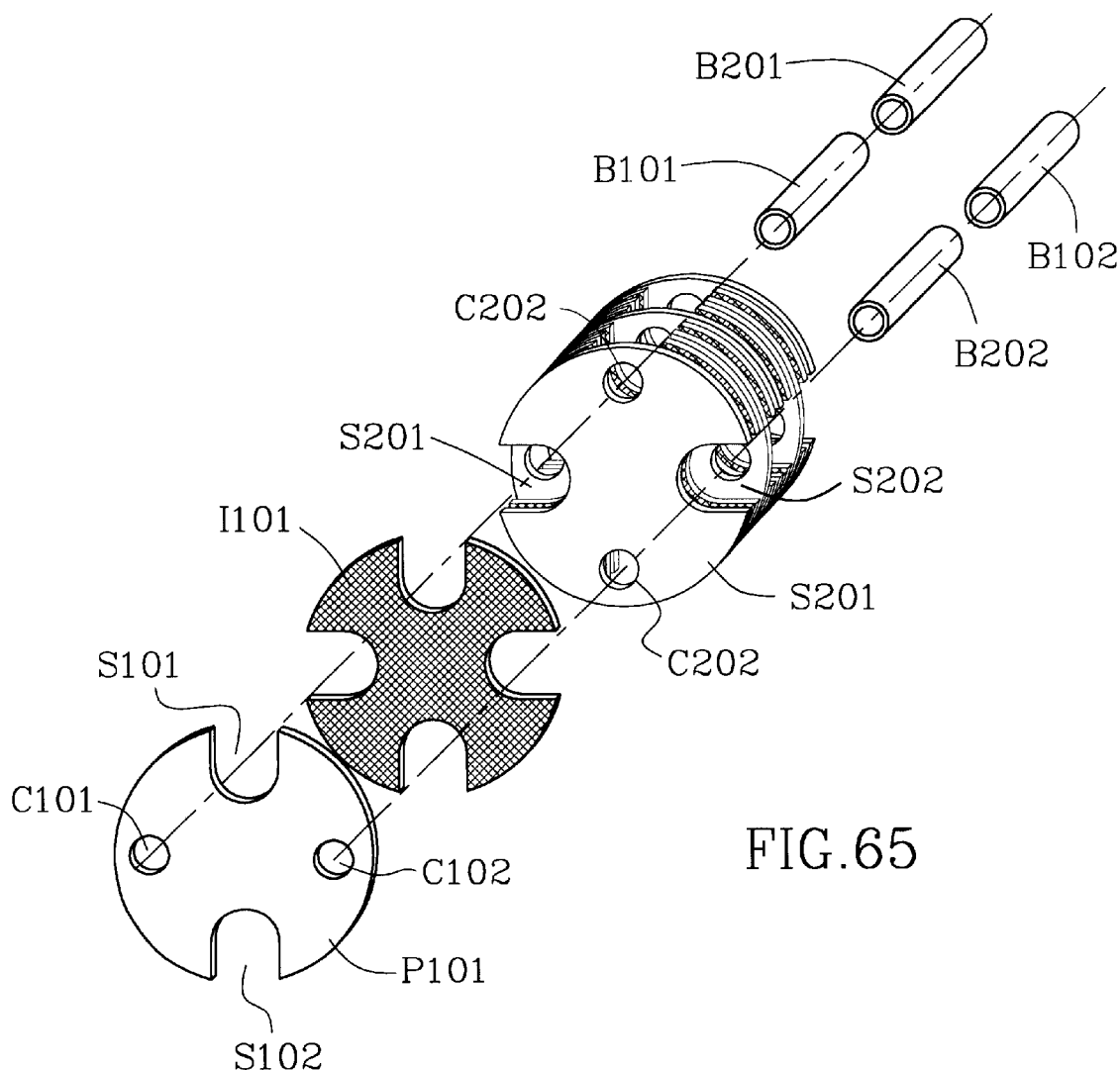
FIG. 65 is an exploded isometric view of an embodiment of the invention in which circular or partially circular electrode plates of different polarities are respectively inter-cross installed with two conductor through-holes and two isolating notches at the exterior sides of plates.
Figure 66:
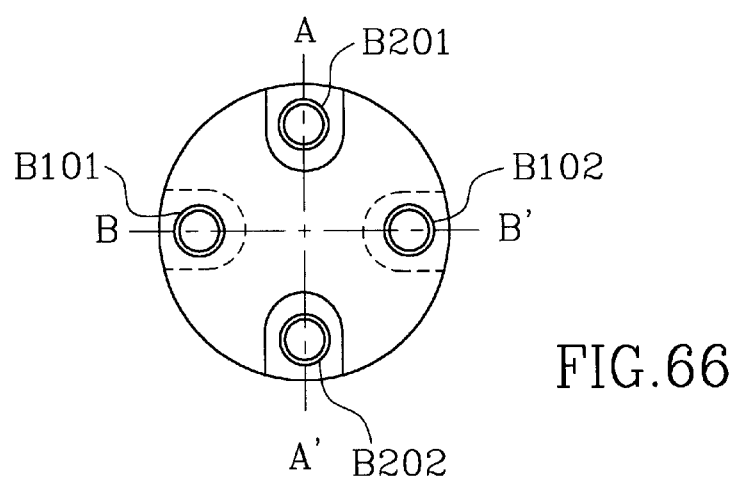
FIG. 66 is a front view of the embodiment of FIG. 65.
Figure 67:
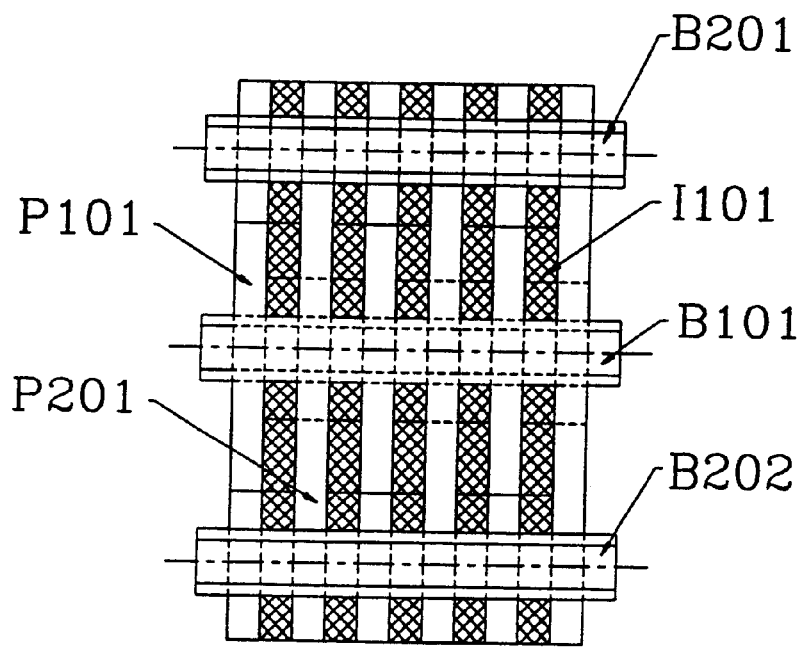
FIG. 67 is the A–A' sectional view of FIG. 66.
Figure 68:
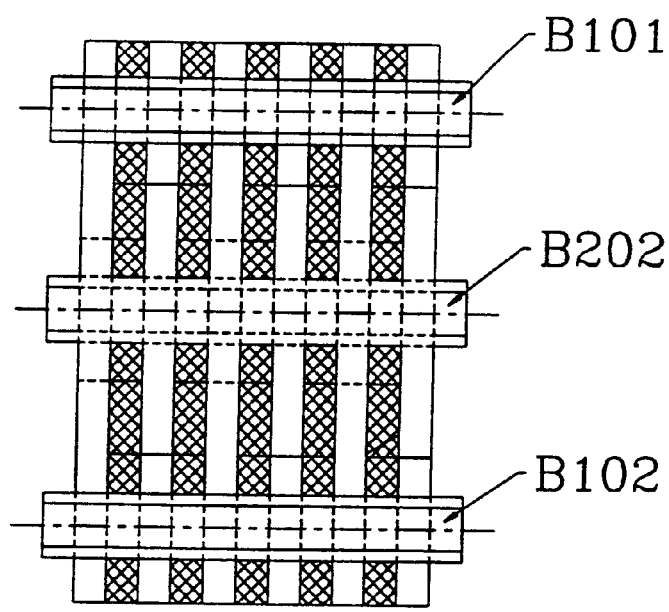
FIG. 68 is the B–B' sectional view of FIG. 66.
Figure 69:
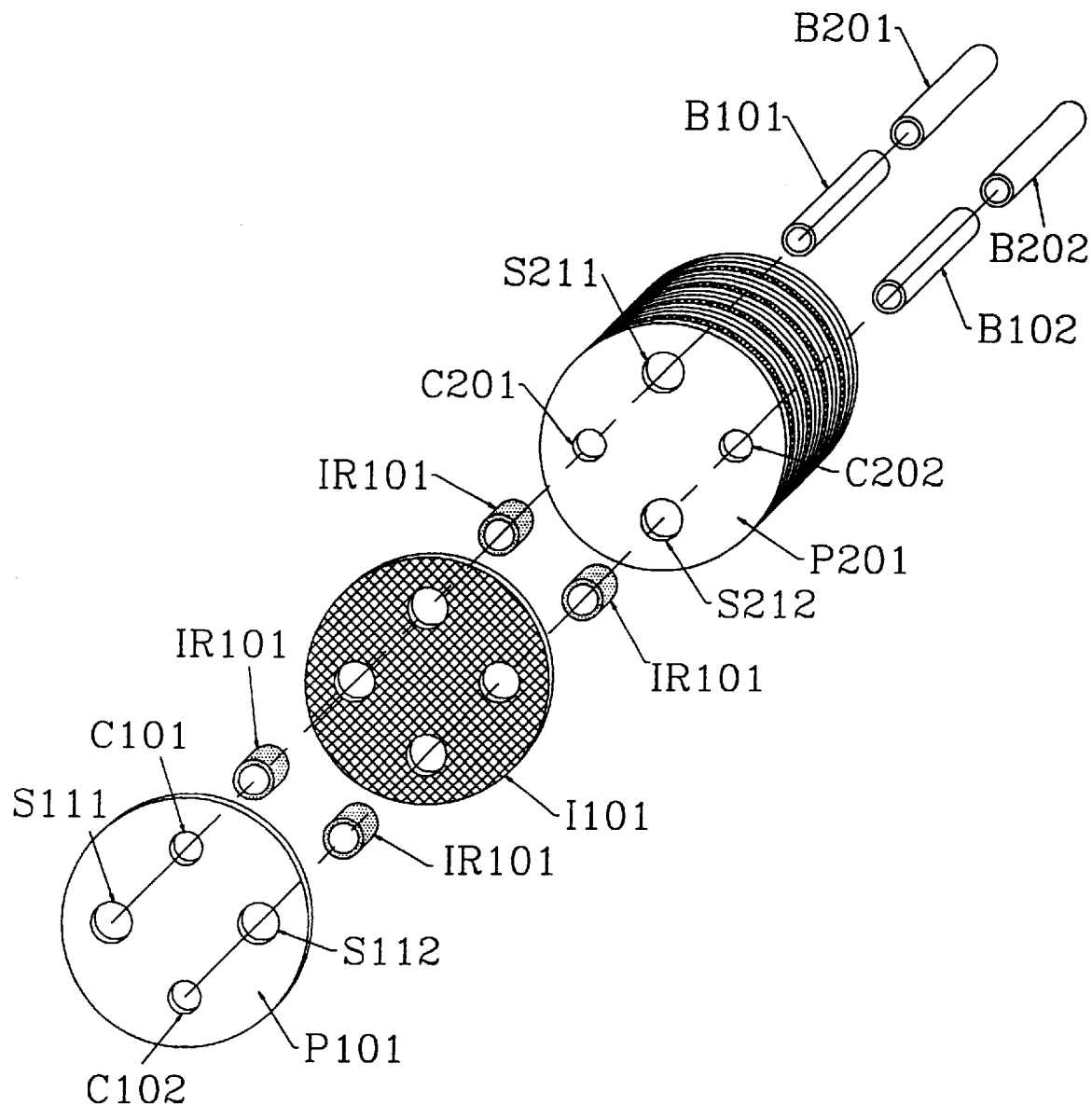
FIG. 69 is an exploded isometric view of an embodiment of the invention in which circular or partially circular electrode plates of different polarities are respectively inter-cross installed with two conductor through-holes and two isolating through-holes near to the plate central region.
Figure 70:
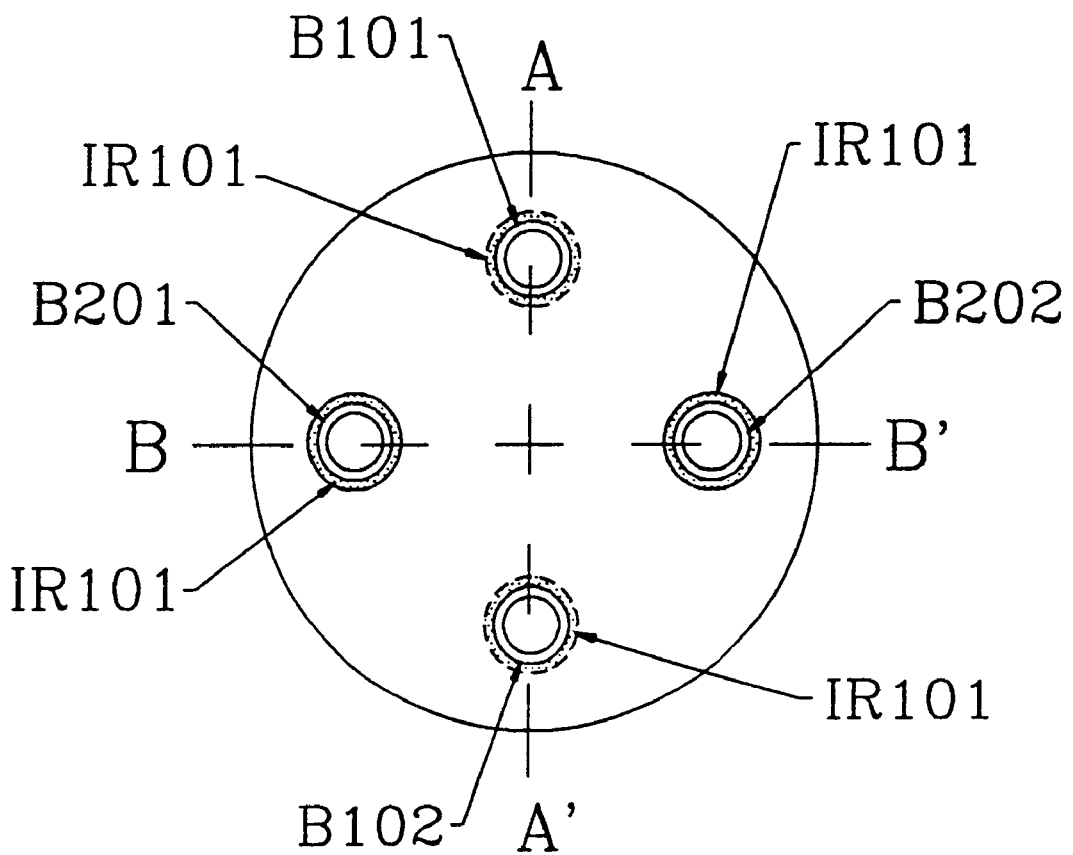
FIG. 70 is a front view of the embodiment of FIG. 69.
Figure 71:
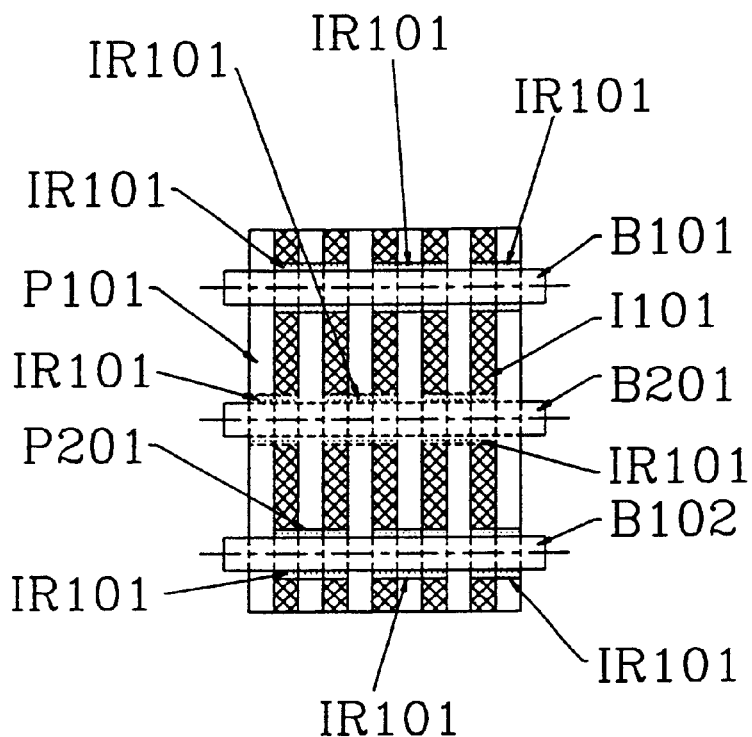
FIG. 71 is the A–A' sectional view of FIG. 70.
Figure 72:
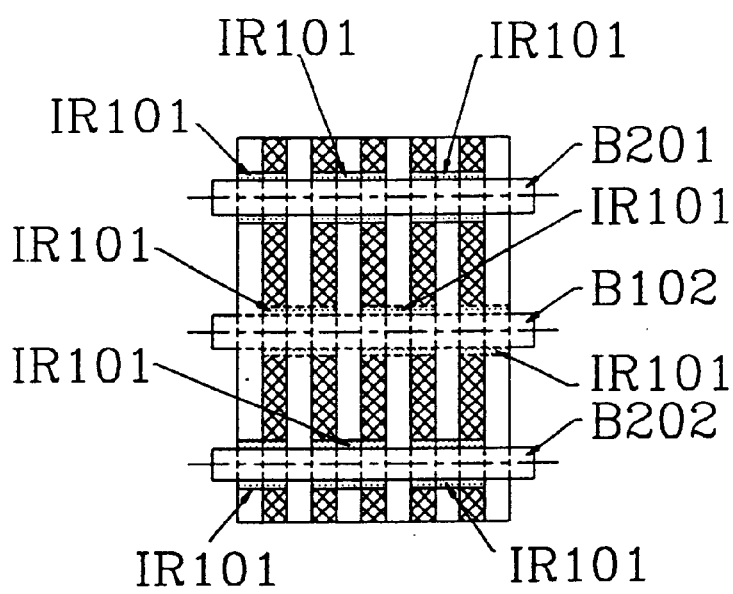
FIG. 72 is the B–B' sectional view of FIG. 70.

4) In the embodiment illustrated in FIGS. 62–64, exterior ends of the circular or quasi-circular positive electrode plates P101 of the electricity storage and discharge device are respectively cross installed with two conductor through-holes C101, C102 as well as respectively cross installed with two neighboring isolating through-holes S111, S112, while exterior ends of the circular or quasi-circular negative electrode plates P201 are respectively cross installed with two conductor through-holes C201, C202 as well as respectively cross installed with two neighboring isolating through-holes S211, S212. The positive and negative electrode plates are cross laminated, and an isolator plate I101 is installed between each two neighboring electrode plates of different polarity. The positive electrode conductor rods B101, B102 and the negative electrode conductor rods B201, B202 are respectively inserted through the aforesaid conductor through-holes and joined with electrode plates of the same polarity for parallel combination current collection, or with electrode plates having different polarities for series combinations. As a result, the electric current on the electrode plate is either the output current flowing from the surrounding area in multiple circuits to the conductor rod for collected output, or the input current diffused from the conductor rod to the surrounding area in multiple circuits, thereby reducing the internal resistance of the storage/discharge device.

5) In the embodiments illustrated in FIG. 65–68, exterior ends of the circular or quasi-circular positive electrode plates P101 of the electricity storage and discharge device are respectively cross installed with two conductor through-holes C101, C102 as well as respectively cross installed with two isolating notches S111, S112, while exterior ends of the circular or quasi-circular negative electrode plates P201 are respectively cross installed with two conductor through-holes C201, C202 as well as respectively cross installed with two isolating notches S211, S212. The positive and negative electrode plates are cross laminated, and an isolator plate I101 is installed between each two neighboring electrode plates of different polarity. The positive electrode conductor rods B101, B102 and the negative electrode conductor rods B201, B202 are respectively inserted through the aforesaid conductor through-holes and joined with electrode plates of the same polarity for parallel combination current collection, or with electrode plates having different polarities for series combination. As a result, the electric current on the electrode plate is either the output current flowing from the surrounding area in multiple circuits to the conductor rod for collected output, or the input current diffused from the conductor rod to the surrounding area in multiple circuits, thereby reducing the internal resistance of the storage/discharge device.

6) In the embodiment illustrated in FIGS. 69–72, exterior ends of the circular or quasi-circular positive electrode plates P101 of the electricity storage and discharge device are respectively cross installed with two conductor through-holes C101, C102 as well as respectively cross installed with two isolating through-holes S111, S112, while exterior ends of the circular or quasi-circular negative electrode plates P201 are respectively cross installed with two conductor through-holes C201, C202 as well as respectively cross installed with two isolating through-holes S211, S212. The positive and negative electrode plates are cross laminated, and an isolator plate I101 is installed between each two neighboring electrode plates of different polarity. The positive electrode conductor rods B101, B102 and the negative electrode conductor rods B201, B202 are respectively inserted through the aforesaid conductor through-holes and joined with electrode plates of the same polarity for parallel combination current collection, or with electrode plates having different polarities for series combination. As a result, the electric current on the electrode plate is either the output current flowing from the surrounding area in multiple circuits to the conductor rod for collected output, or the input current diffused from the conductor rod to the surrounding area in multiple circuits, thereby reducing the internal resistance of the storage/discharge device.

E. The fifth group of embodiments include embodiments in which the exterior ends of symmetrical or quasi-symmetrical electrode plates are respectively symmetrically installed with current conductor through-holes.

Figure 73:
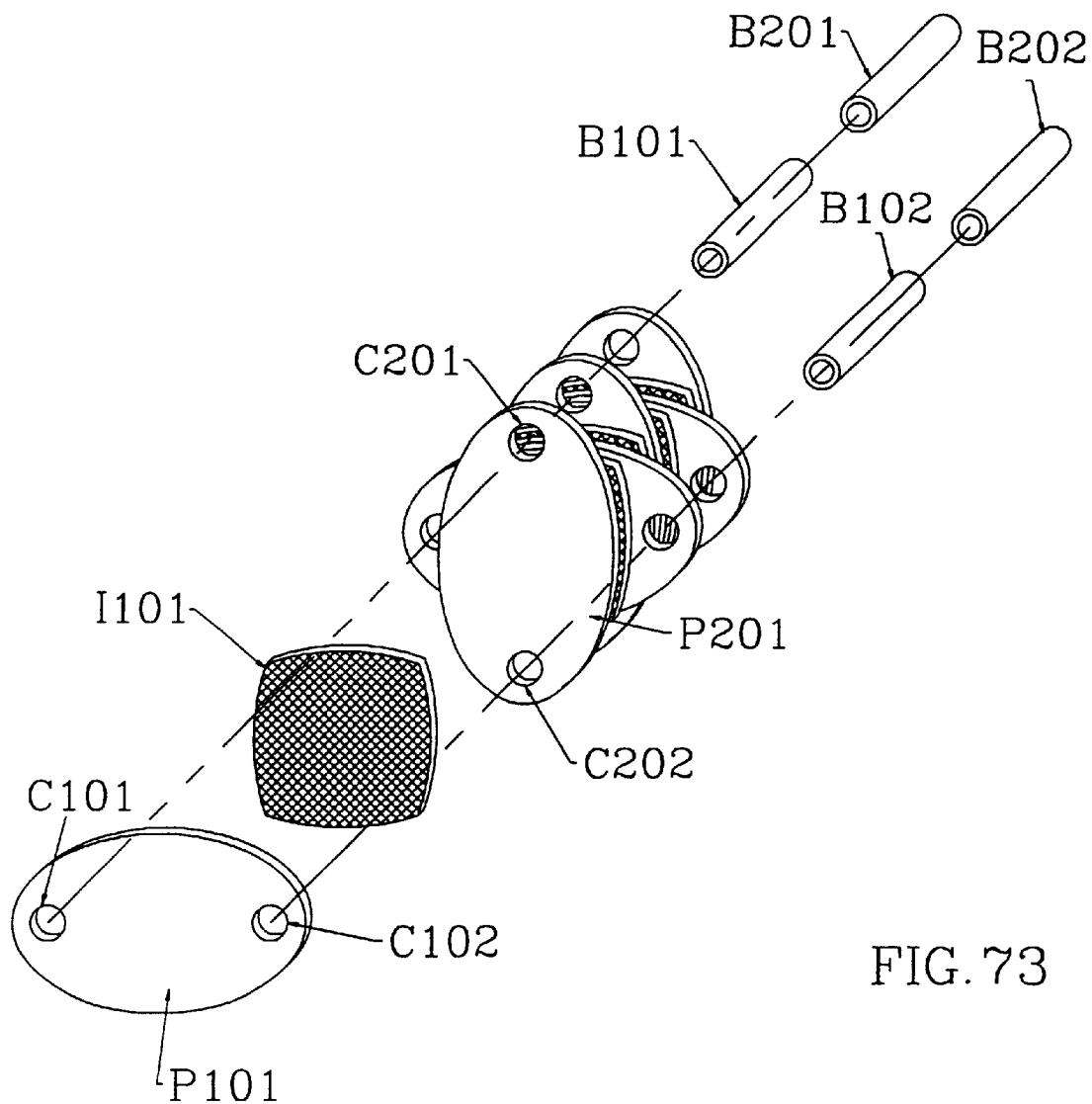
FIG. 73 is an exploded isometric view of an embodiment of the invention in which two symmetrical extreme ends of elliptical or partially elliptical electrode plates are respectively installed with a conductor through-hole.
Figure 74:
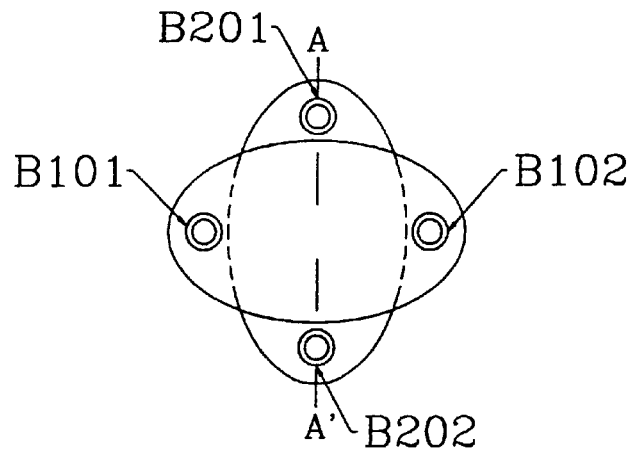
FIG. 74 is a front view of the embodiment of FIG. 73.
Figure 75:
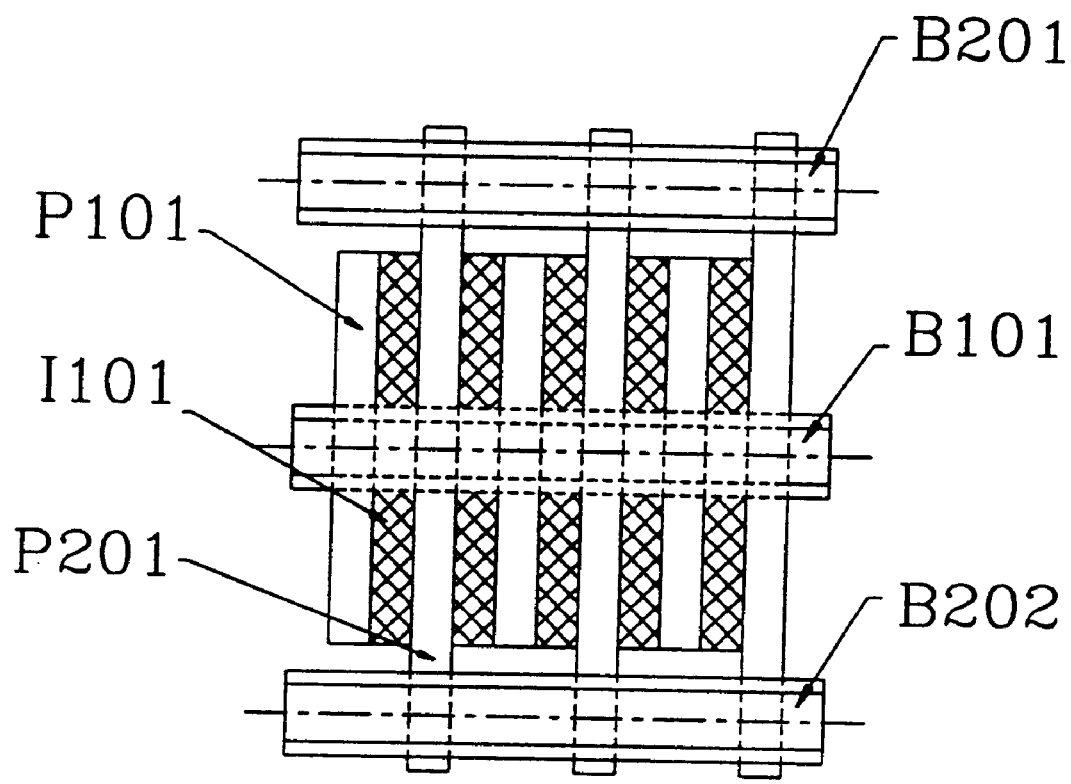
FIG. 75 is the A–A' sectional view of FIG. 74.

1) In the embodiment illustrated in FIGS. 73–75, two symmetrical exterior ends of the positive electrode plates P101 of the electricity storage and discharge device are respectively installed with conductor through-holes C101, C102, while the two symmetrical exterior ends of negative electrode plates P201 are respectively installed with conductor through-holes C201, C202. The aforesaid elliptical or quasi-elliptical electrode plates of different polarities are cross laminated, whereby an isolating space is formed by the non-laminated regions between the two neighboring laminated electrode plates, and an isolator plate I101 is installed between each two neighboring electrode plates of different polarity. The positive electrode conductor rods B101, B102 and the negative electrode conductor rods B201, B202 are respectively inserted through the aforesaid conductor through-holes and joined with electrode plates having the same polarity for parallel combination current collection, or with electrode plates having different polarities for series combinations.

Figure 76:
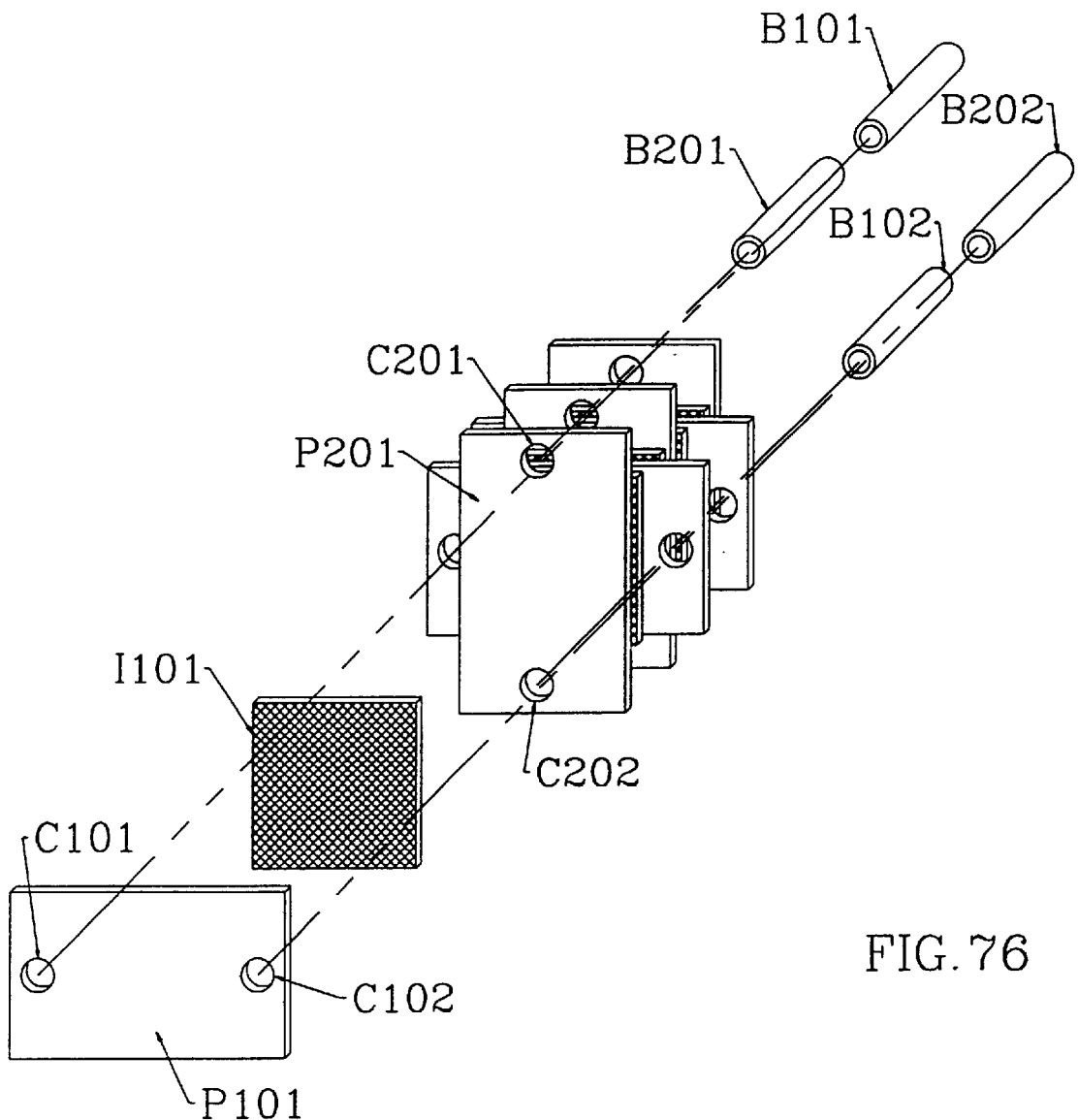
FIG. 76 is an exploded isometric view of an embodiment of the invention in which two symmetrical extreme ends of rectangular or partially rectangular electrode plates are respectively installed with a conductor through-hole.
Figure 77:
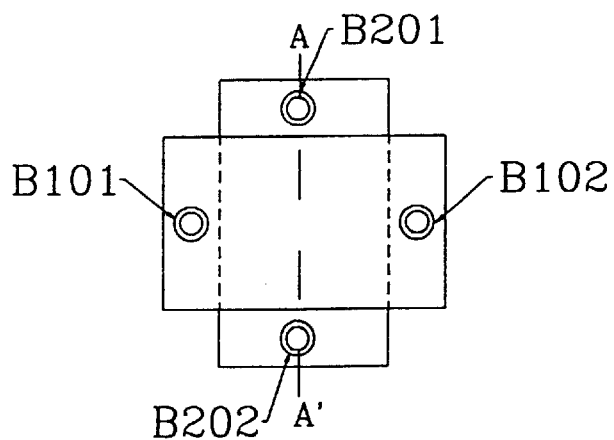
FIG. 77 is a front view of the embodiment of FIG. 76.
Figure 78:
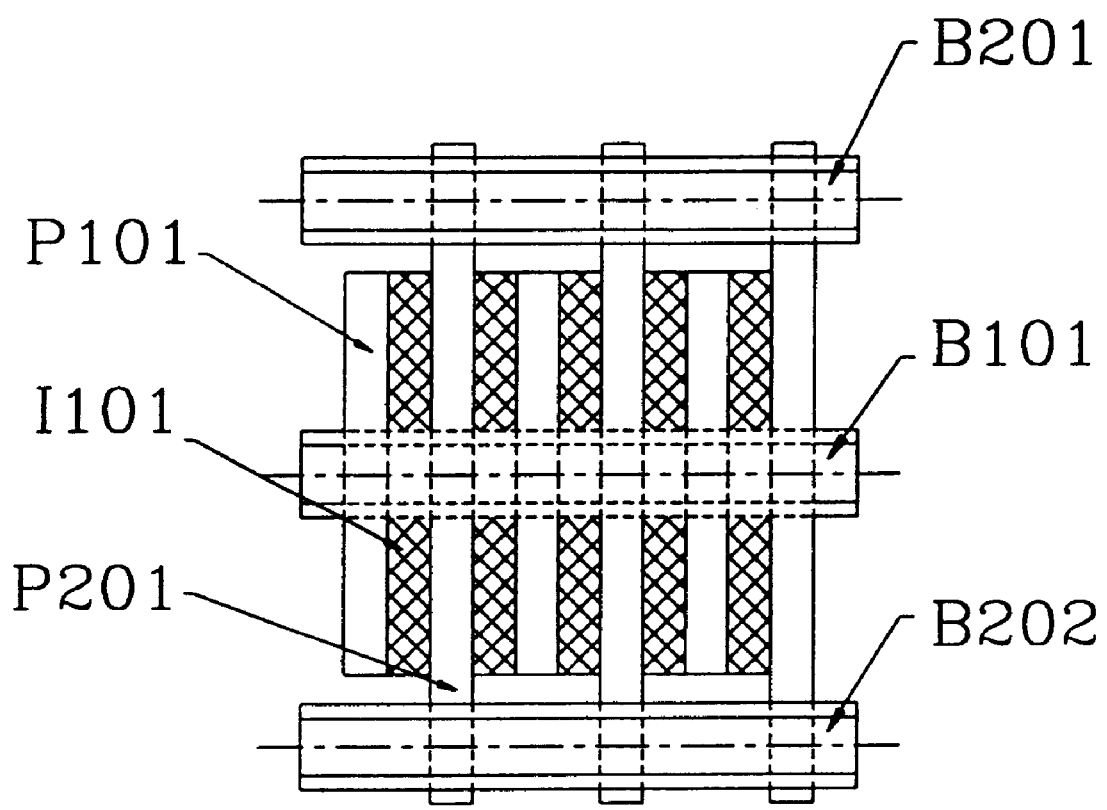
FIG. 78 is the A–A' sectional view of FIG. 76.

2) In the embodiment illustrated in FIGS. 76–78, two symmetrical exterior ends of the positive electrode plates P101 of the electricity storage and discharge device are respectively installed with conductor through-holes C101, C102, while the two symmetrical exterior ends of negative electrode plates P201 are respectively installed with conductor through-holes C201, C202. The aforesaid rectangular or quasi-rectangular electrode plates of different polarities are cross laminated, whereby an isolating space is formed by the non-laminated regions between the two neighboring laminated electrode plates and an isolator plate I101 is installed between the two neighboring electrode plates of different polarities. The positive electrode conductor rods B101, B102 and the negative electrode conductor rods B201, B202 are respectively inserted through the aforesaid conductor through-holes and joined with electrode plates of the same polarity for parallel combination current collection, or with electrode plates having different polarities for series combination.

Figure 79:
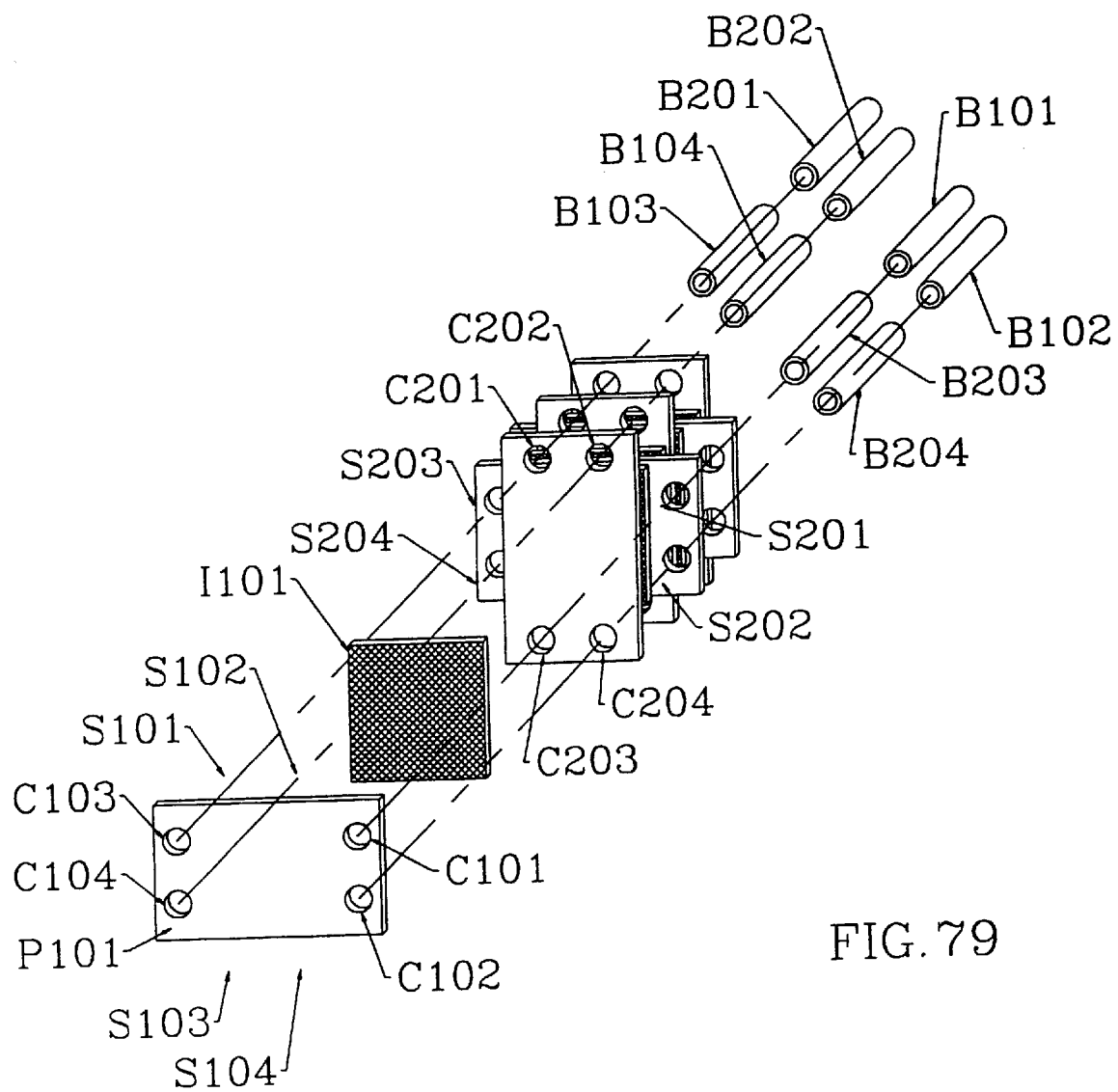
FIG. 79 is an exploded isometric view of an embodiment of the invention in which two symmetrical exterior sides of rectangular or partially rectangular electrode plates are respectively installed with two in-line conductor through-holes.
Figure 80:
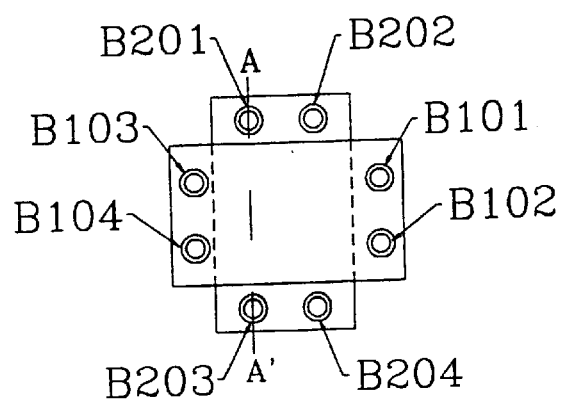
FIG. 80 is a front view of the embodiment of FIG. 79.
Figure 81:
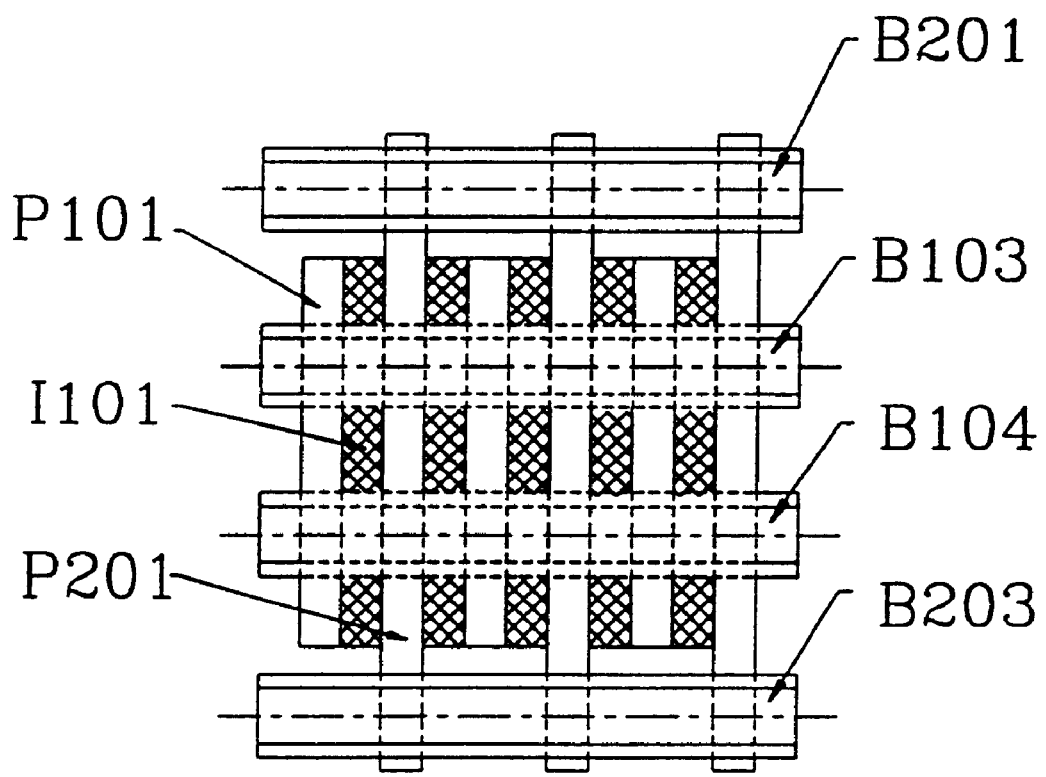
FIG. 81 is the A–A' sectional view of FIG. 80.

3) In the embodiment illustrated in FIGS. 79–81, two symmetrical exterior ends of the positive electrode plates P101 of the electricity storage and discharge device are respectively installed with two neighboring conductor through-holes C101, C102, C103, C104, while the two symmetrical exterior ends of negative electrode plates P201 are respectively installed with two neighboring conductor through-holes C201, C202, C203, C204. The aforesaid rectangular or quasi-rectangular electrode plates of different polarities are cross laminated, whereby an isolating space is formed by the non-laminated regions between the two neighboring laminated electrode plates and an isolator plate I101 is installed between the two neighboring electrode plates of different polarity. The positive electrode conductor rods B101, B102, B103, B104 and the negative electrode conductor rods B201, B202, B203, B204 are respectively inserted through the aforesaid conductor through-holes and joined with electrode plates of the same polarity for parallel combination current collection, or with electrode plates having different polarities for series combination.

Figure 82:
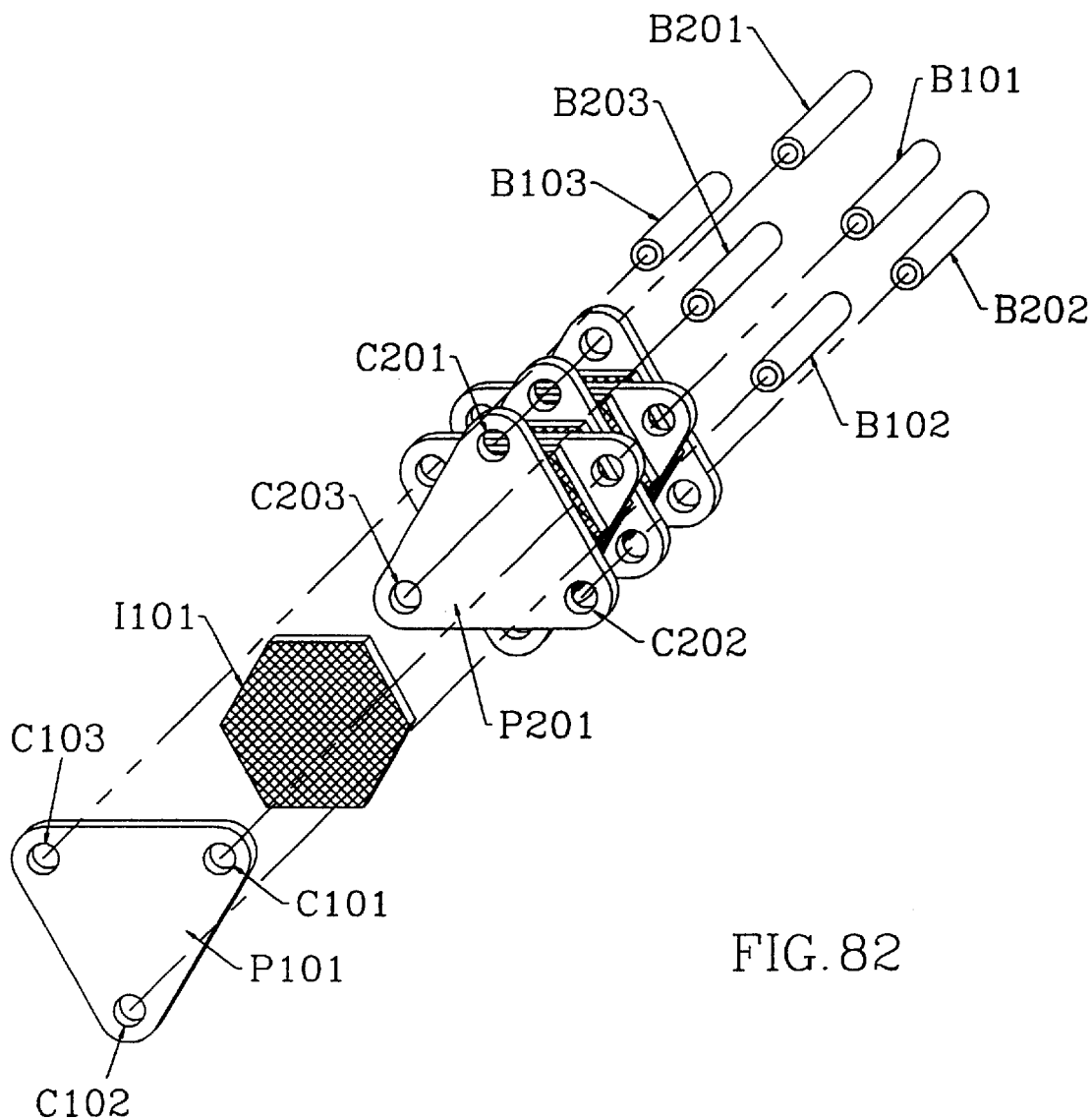
FIG. 82 is an exploded isometric view of an embodiment of the invention in which three sides of triangular or partially triangular electrode plates are respectively installed with a conductor through-hole.
Figure 83:
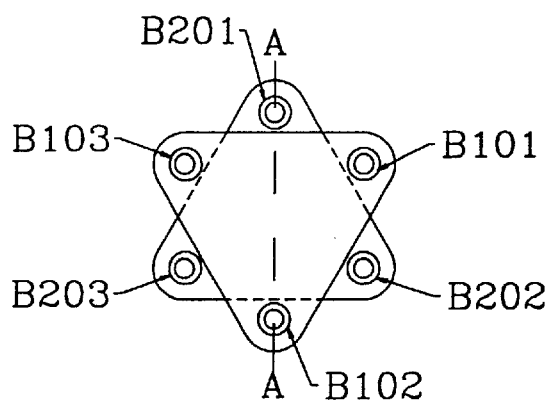
FIG. 83 is a front view of the embodiment of FIG. 82.
Figure 84:
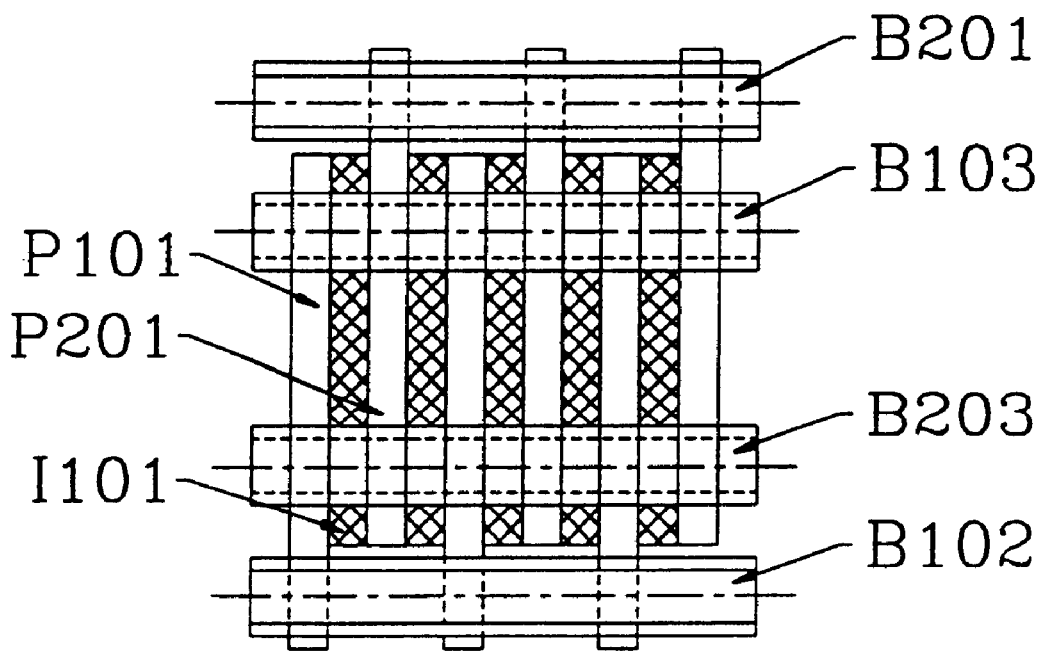
FIG. 84 is the A–A' sectional view of FIG. 83.

4) In the embodiment illustrated in FIGS. 82–84, the exterior sides of the triangular positive electrode plates P101 of the electricity storage and discharge device are respectively installed with conductor through-holes C101, C102, C103 while the exterior sides of the triangular negative electrode plates P201 are respectively installed with conductor through-holes C201, C202, C203. The aforesaid triangular or quasi-triangular electrode plates of different polarity are cross laminated, whereby an isolating space is formed by the non-laminated regions between the two neighboring laminated electrode plates and an isolator plate I101 is installed between the two neighboring electrode plates of different polarity. The positive electrode conductor rods B101, B102, B103 and the negative electrode conductor rods B201, B202, B203 are respectively inserted through the aforesaid conductor through-holes and joined with electrode plates of the same polarity for parallel combination current collection, or with electrode plates having different polarities for series combination.

Figure 85:
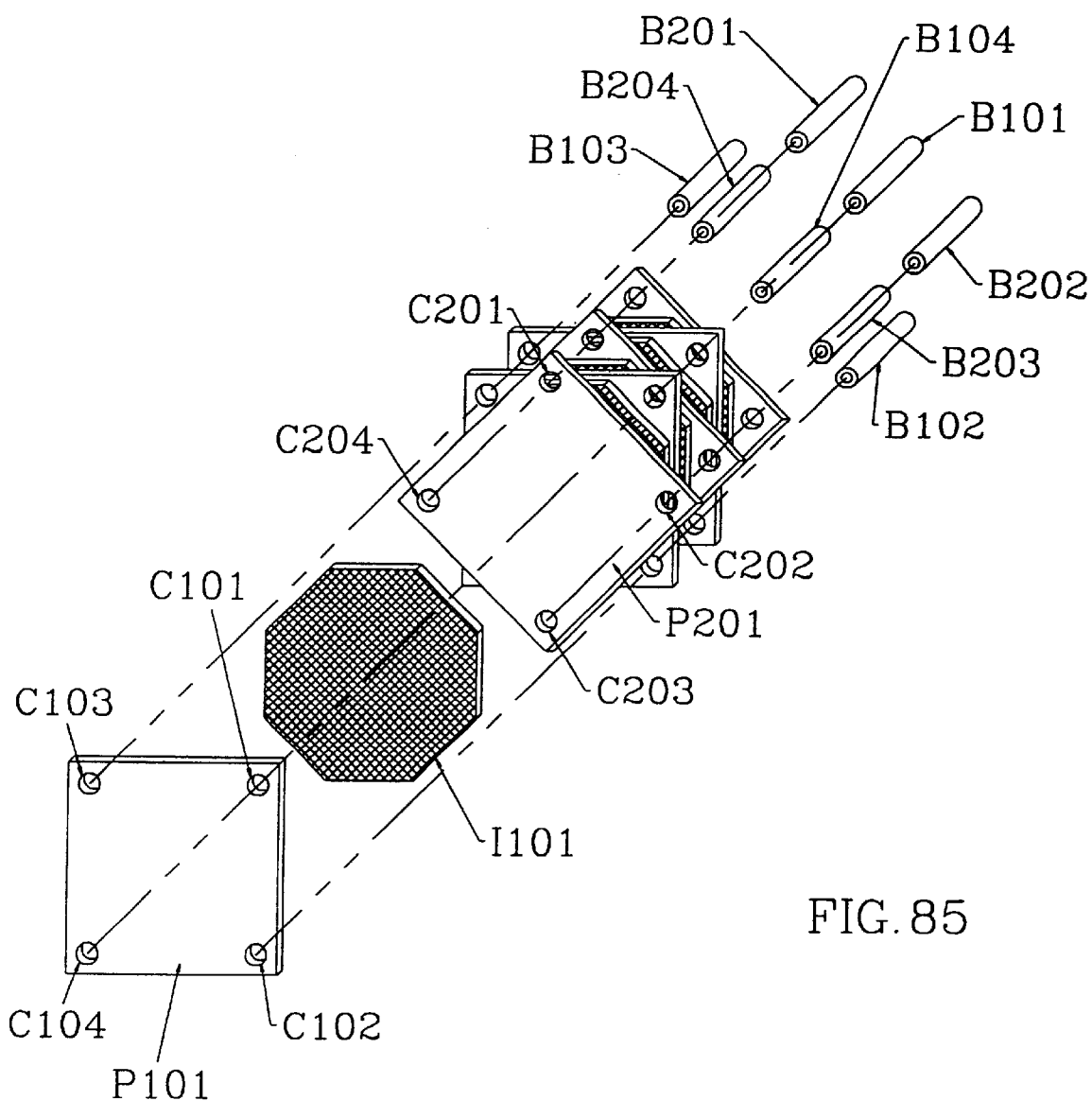
FIG. 85 is an exploded isometric view of an embodiment of the invention in which four exterior sides of symmetrical quadrilateral or partially quadrilateral electrode plates are respectively installed with a conductor through-hole.
Figure 86:
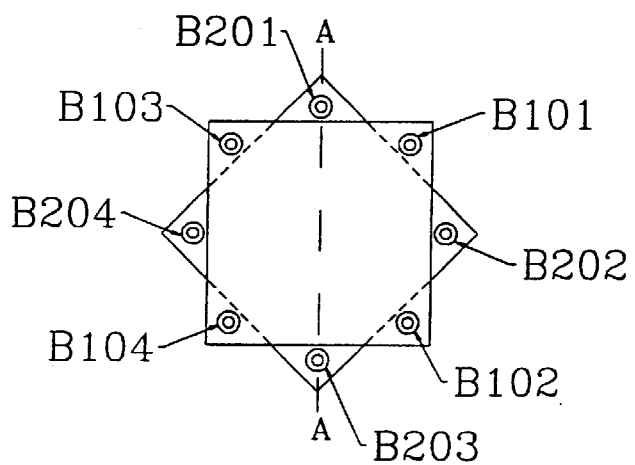
FIG. 86 is a front view of the embodiment of FIG. 85.
Figure 87:
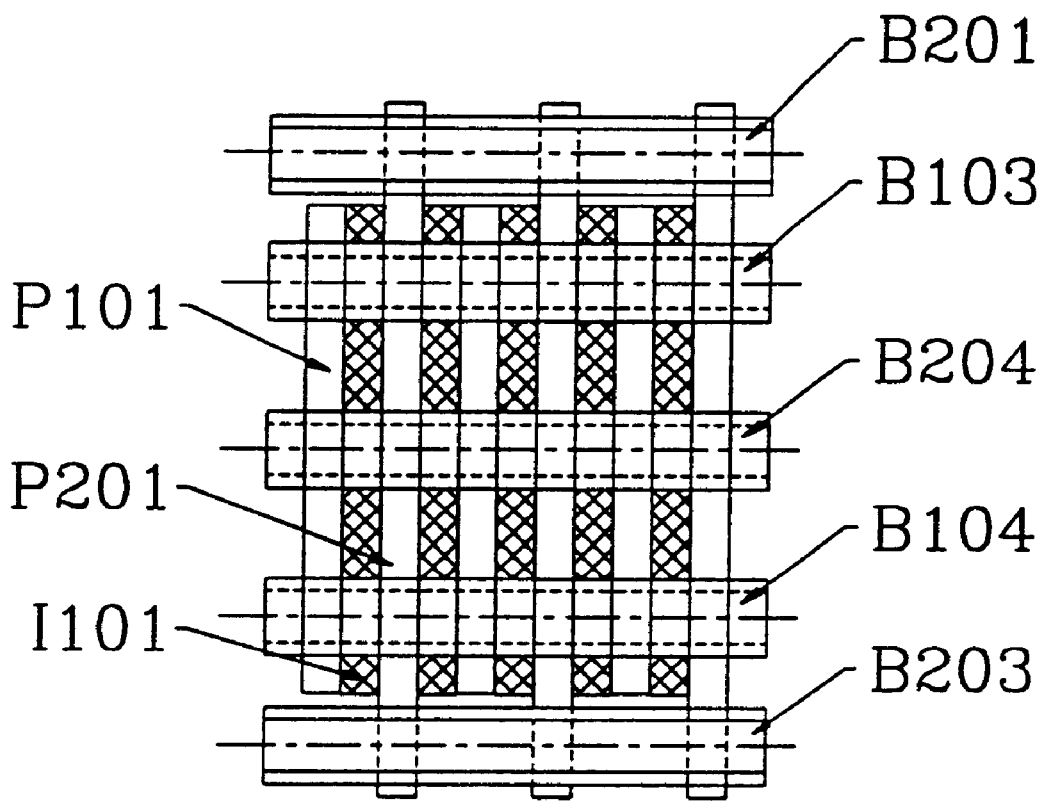
FIG. 87 is the A–A' sectional view of FIG. 86.
Figure 88:
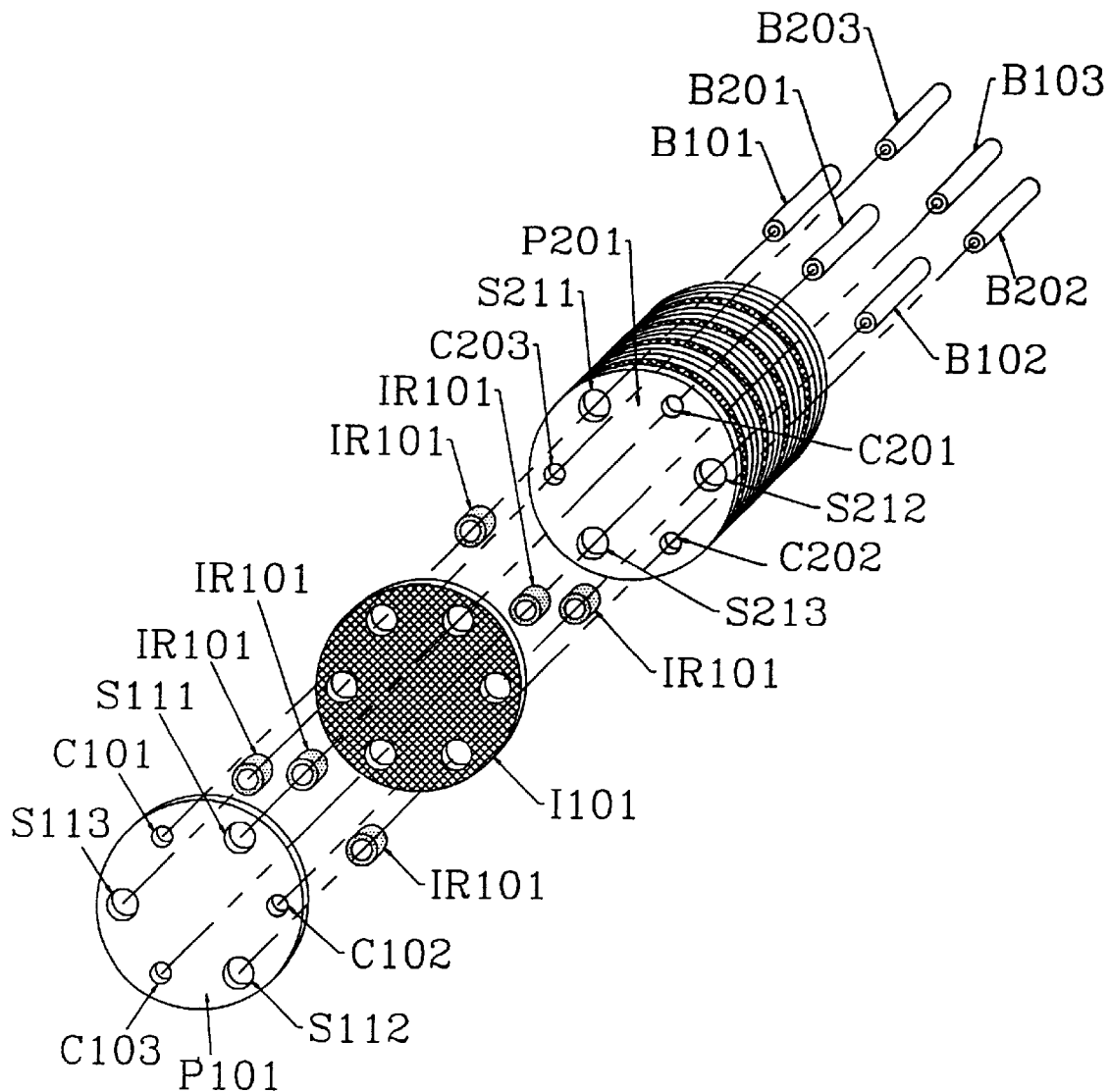
FIG. 88 is an exploded isometric view of an embodiment of the invention in which the exterior sides of circular or partially circular electrode plates are respectively intercross installed with conductor through-holes and isolating through-holes.
Figure 89:
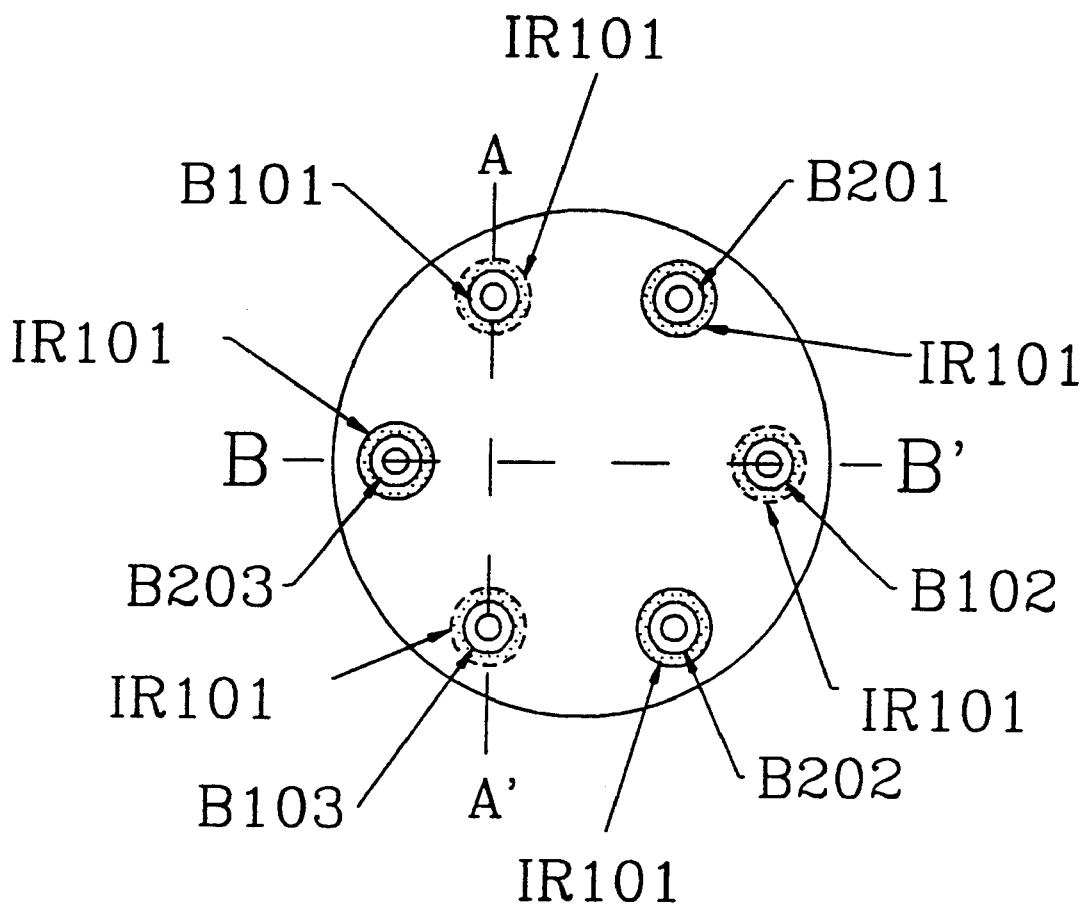
FIG. 89 is a front view of the embodiment of FIG. 88.
Figure 90:
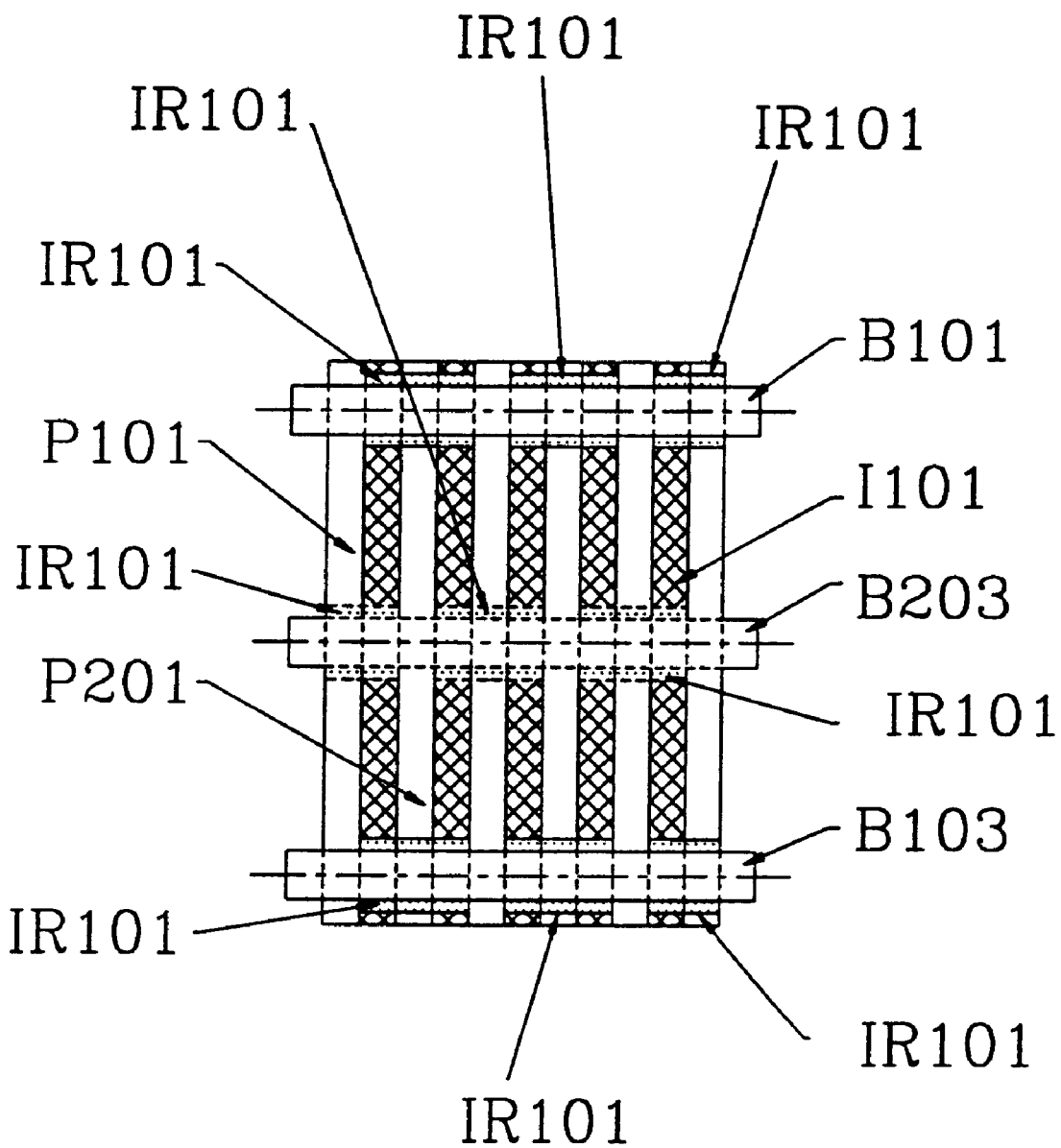
FIG. 90 is the A–A' sectional view of FIG. 89.
Figure 91:
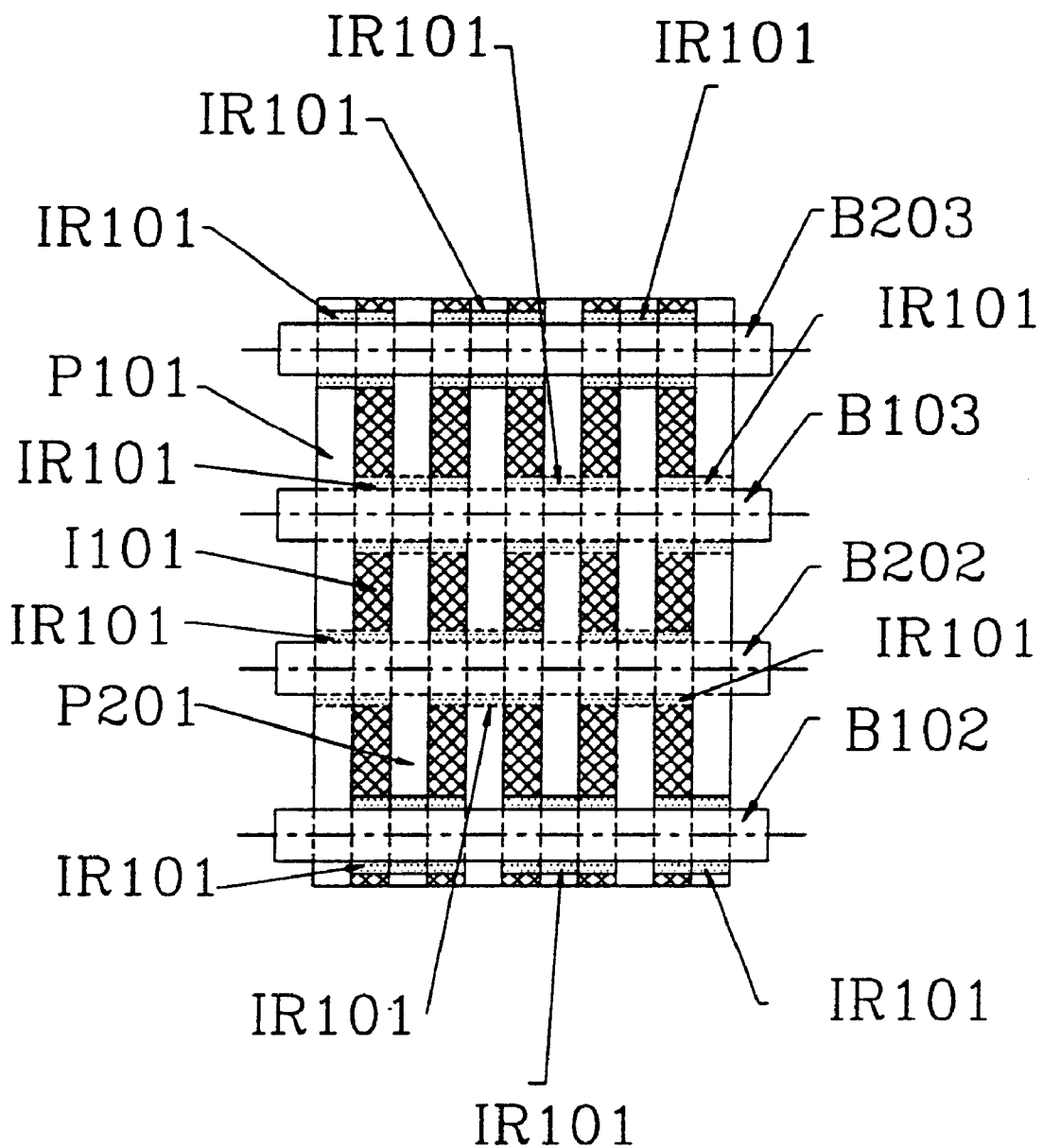
FIG. 91 is the B–B' sectional view of FIG. 89.

5) In the embodiment illustrated in FIGS. 85–87, the exterior sides of the symmetrical quadrilateral shape positive electrode plates P101 of the electricity storage and discharge device are respectively installed with conductor through-holes C101, C102, C103, C104 while the exterior ends of the quadrilateral shape negative electrode plates P201 are respectively installed with conductor through-holes C201, C202, C203, C204. The aforesaid electrode plates of different polarity are cross laminated, whereby an isolating space is formed by the non-laminated regions between the two neighboring laminated electrode plates and an isolator plate I101 is installed between the two neighboring electrode plates of different polarity. The positive electrode conductor rods B101, B102, B103, B104 and the negative electrode conductor rods B201, B202, B203, B204 are respectively inserted through the aforesaid conductor through-holes and joined with electrode plates of the same polarity for parallel combination current collection, or with electrode plates having different polarities for series combination.

6) In the embodiment illustrated in FIGS. 88–91, the exterior sides of the circular or quasi-circular positive electrode plates P101 of the electricity storage and discharge device are respectively cross installed with conductor through-holes C101, C102, C103, C104, C105, C106 as well as respectively cross installed with isolating through-holes S111, S112, S113, S114, S115, S116, while the exterior ends of the circular or quasi-circular negative electrode plates P201 are respectively cross installed with conductor through-holes C201, C202, C203, C204, C205 as well as respectively cross installed with isolating through-holes S211, S212, S213, S214, S215, S216. The aforesaid circular or quasi-circular electrode plates of different polarity are cross laminated, whereby an isolating space is formed by the non-laminated regions between the two neighboring laminated electrode plates and an isolator plate I101 is installed between the two neighboring electrode plates of different polarity. The positive electrode conductor rods B101, B102, B103, B104, B105, B106 and the negative electrode conductor rods B201, B202, B203, B204, B205, B206 are respectively inserted through the aforesaid conductor through-holes and joined with electrode plates of the same polarity for parallel combination current collection, or with electrode plates having different polarities for series combination. In this embodiment, each electrode plate preferably has two or more conductor through-holes and two or more isolating through-holes.

F. The sixth group of embodiments include embodiments in which the central region the electrode plate is installed with conductor through-holes.

Figure 92:
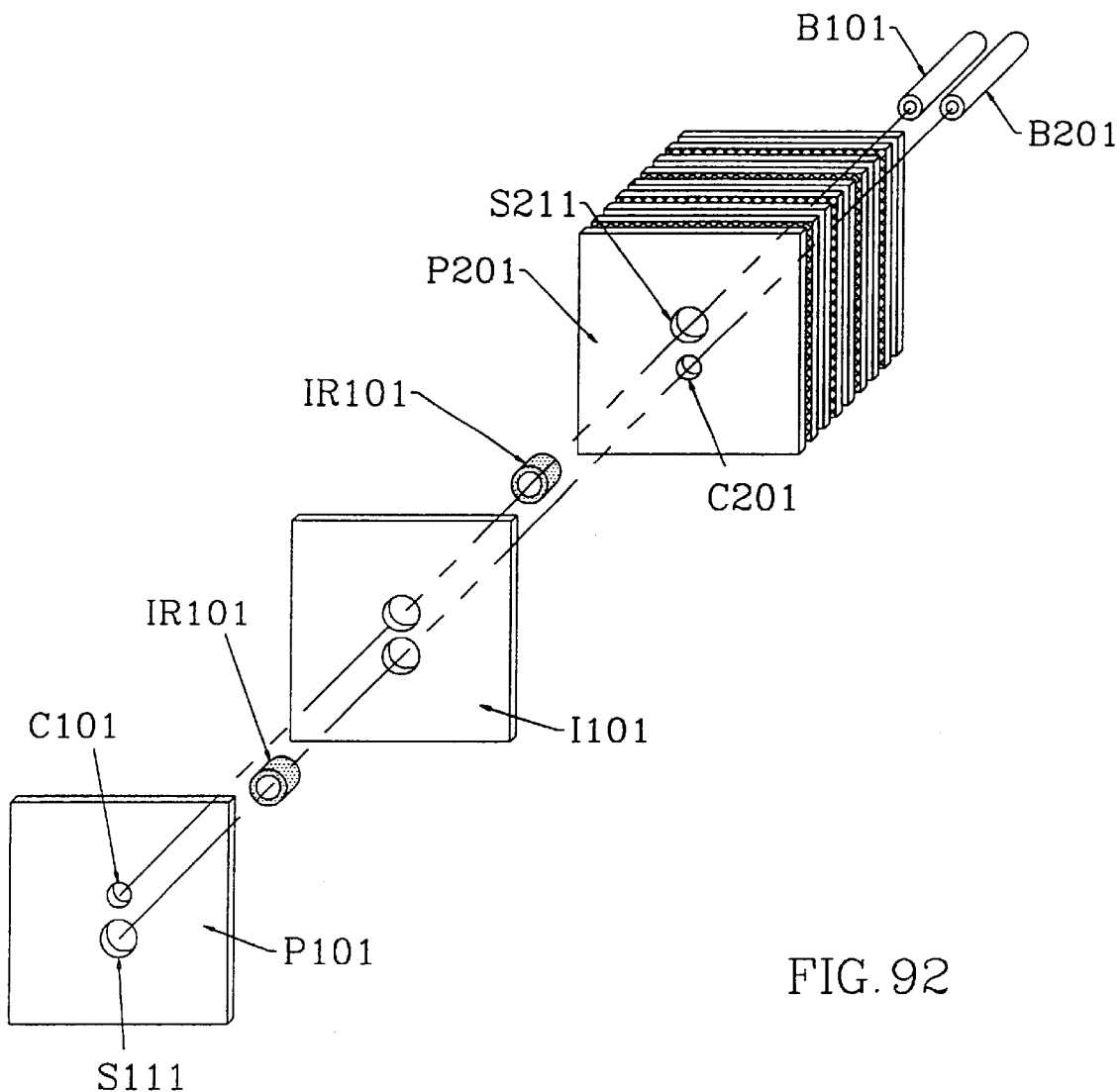
FIG. 92 is an exploded isometric view of an embodiment of the invention in which electrode plates of different polarities are respectively provided with a conductor through-hole and an isolating through-hole near to central region of plate.
Figure 93:
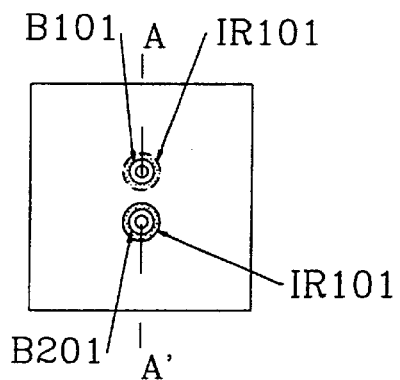
FIG. 93 is a front view of the embodiment of FIG. 92.
Figure 94:
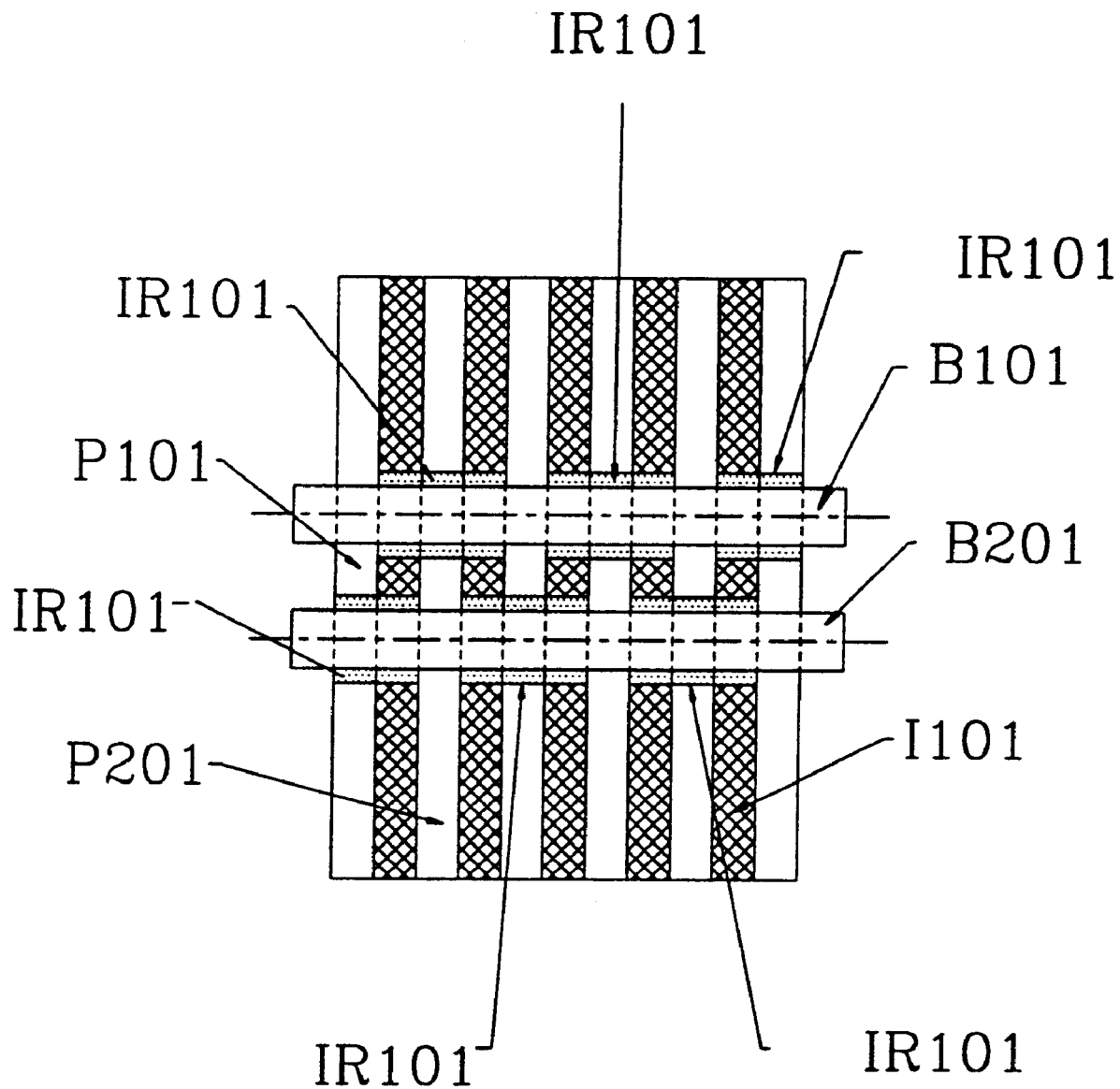
FIG. 94 is the A–A' sectional view of FIG. 93.

1) In the embodiment illustrated in FIGS. 92–94, a conductor through-hole C101 and an isolating through-hole S111 are respectively installed at relative symmetrical positions near to the central region of each of the positive electrode plates P101 of the electricity storage and discharge device, while a conductor through-hole C201 and an isolating through-hole S111 are respectively installed at relative symmetrical positions near to the central region of each of the negative electrode plates P201. The aforesaid positive and negative electrode plates are cross laminated, and an isolator plate I101 is installed between each two neighboring electrode plates of different polarity. The positive electrode conductor rod B101 and the negative electrode conductor rod B201 are respectively inserted through the aforesaid conductor through-holes and joined with electrode plates of the same polarity for parallel combination current collection, or with electrode plates having different polarities for series combination. As a result, the electric current on the electrode plate is either the output current flowing from the surrounding area in multiple circuits to the conductor rod for collected output, or the input current diffused from the conductor rod to the surrounding area in multiple circuits, thereby reducing the internal resistance of the storage/discharge device.

Figure 95:
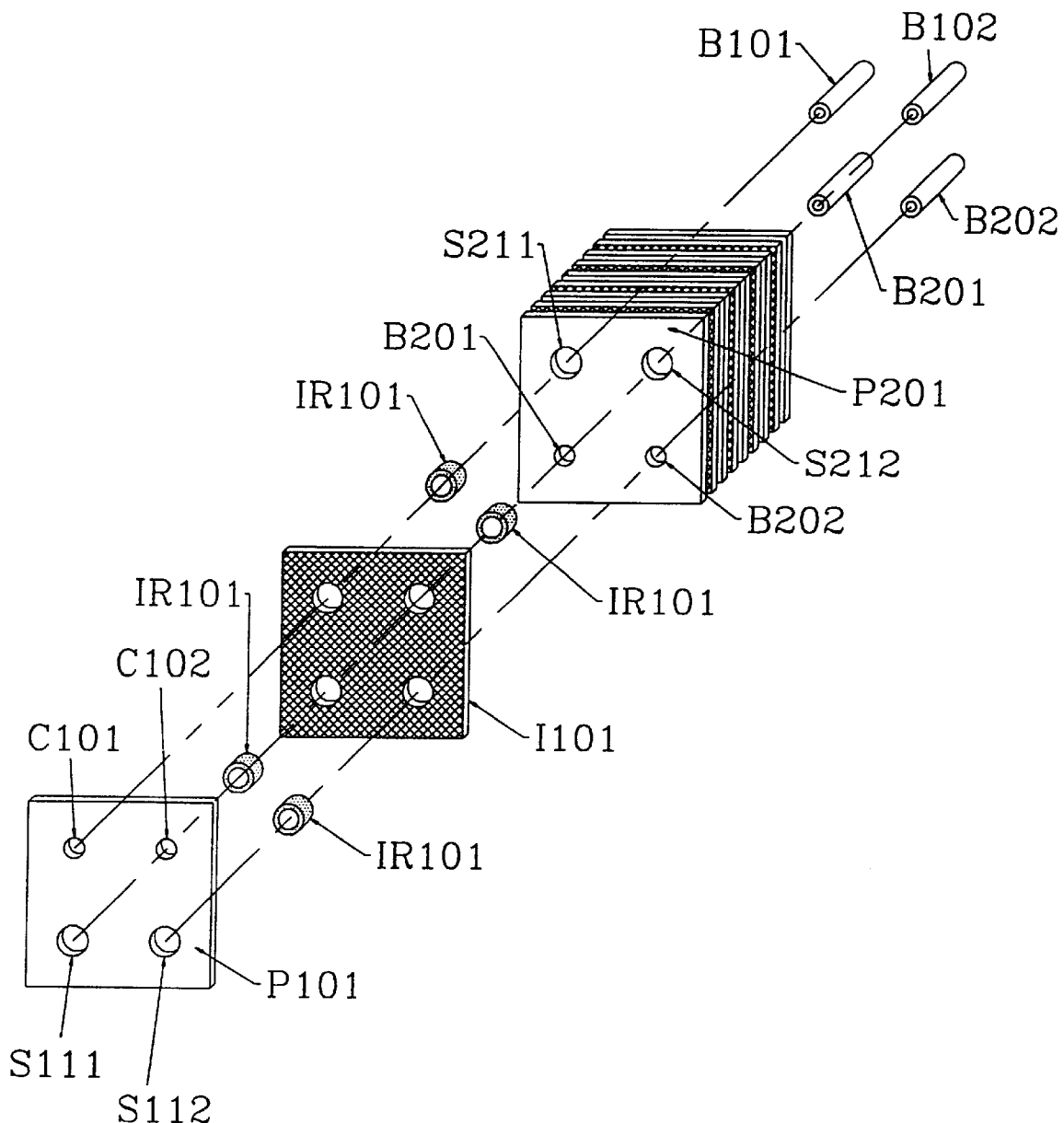
FIG. 95 is an exploded isometric view of an embodiment of the invention in which electrode plates of different polarities are respectively provided with two conductor through-holes and two isolating through-holes near to central region of plate.
Figure 96:
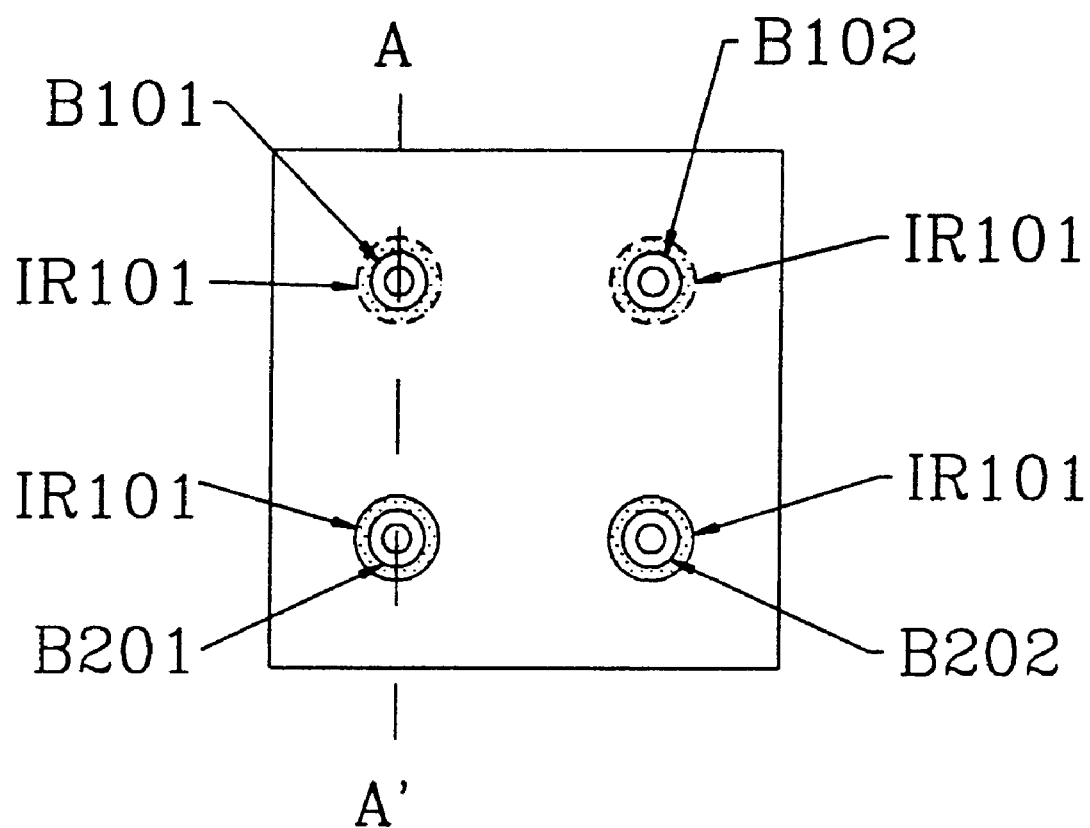
FIG. 96 is a front view of the embodiment of FIG. 92.
Figure 97:
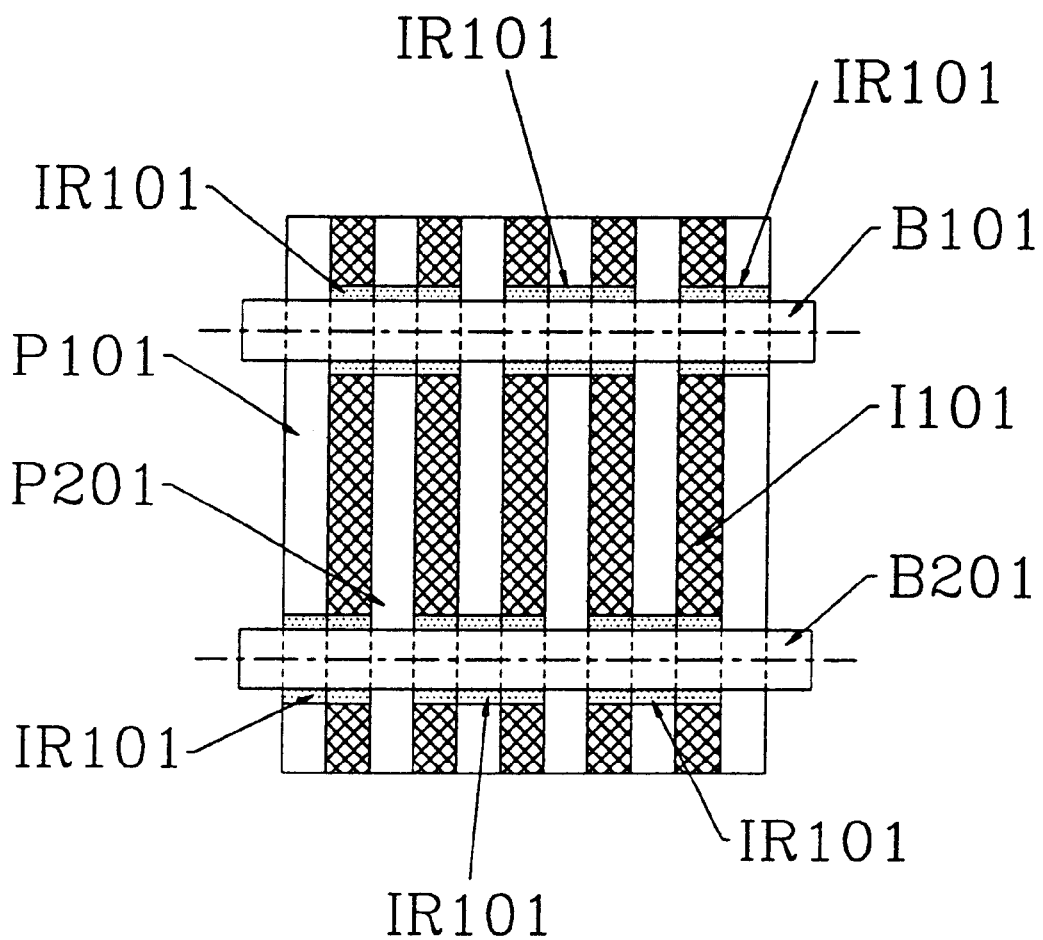
FIG. 97 is the A–A' sectional view of FIG. 96.

2) In the embodiment illustrated in FIGS. 95–97, two conductor through-holes C101, C102 and two isolating through-holes S111, S112 are respectively installed at relatively symmetrical positions near to the central region of the positive electrode plates P101 of the electricity storage and discharge device, while two conductor through-holes C201, C202 and two isolating through-holes S211, S212 are respectively installed at relatively symmetrical positions near to the central region of the positive electrode plates P201. The aforesaid positive and negative electrode plates are cross laminated, and an isolator plate I101 is installed between each two neighboring electrode plates of different polarity. The positive electrode conductor rods B101, B102 and the negative electrode conductor rods B201, B202 are respectively inserted through the aforesaid conductor through-holes and joined with electrode plates of the same polarity for parallel combination current collection, or with electrode plates having different polarities for series combination. As a result, the electric current on the electrode plate is either the output current flowing from the surrounding area in multiple circuits to the conductor rod for collected output or the input current diffused from the conductor rod to the surrounding area in multiple circuits, thereby reducing the internal resistance of the storage/discharge device.

Figure 98:
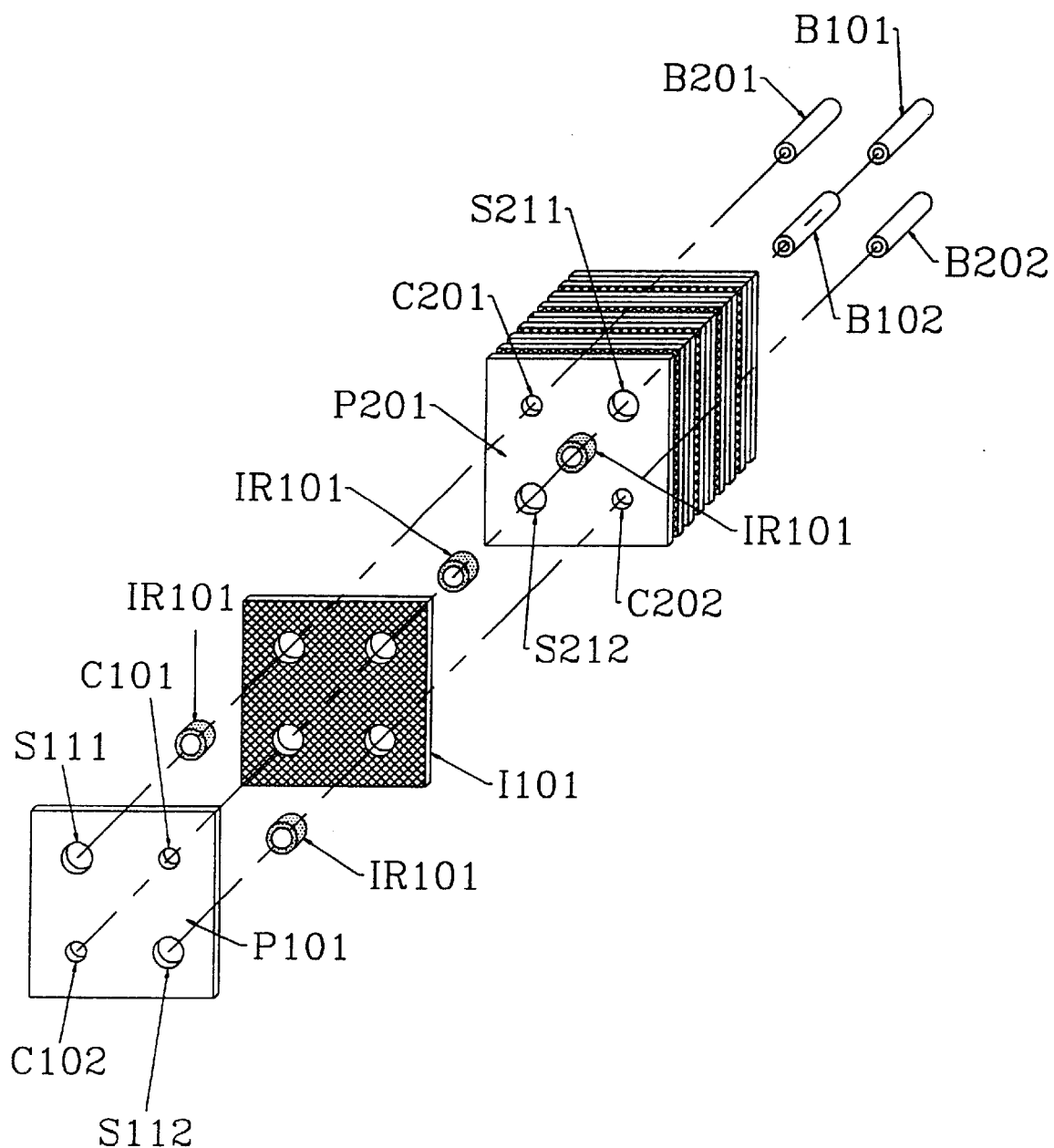
FIG. 98 is an exploded isometric view of an embodiment of the invention in which electrode plates of different polarities are respectively installed with two conductor through-holes and two isolating through-holes having a symmetrical cross distribution near to a central region of plate.
Figure 99:
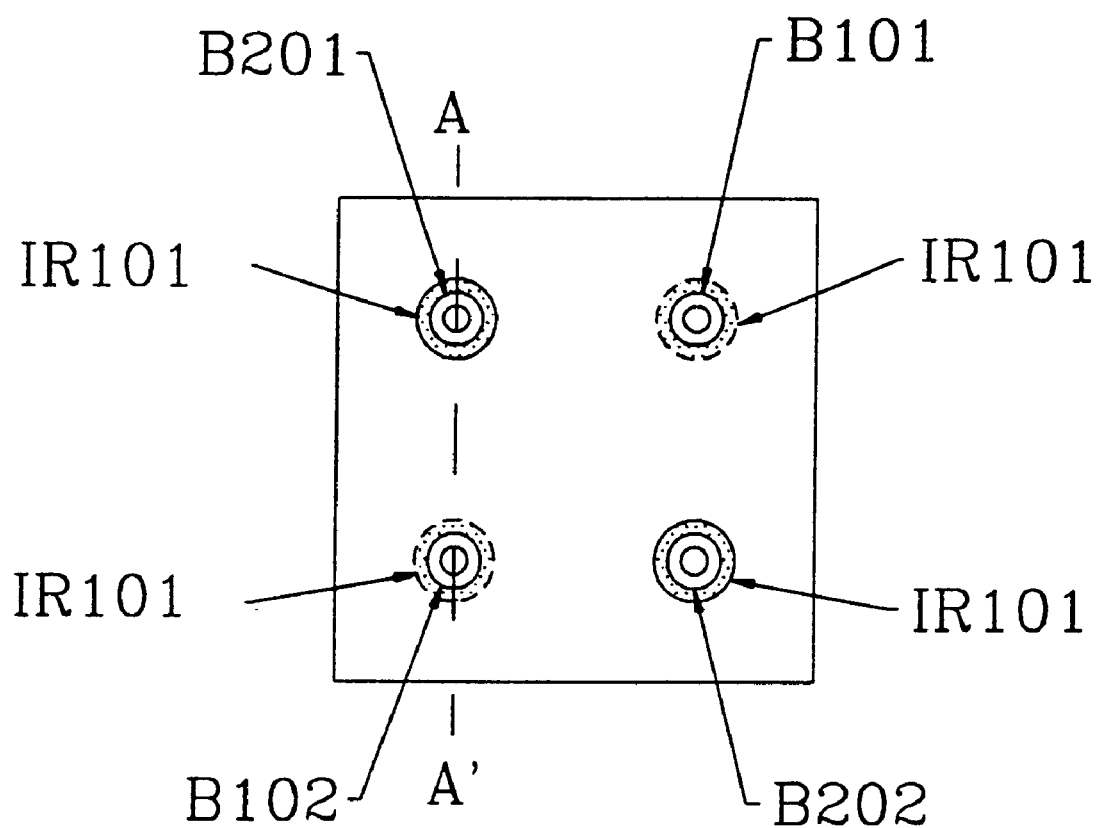
FIG. 99 is a front view of the embodiment of FIG. 98.
Figure 100:
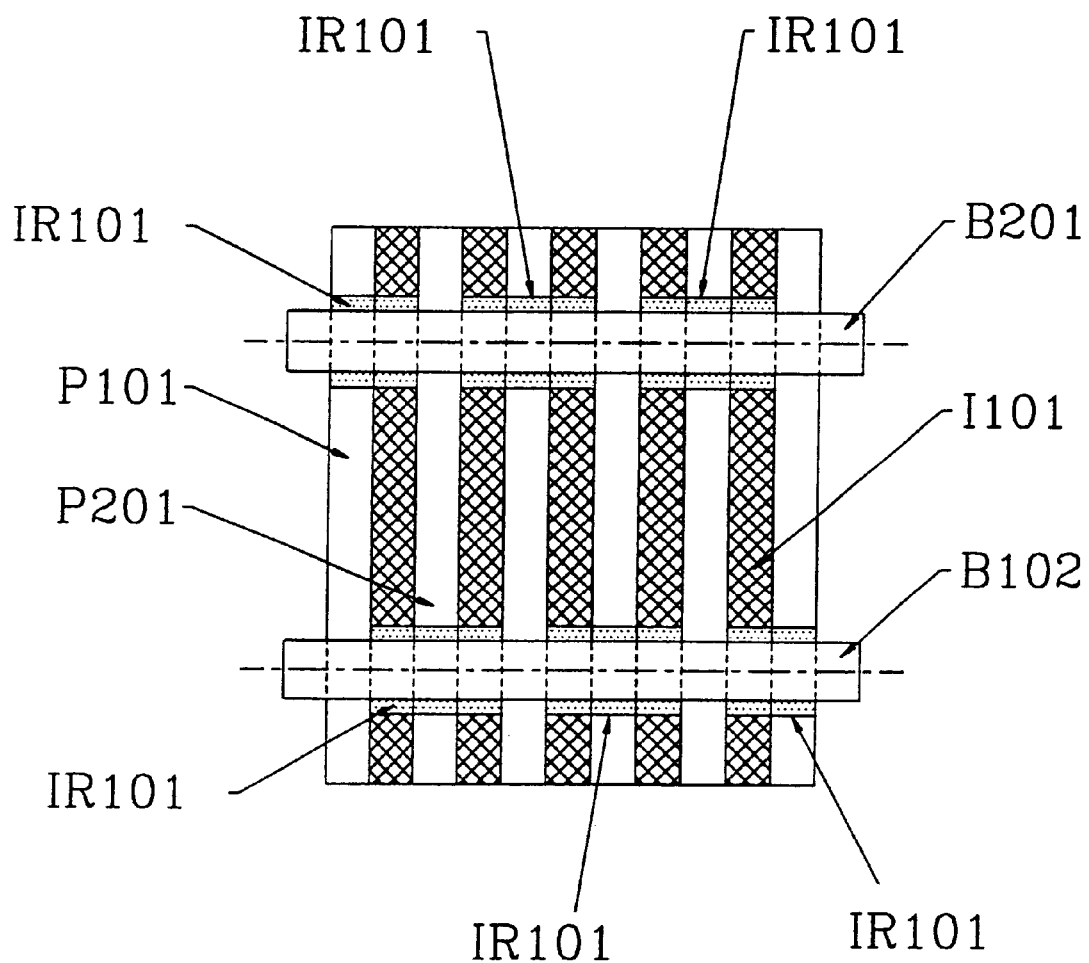
FIG. 100 is the A–A' sectional view of FIG. 99.
Figure 101:
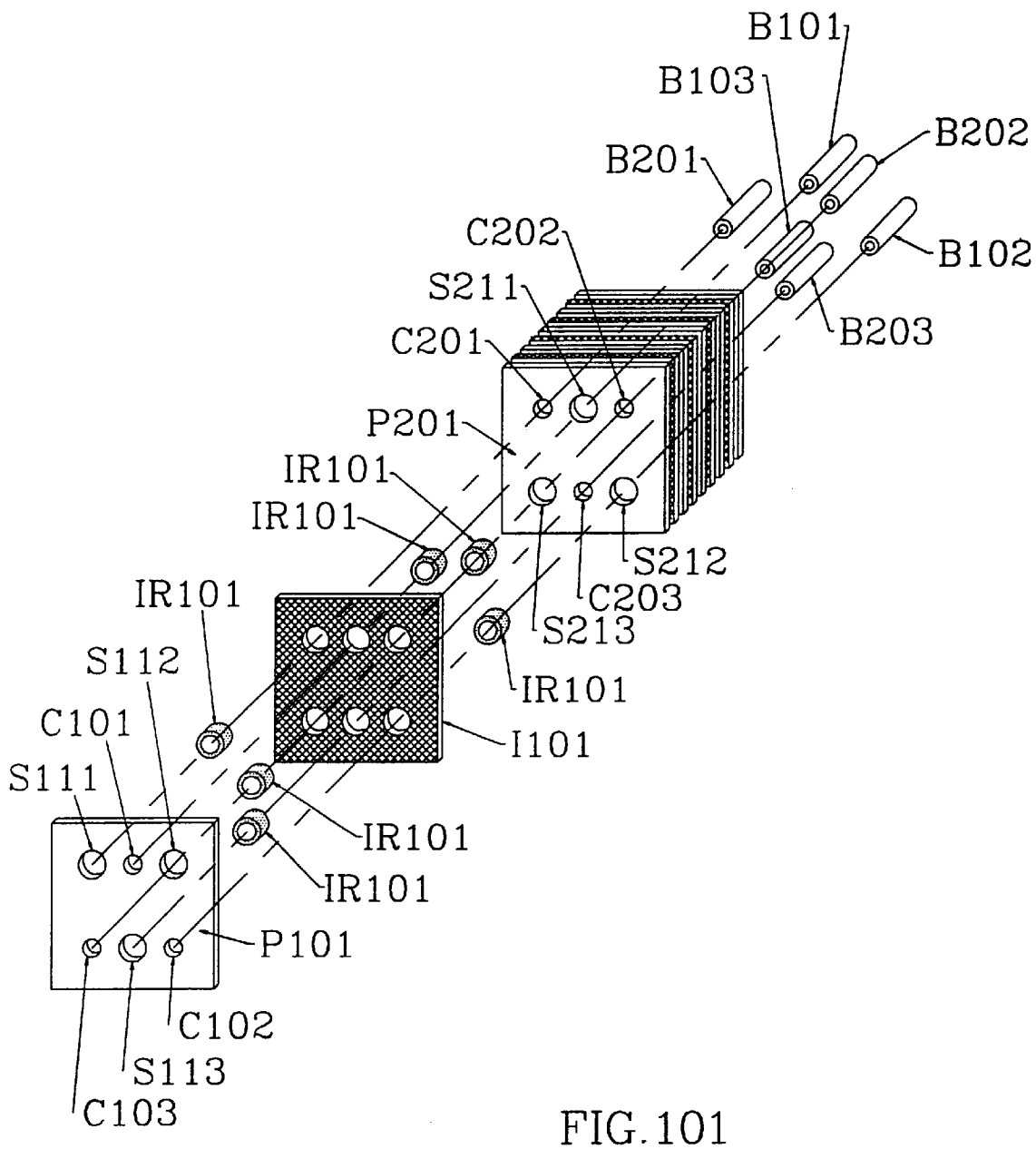
FIG. 101 is an exploded isometric view of an embodiment of the invention in which electrode plates of different polarities are respectively provided with three conductor through-holes and three isolating through-holes having a symmetrical cross distribution near to a central region of plate.
Figure 102:
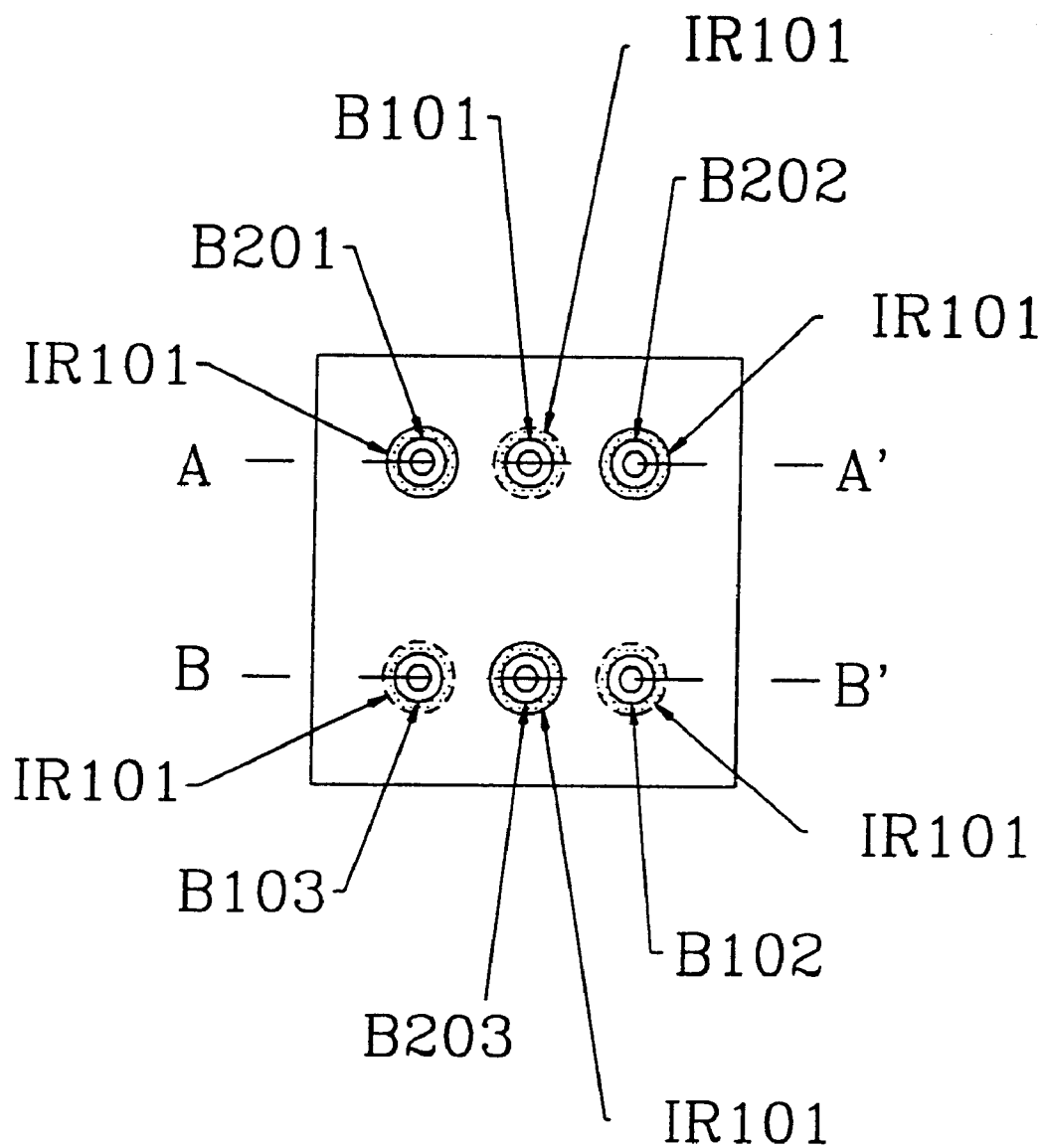
FIG. 102 is a front view of the embodiment of FIG. 101.
Figure 103:
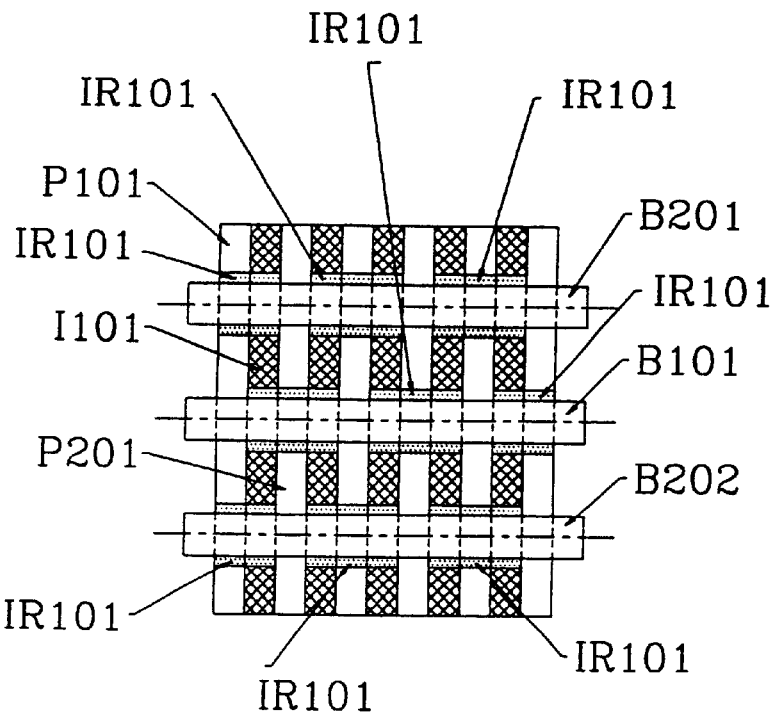
FIG. 103 is the A–A' sectional view of FIG. 102.
Figure 104:
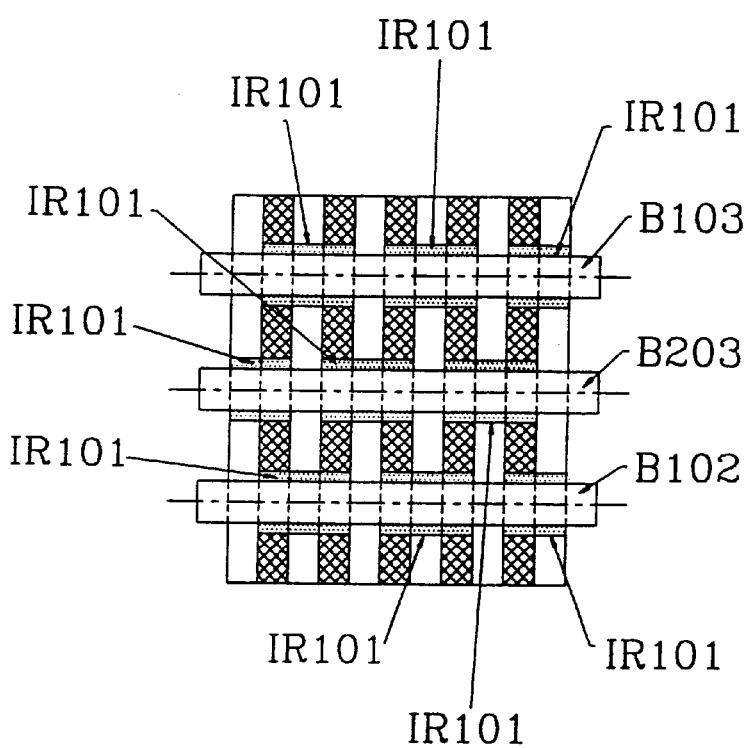
FIG. 104 is the B–B' sectional view of FIG. 102.

3) In the embodiment illustrated in FIGS. 98–100, two conductor through-holes C101, C102 and two isolating through-holes S111, S112 are respectively installed near to the central region of each of the positive electrode plates P101 of the electricity storage and discharge device in mutually symmetrical cross distribution, while two conductor through-holes C1201, C202 and two isolating through-holes S211, S212 are respectively installed near to the central region of each of the negative electrode plates P201 in mutually symmetrical cross distribution. The aforesaid positive and negative electrode plates are cross laminated, and an isolator plate I101 is installed between each two neighboring electrode plates of different polarity. The positive electrode conductor rods B101, B102 and the negative electrode conductor rods B201, B202 are respectively inserted through the aforesaid conductor through-holes and joined with electrode plates of the same polarity for parallel combination current collection, or with electrode plates having different polarities for series combination. As a result, the electric current on the electrode plate is either the output current flowing from the surrounding area in multiple circuits to the conductor rod for collected output, or the input current diffused from the conductor rod to the surrounding area in multiple circuits, thereby reducing the internal resistance of the storage/discharge device.

4) In the embodiment illustrated in FIGS. 101–104, three conductor through-holes C101, C102, C103 and three isolating through-holes S111, S112, S113 are respectively installed near to the central region of each of the positive electrode plates P101 of the electricity storage and discharge device in mutually symmetrical cross distribution, while three conductor through-holes C201, C202, C203 and three isolating through-holes S211, S212, S213 are respectively installed near to the central region of each of the negative electrode plates P201 in mutually symmetrical cross distribution. The aforesaid positive and negative electrode plates are cross laminated, and an isolator plate I101 is installed between each two neighboring electrode plates of different polarity. The positive electrode conductor rods B101, B102 and the negative electrode conductor rods B201, B202 are respectively inserted through the aforesaid conductor through-holes and joined with electrode plates of the same polarity for parallel combination current collection, or with electrode plates having different polarities for series combination. As a result, the electric current on the electrode plate is either the output current flowing from the surrounding area in multiple circuits to the conductor rod for collected output, or the input current diffused from the conductor rod to the surrounding area in multiple circuits, thereby reducing the internal resistance of the storage/discharge device.

Figure 105:
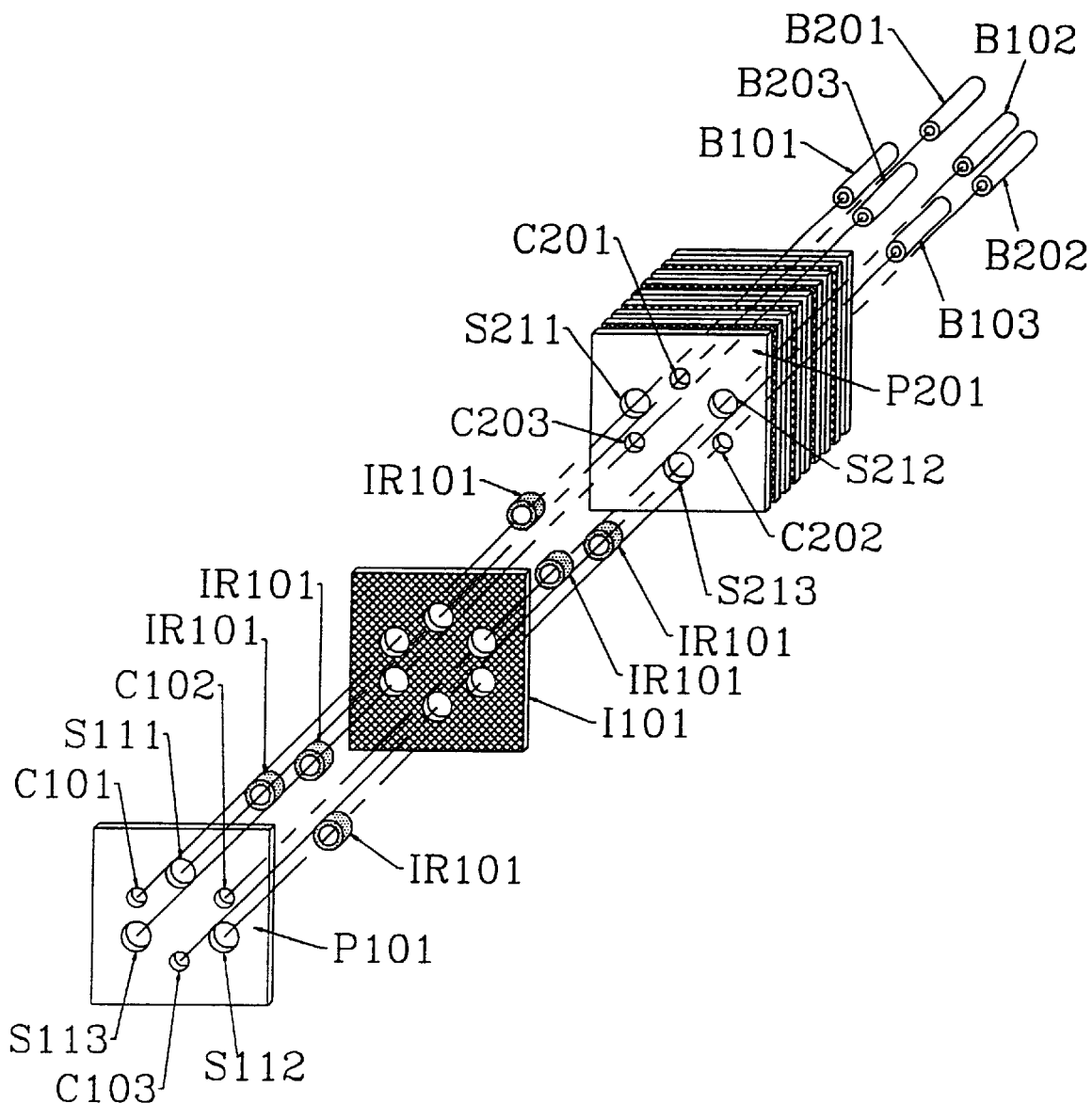
FIG. 105 is an exploded isometric view of the embodiment of the invention in which electrode plates of different polarities are respectively provided with three conductor through-holes and three isolating through-holes in hexagonal-symmetrical cross distribution near to a central region of plate.
Figure 106:
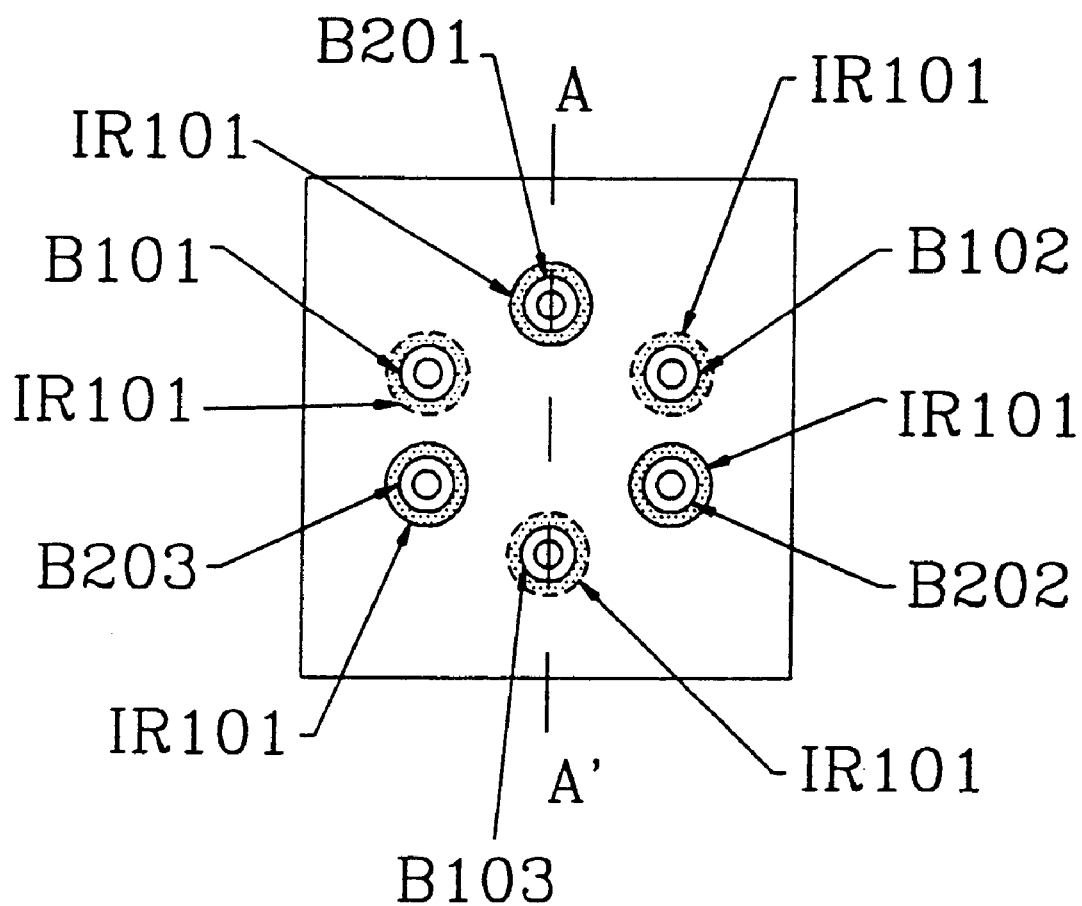
FIG. 106 is a front view of the embodiment of FIG. 105.
Figure 107:
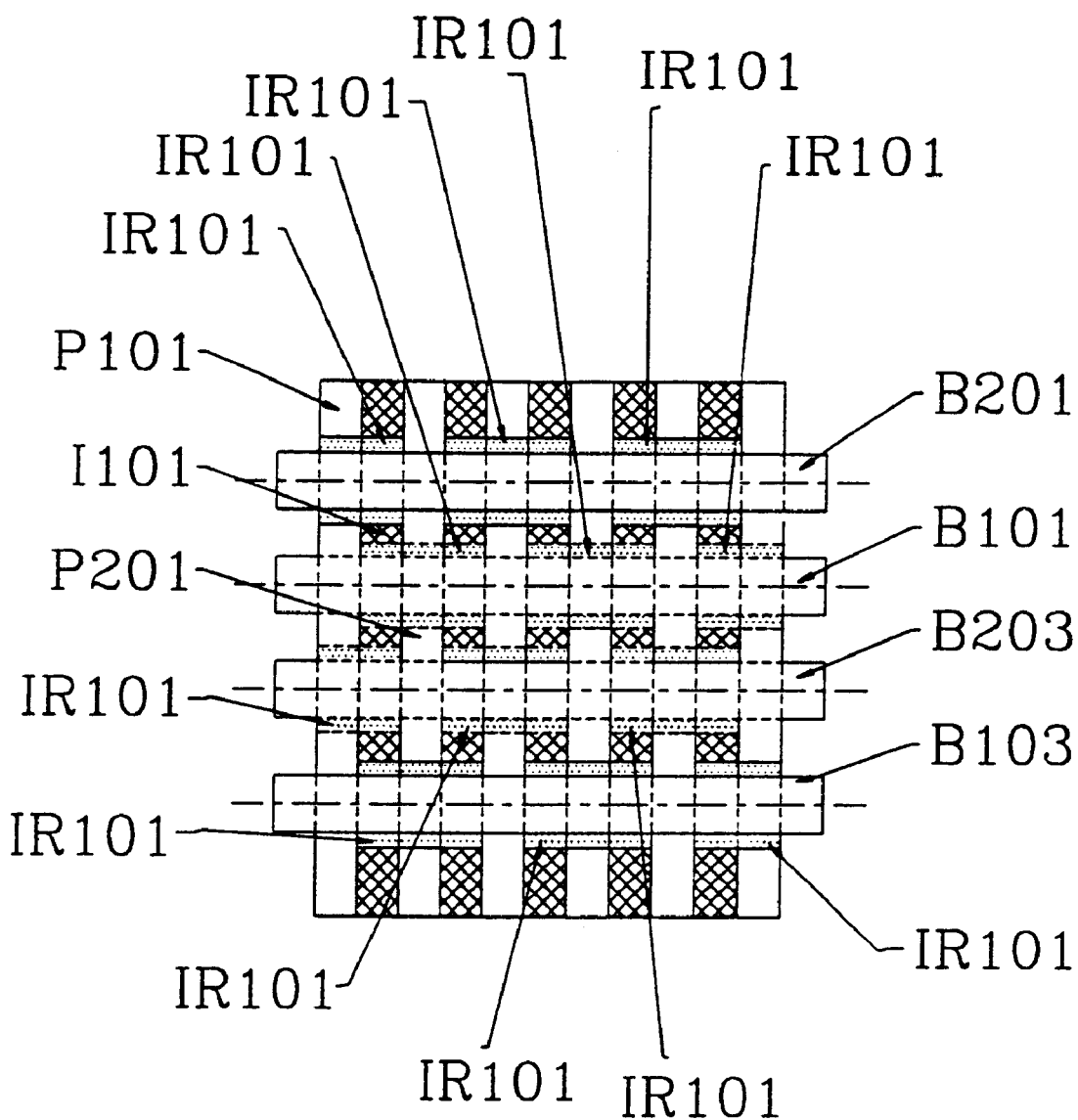
FIG. 107 is the A–A' sectional view of FIG. 106.

5) In the embodiment of FIGS. 105–107, three conductor through-holes C101, C102, C103 and three isolating through-holes S111, S112, Sl13 are respectively installed near to the central region of each of the positive electrode plates P101 of the electricity storage and discharge device in a symmetrical hexagonal cross distribution, while three conductor through-holes C201, C202, C203 and three isolating through-holes S211, S212, S213 are respectively installed near to the central region of each of the negative electrode plates P201 in a symmetrical hexagonal cross distribution. The aforesaid positive and negative electrode plates are cross laminated, and an isolator plate I101 is installed between each two neighboring electrode plates of different polarity. The positive electrode conductor rods B101, B102, B103 and the negative electrode conductor rods B201, B202, B203 are respectively inserted through the aforesaid conductor through-holes and joined with electrode plates of the same polarity for parallel combination current collection, or with electrode plates having different polarities for series combination. As a result, the electric current on the electrode plate is either the output current flowing from the surrounding area in multiple circuits to the conductor rod for collected output, or the input current diffused from the conductor rod to the surrounding area in multiple circuits, thereby reducing the internal resistance of the storage/discharge device.

Figure 108:
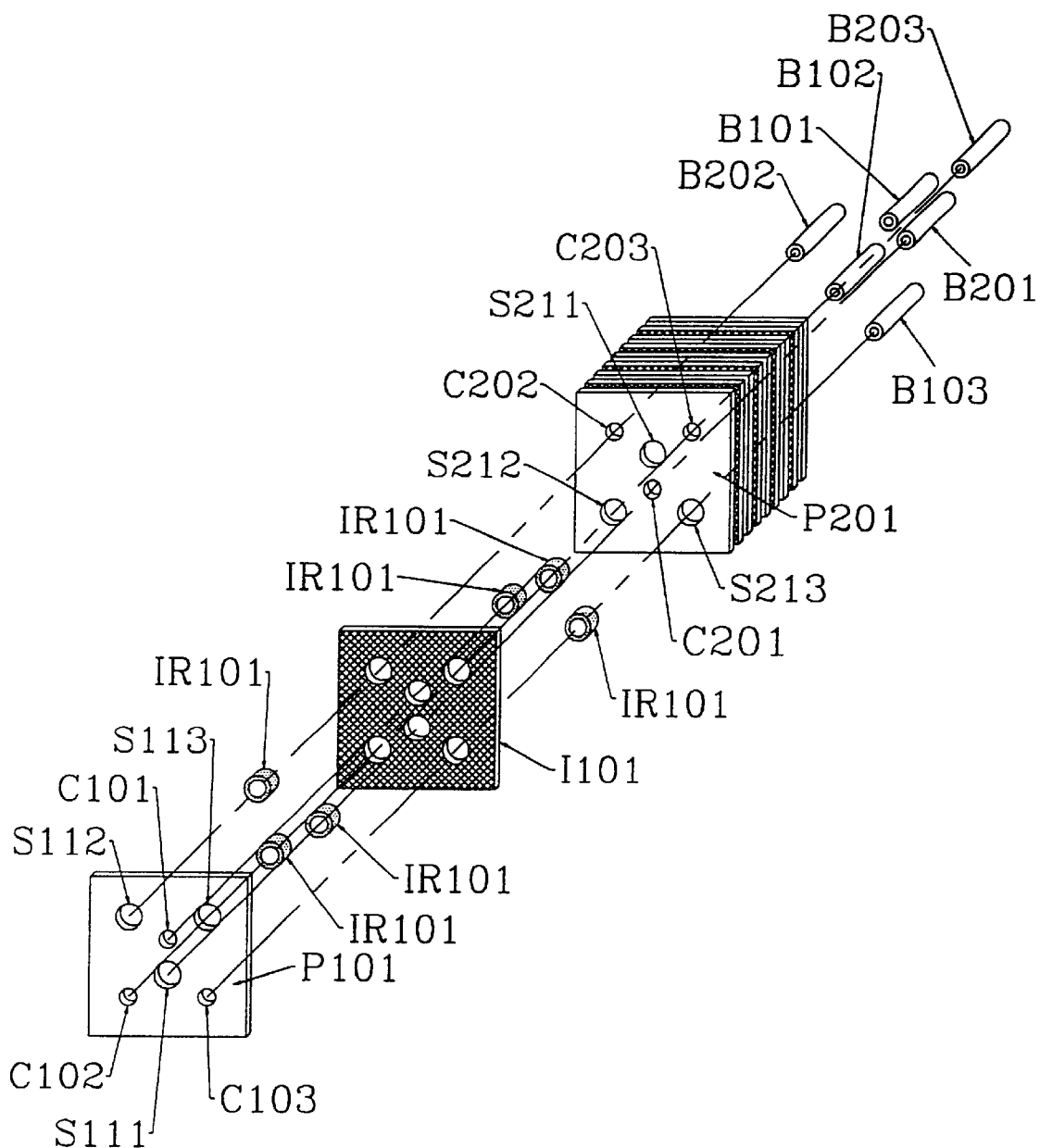
FIG. 108 is an exploded isometric view of an embodiment of the invention in which electrode plates of different polarities are respectively provided with three conductor through-holes and three isolating through-holes near to a central region of plate.
Figure 109:
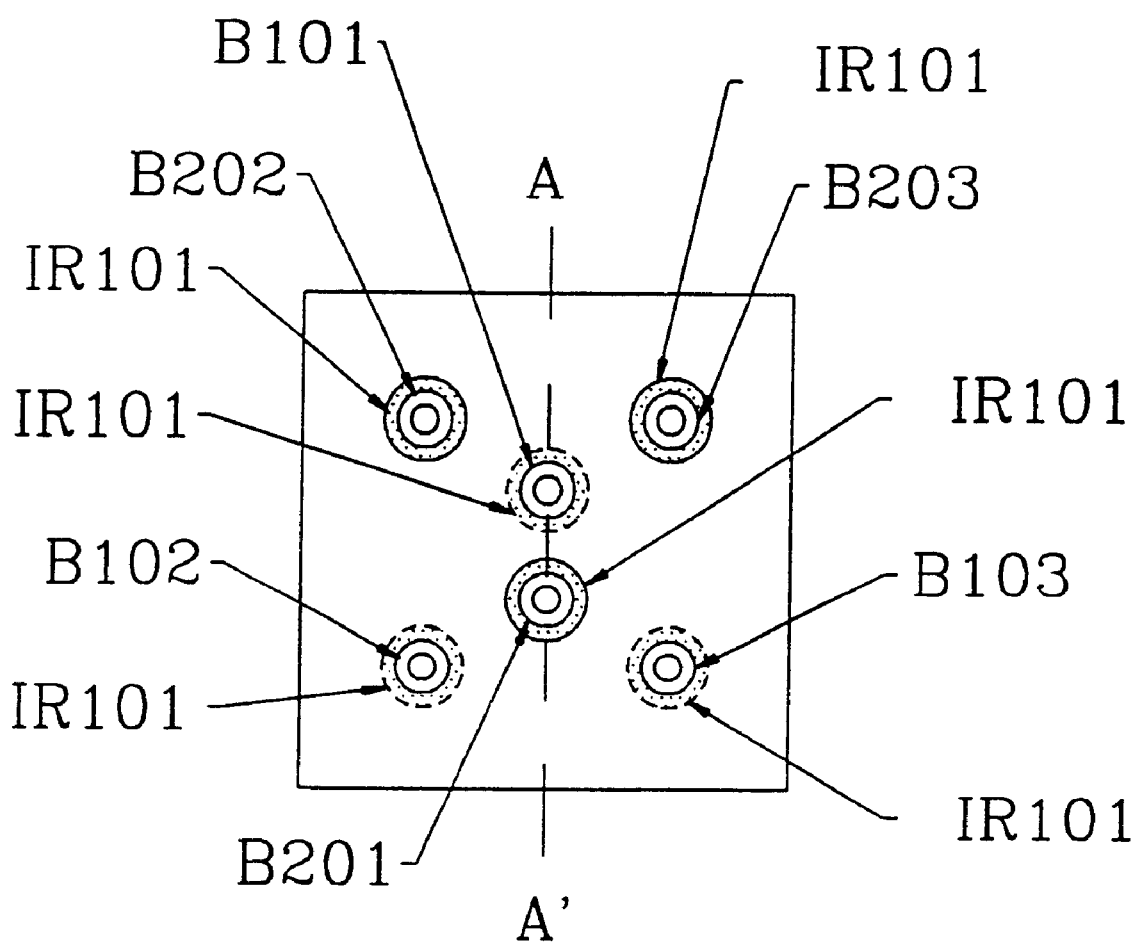
FIG. 109 is a front view of the embodiment of FIG. 105.
Figure 110:
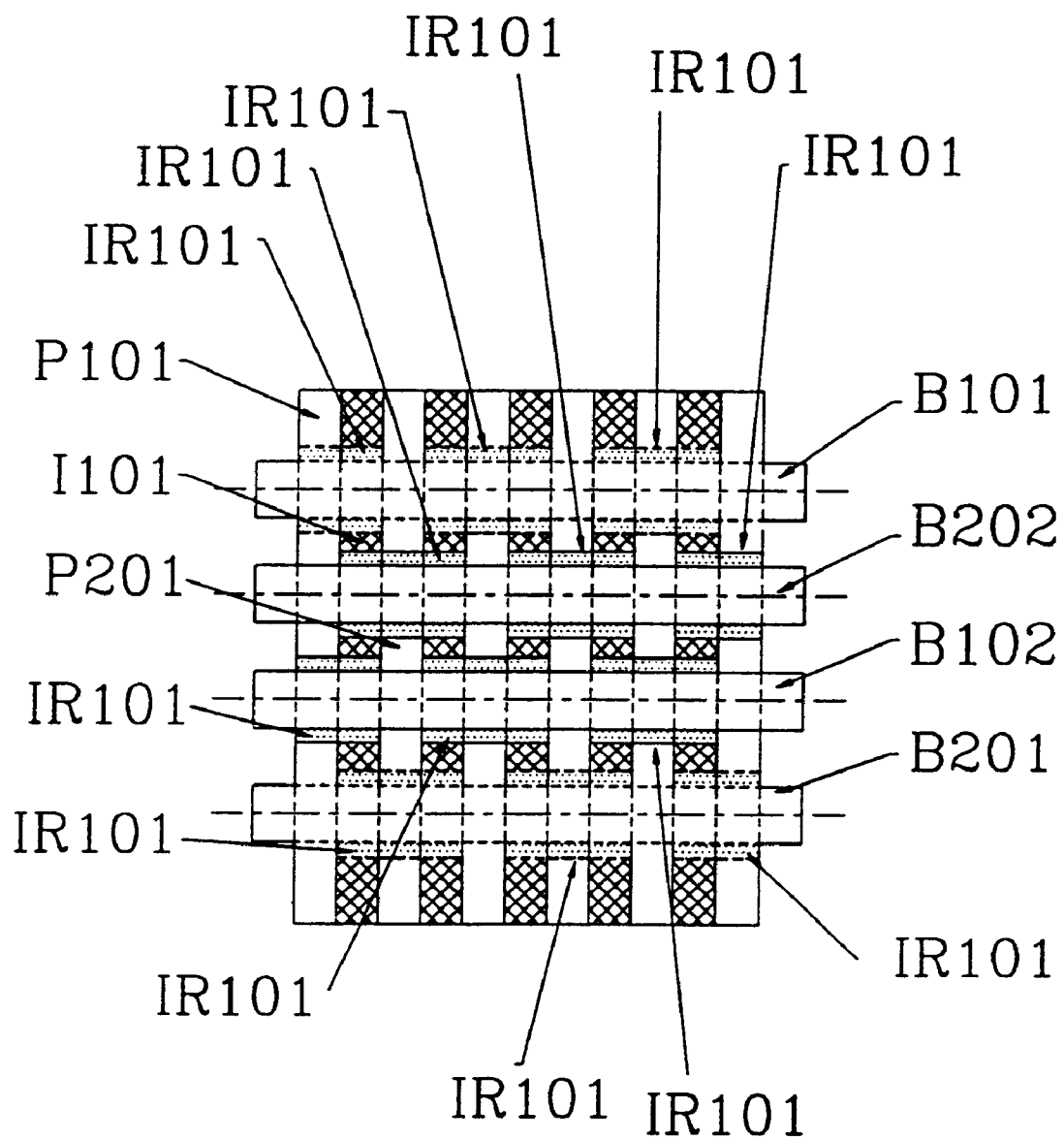
FIG. 110 is the A–A' sectional view of FIG. 109.

6) In the embodiment illustrated in FIGS. 108–110, three conductor through-holes C101, C102, C103 and three isolating through-holes S111, S112, S113 are respectively installed near to the central region of the positive electrode plates P101 of the electricity storage and discharge device in a symmetrical cross distribution, while three conductor through-holes C201, C202, C203 and three isolating through-holes S211, S212, S213 are respectively installed near to the central region of the negative electrode plates P201 in a symmetrical cross distribution. The aforesaid positive and negative electrode plates are cross laminated, and an isolator plate I101 is installed between each two neighboring electrode plates of different polarity. The positive electrode conductor rods B101, B102, B103 and the negative electrode conductor rods B201, B202, B203 are respectively inserted through the aforesaid conductor through-holes and joined with electrode plates of the same polarity for parallel combination current collection, or with electrode plates having different polarities for series combination. As a result, the electric current on the electrode plate is either the output current flowing from the surrounding area in multiple circuits to the conductor rod for collected output, or the input current diffused from the conductor rod to the surrounding area in multiple circuits, thereby reducing the internal resistance of the storage/discharge device.

G. The seventh group of embodiments includes embodiments in which the electrode plate is installed with conductor through-holes in double ring arrangement.

Figure 111:
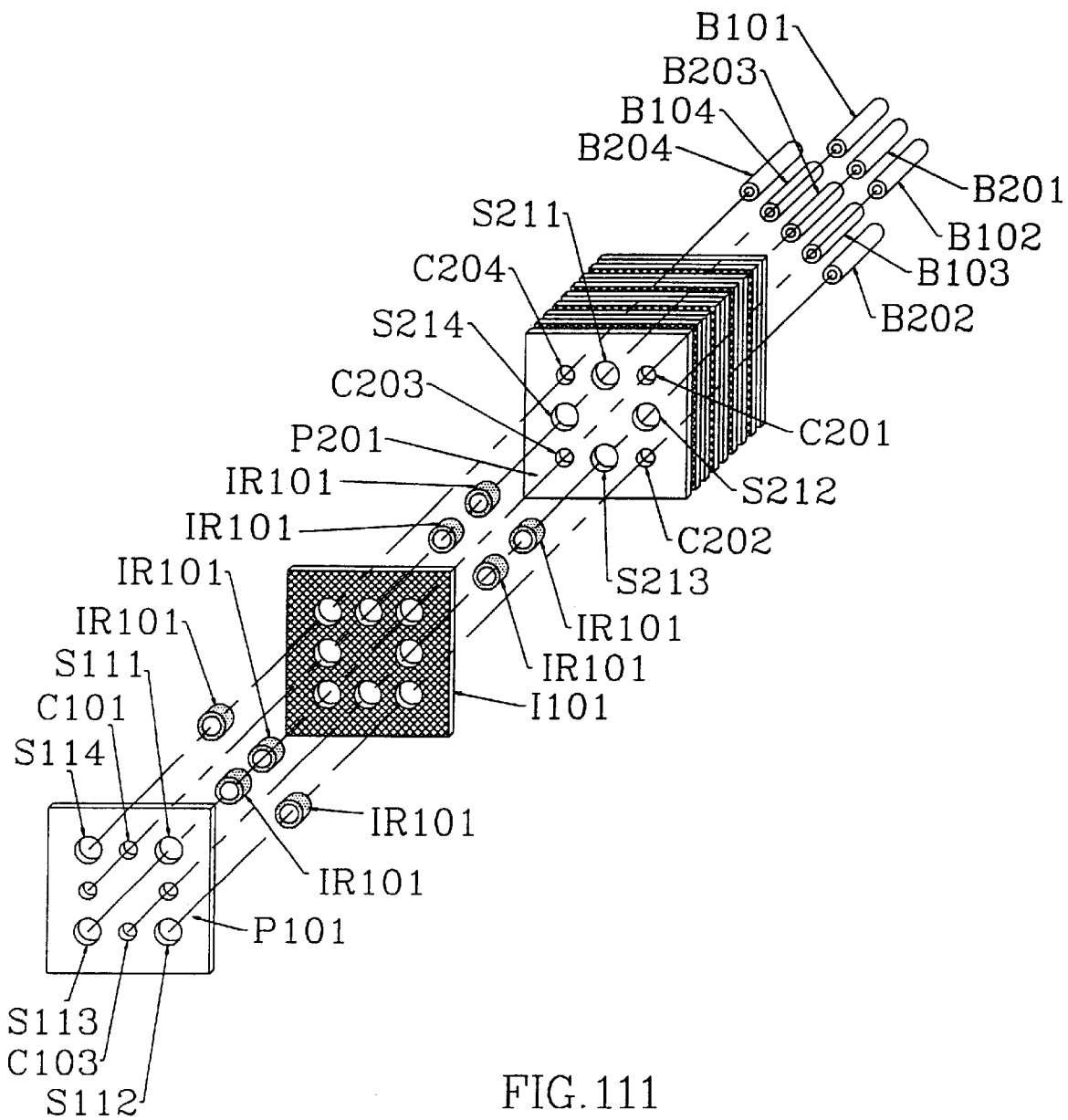
FIG. 111 is an exploded isometric view of an embodiment of the invention in which electrode plates are respectively installed with four conductor through-holes and four isolating through-holes having a cross-symmetrical double ring distribution.
Figure 112:
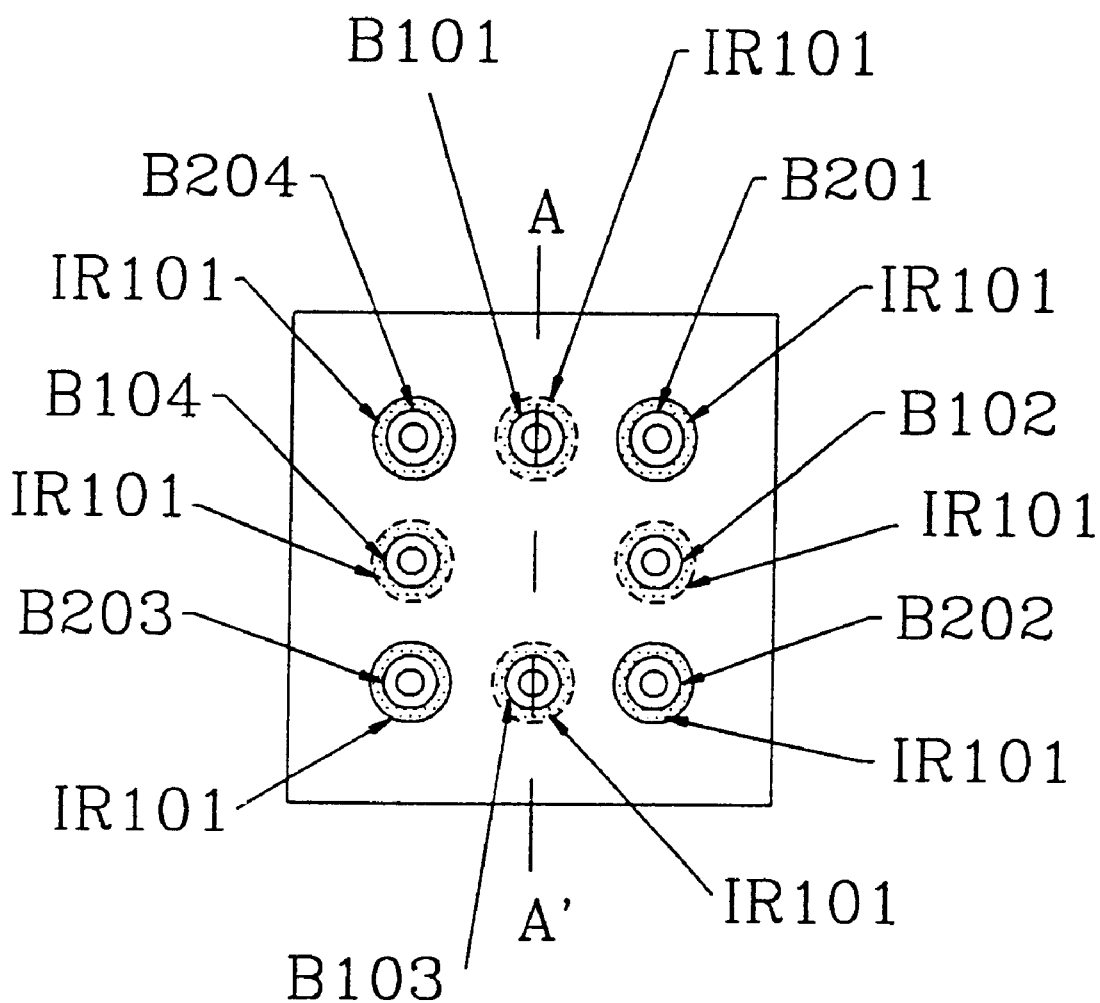
FIG. 112 is a front view of the embodiment of FIG. 111.
Figure 113:
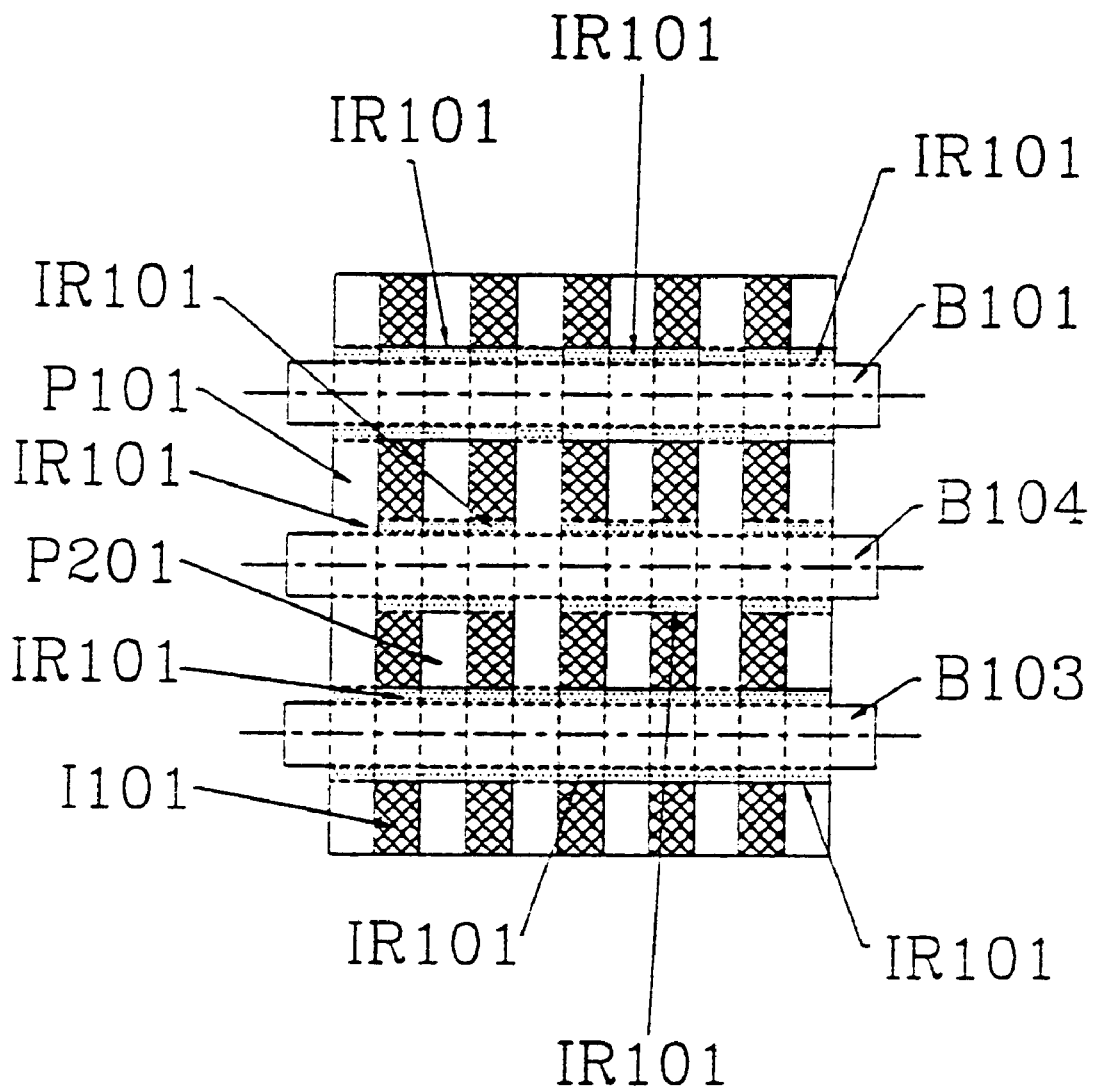
FIG. 113 is the A–A' sectional view of FIG. 112.

1) In the embodiment illustrated in FIGS. 111–113, the positive electrode plates P101 of the electricity storage are respectively installed with four conductor through-holes C101, C102, C103, C104 and four isolating through-holes S111, S112, S113, S114 in a cross-symmetrical ring distribution, while the negative electrode plates P201 are respectively installed with four conductor through-holes C201, C202, C203, C204 and four isolating through-holes S211, S212, S213, S214 in a cross-symmetrical ring distribution. The aforesaid positive and negative electrode plates are cross laminated, and an isolator plate I101 is installed between each two neighboring electrode plates of different polarities. The positive electrode conductor rods B101, B102, B103, B104 and the negative electrode conductor rods B201, B202, B203, B204 are respectively inserted through the aforesaid conductor through-holes and joined with electrode plates of the same polarity for parallel combination current collection, or with electrode plates having different polarities for series combination.

Figure 114:
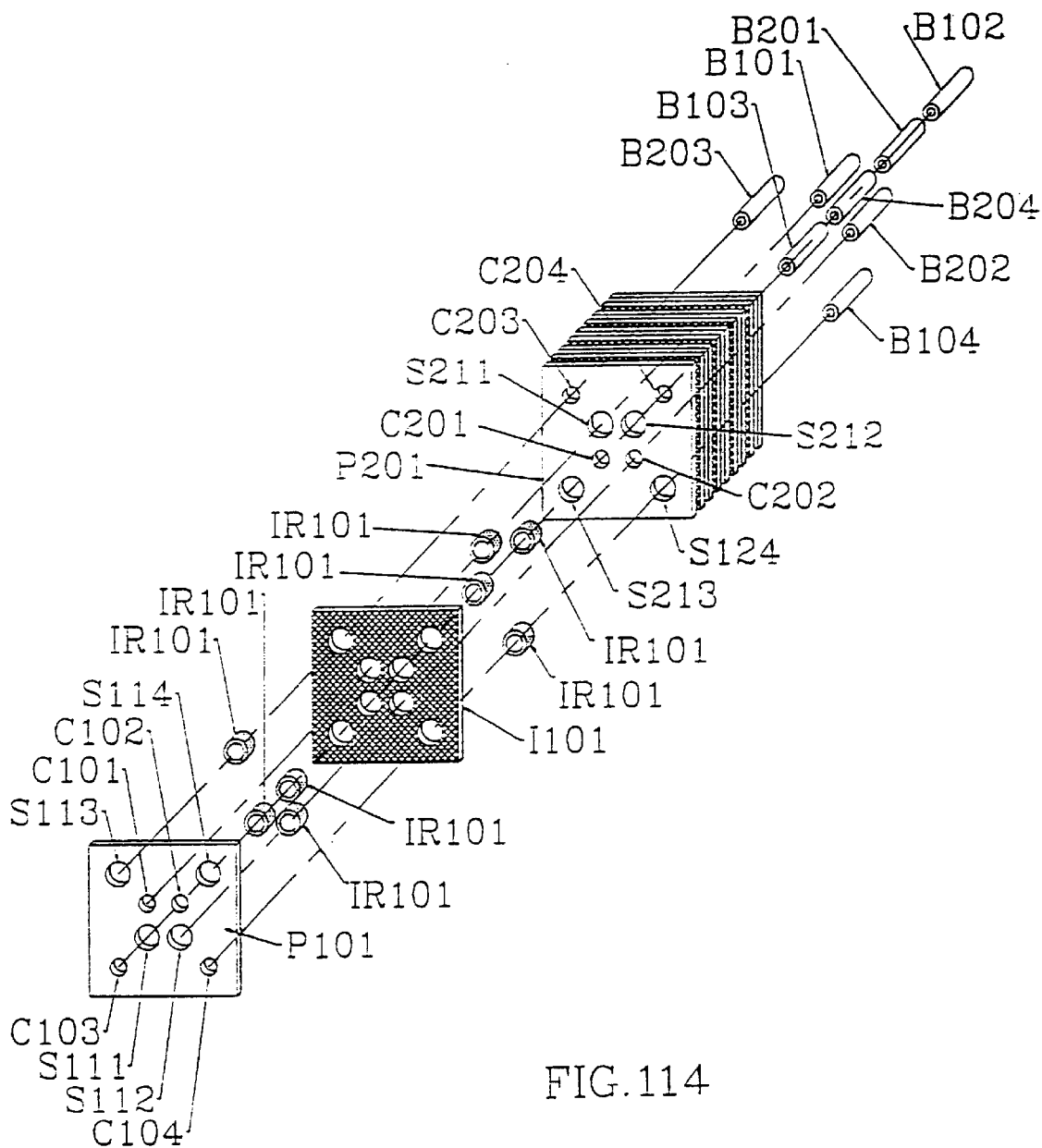
FIG. 114 is an exploded isometric view of an embodiment of the invention in which each electrode plate is provided with four conductor through-holes and four isolating through-holes having a cross-symmetrical ring shape distribution.
Figure 115:
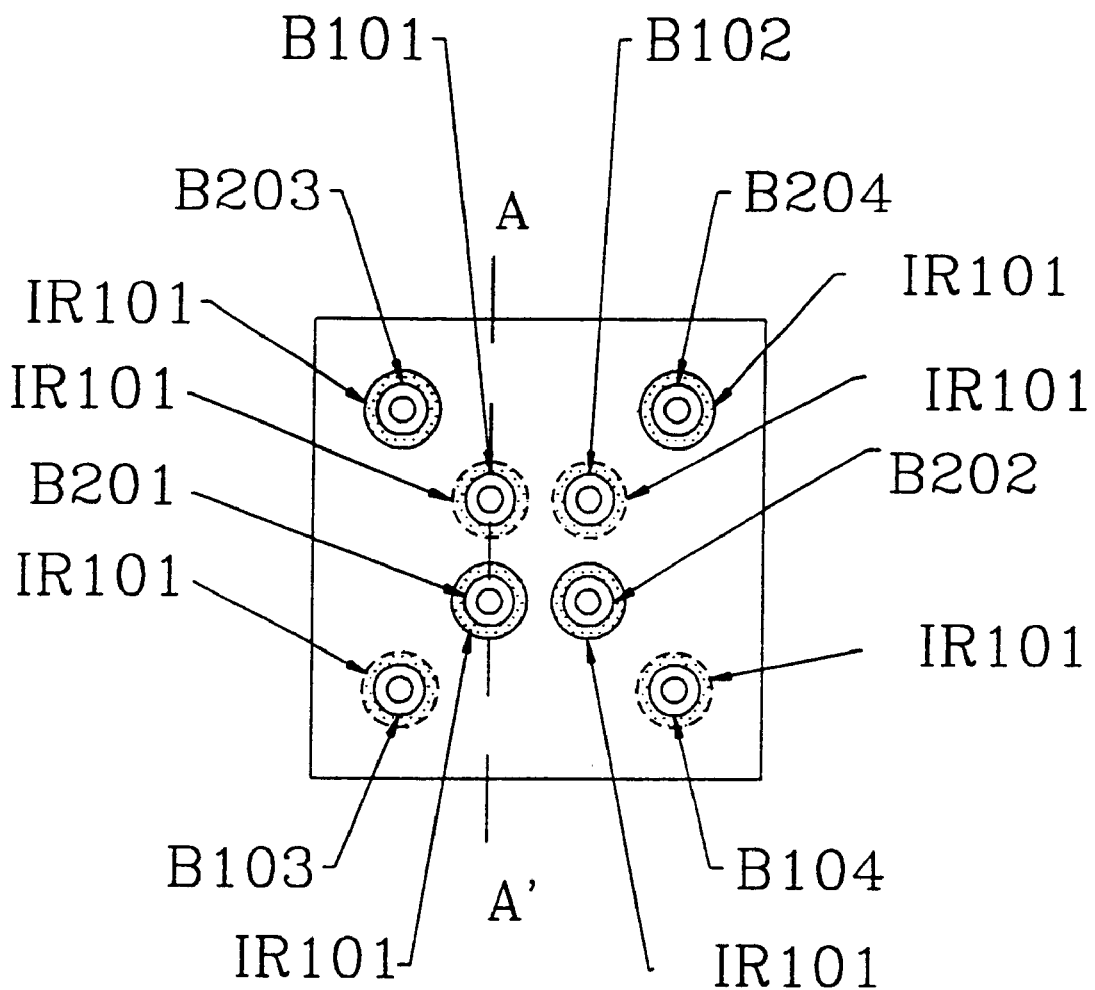
FIG. 115 is a front view of the embodiment of FIG. 114.
Figure 116:
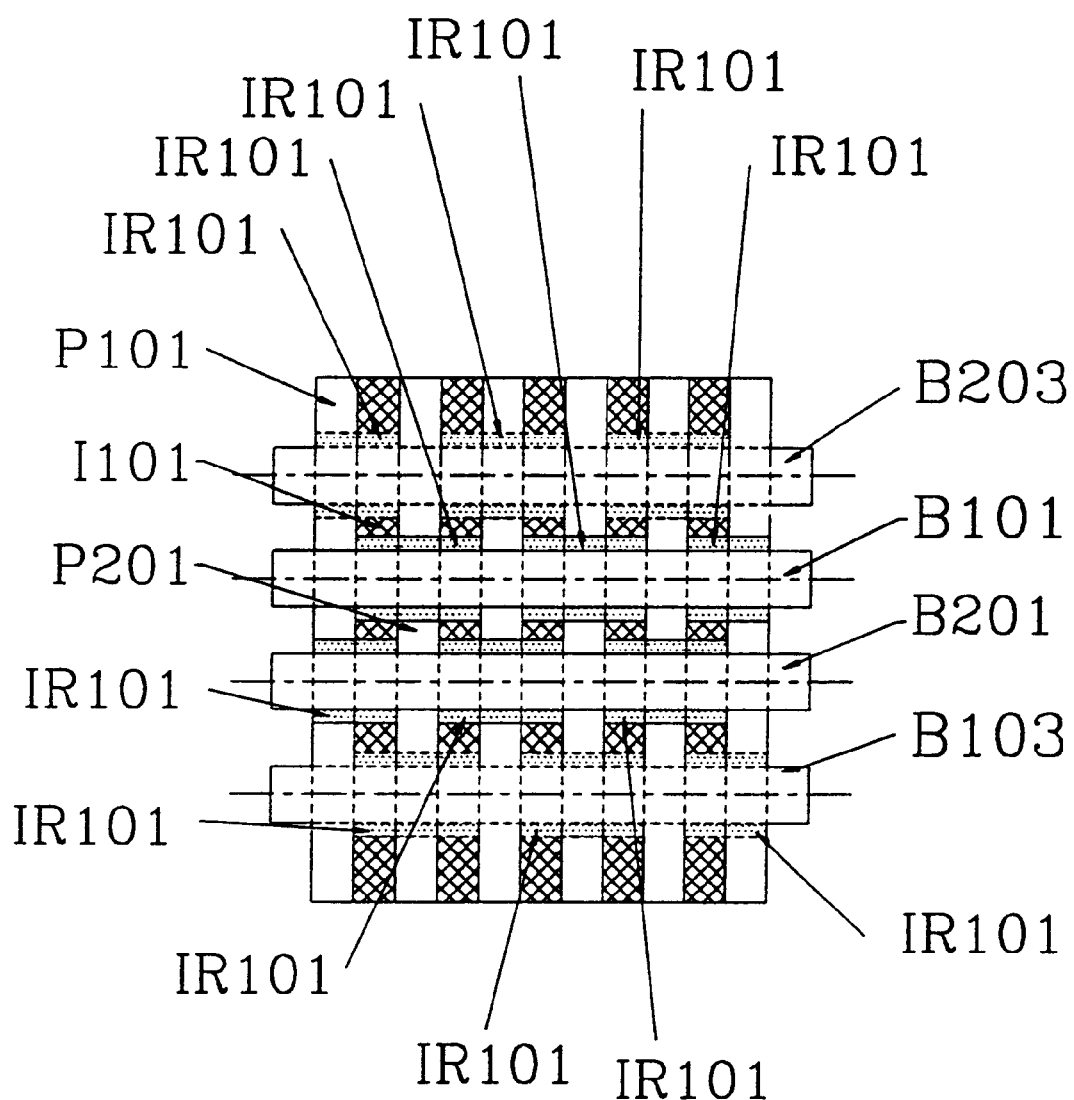
FIG. 116 is the A–A' sectional view of FIG. 115.

2) In the embodiment illustrated in FIGS. 114–116, the positive electrode plates P101 of the electricity storage are respectively installed with four conductor through-holes C101, C102, C103, C104 and four isolating through-holes S111, S112, S113, S114 in a cross-symmetrical double ring distribution. The negative electrode plates P201 are respectively installed with four conductor through-holes C201, C202, C203, C204 and four isolating through-holes S211, S212, S213, S214 in a cross-symmetrical double ring distribution. The aforesaid positive and negative electrode plates are cross laminated, and an isolator plate I101 is installed between each two neighboring electrode plates of different polarity. The positive electrode conductor rods B101, B102, B103, B104 and the negative electrode conductor rods B201, B202, B203, B204 are respectively inserted through the aforesaid conductor through-holes and joined with electrode plates of the same polarity for parallel combination current collection, or with electrode plates having different polarities for series combinations. In the embodiments illustrated in FIGS. 114–116, besides selecting the geometrical shapes and quantities of the electrode plates according to requirements, additional aspects of the structure of the electrode plates and through-holes must be chosen to facilitate joining of the corresponding conductor rods and passage of the rods through spaces, notches or isolating through-holes in order to accommodate insertion of conductor rods of different polarities without mutual contact. In addition, the isolator and casing of the conventional electricity storage and discharge device also must be installed as follows:

The conductor through-holes and the conductor rods of the positive electrode plates can be joined by mechanical seal methods or by welding, or by a press fit obtained by forced elastic deformation of the inserted tube shape conductor rod against the conductor through-hole, thereby establishing good electrical conduction;

Similarly, the conductor through-holes and conductor rods of the negative electrode plates can be joined by mechanical seal methods or by welding, or by a press fit obtained by forced elastic deformation of the inserted tube shape conductor rod against the conductor through-hole, thereby establishing a good electrical conduction;

The aforesaid positive and negative electrode plates may be put together by cross laminating electrode plates having the same shape or different shapes to allow for insertion and combination of the conductor rods with the electrode plates without mutual interference.

Figure 117:
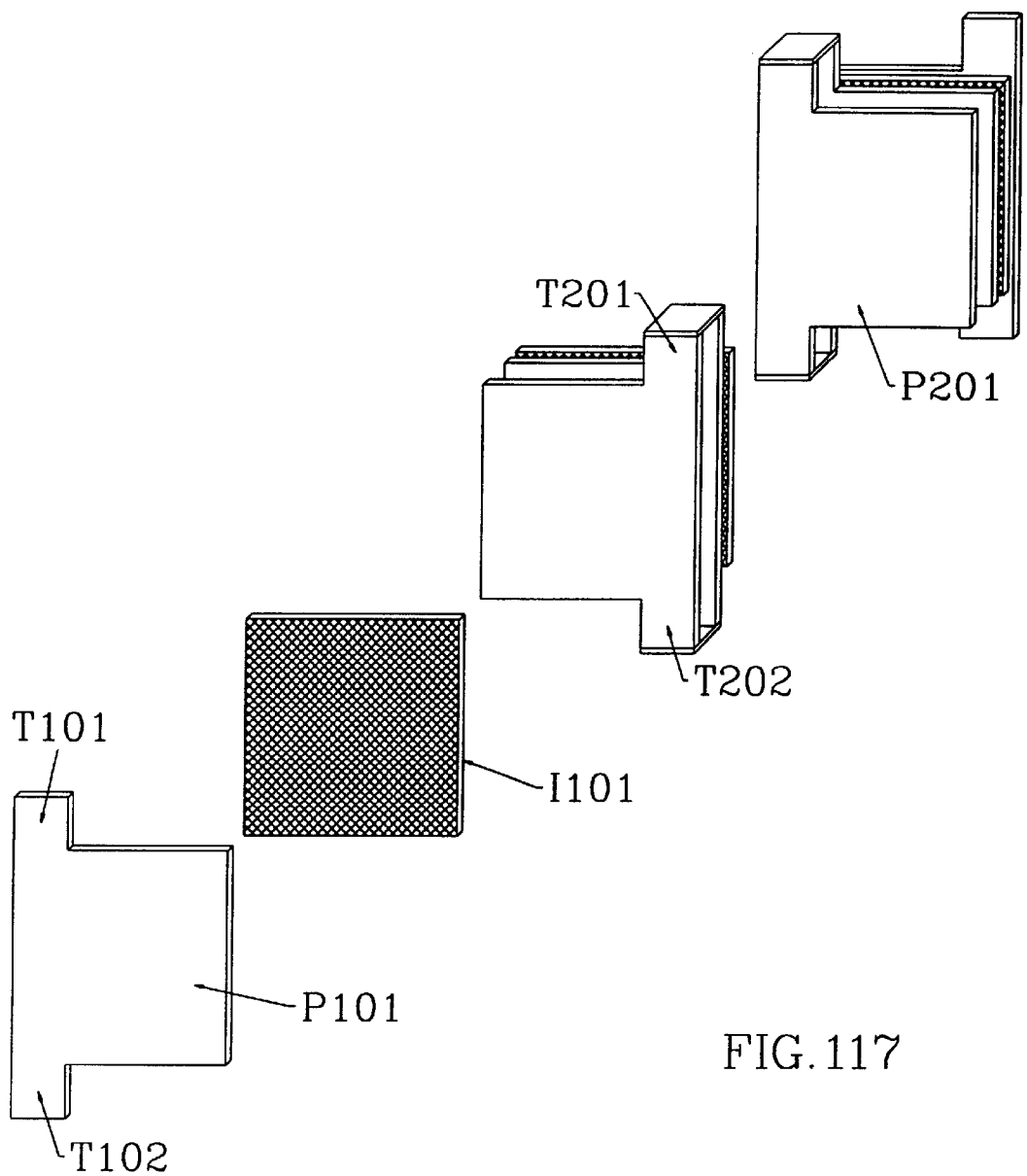
FIG. 117 is an exploded isometric view of an embodiment of the invention in which two sides of the electrode plate are respectively installed with a current collecting terminal at the same ends.
Figure 118:
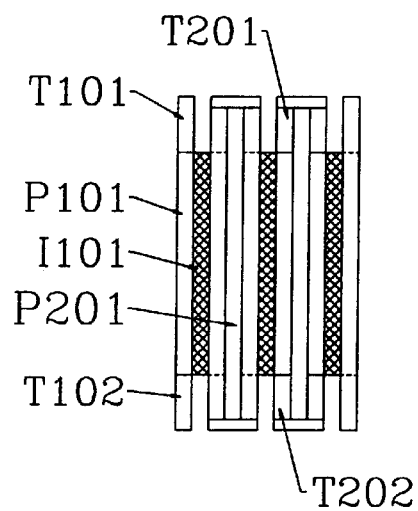
FIG. 118 is a side view of the embodiment of FIG. 117.

H. As illustrated in FIGS. 117 and 118, two sides of the positive electrode plates P101 of the electricity storage are respectively installed with individual current collecting terminals T101, T102 at the same end, thereby to appear as a structural embodiment of one electrode plate with two current collecting terminals, while two sides of the negative electrode plates P201 are respectively installed with individual current collecting terminal T201, T202 at the same end to appear as a structural embodiment of one electrode plate with two current collecting terminals. The aforesaid electrode plates are comprised of positive electrode plates P101 and negative electrode plates P201 and the positive and negative electrode plates are cross laminated, or the multiple cross laminated plates are arranged in a row structure in a lateral direction for series or parallel combinations, and an isolator plate I101 is installed between each two neighboring electrode plates of different polarity. The two aforesaid current collecting terminals are combined with the current collecting terminals of the electrode plates having the same polarity for current collection in parallel combination, or the two current collecting terminals are respectively series combined with the neighboring electrode plates having different polarities to form two current circuits.

Figure 119:
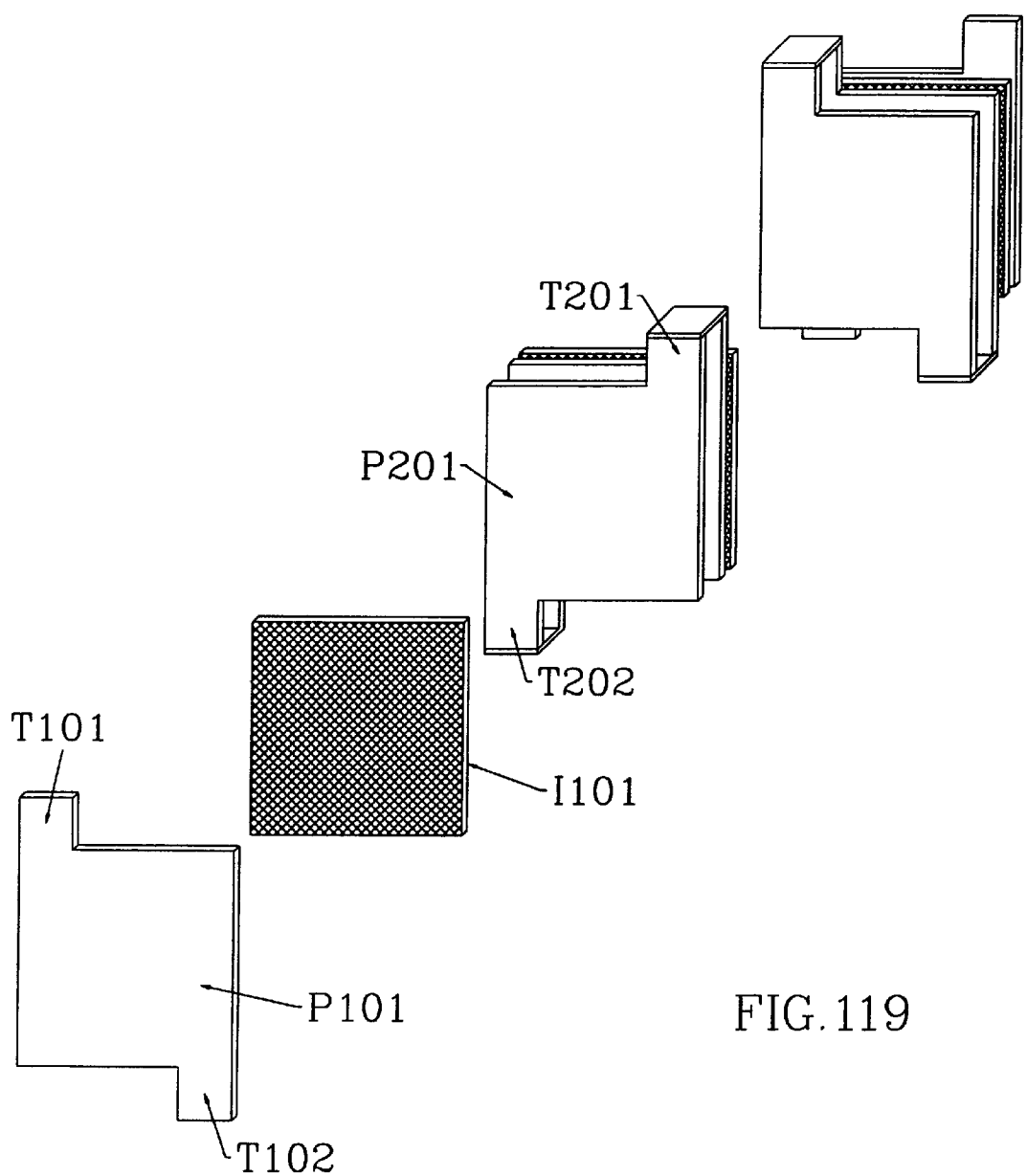
FIG. 119 is an exploded isometric view of an embodiment of the invention in which two sides of the electrode plate are respectively installed with a current collecting terminal at different ends.
Figure 120:
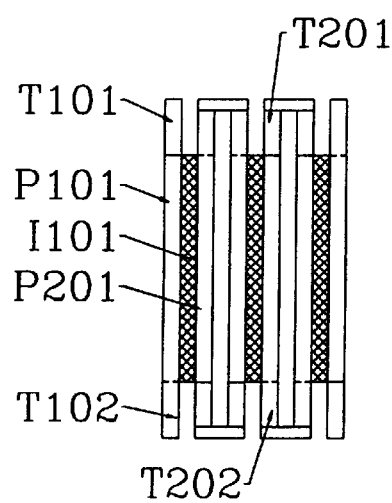

2) As illustrated in FIGS. 119 and 120, two sides of the positive electrode plates P101 of the electricity storage are respectively installed with individual current collecting terminals T101, T102 at different ends, and two sides of the negative electrode plates P201 are respectively installed with individual current collecting terminals T201, T202 at different ends. The positive and negative electrode plates are cross laminated, or multiple cross laminated plates are arranged in a row structure in a lateral direction for series or parallel combinations, and an isolator plate I101 is installed between each two neighboring electrode plates having different polarities. The two aforesaid current collecting terminals are combined with the current collecting terminals of the electrode plates having the same polarity for current collection in parallel combination, or the two current collecting terminals are respectively series combined with the neighboring electrode plates having different polarities to form two current circuits.

Figure 121:
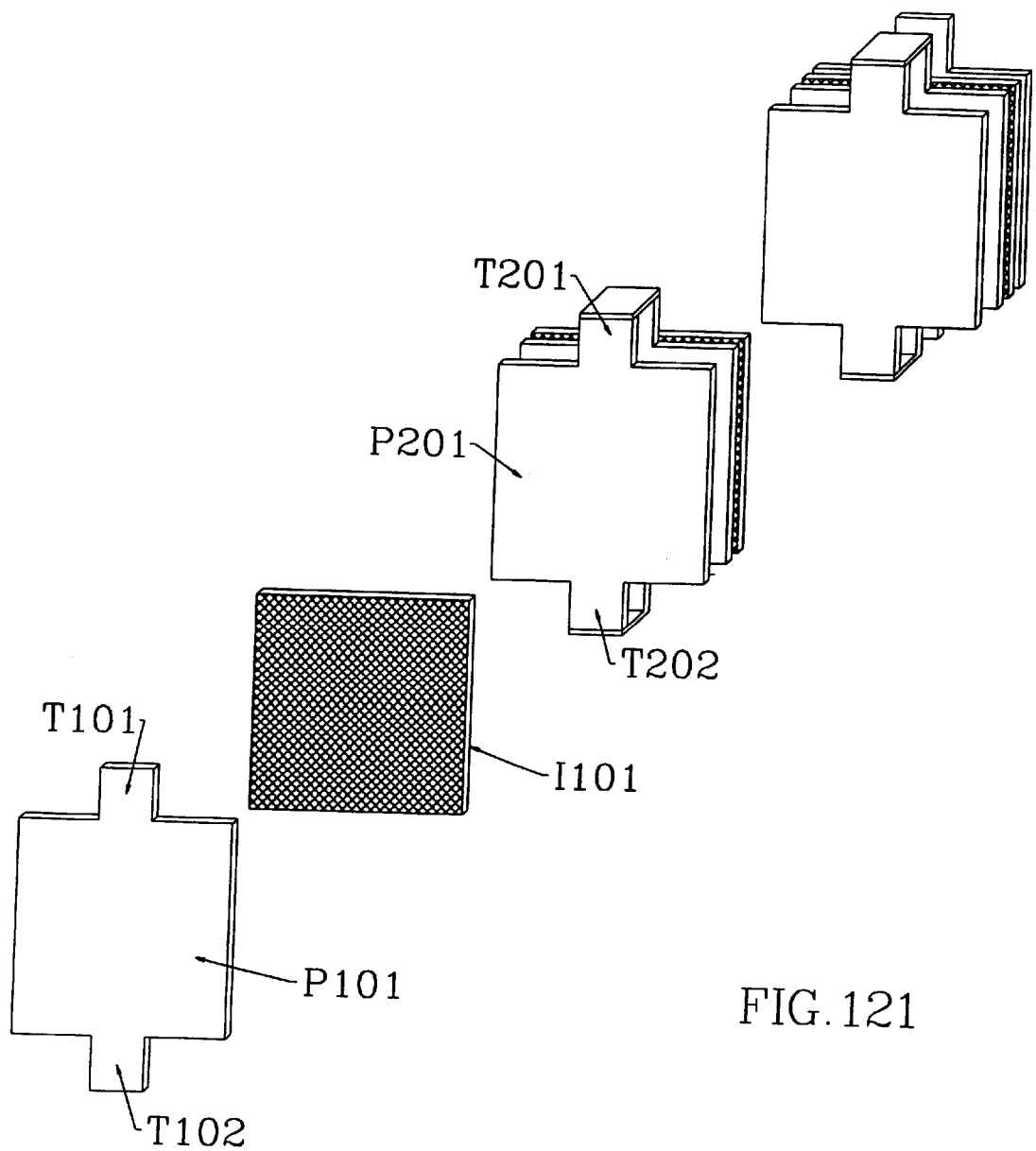
Figure 122:
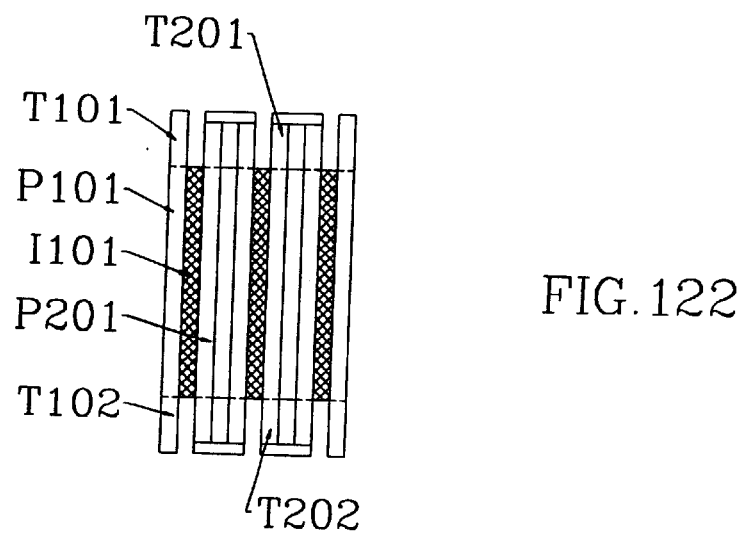

3) As illustrated in FIGS. 121 and 122, two sides of the positive electrode plates P101 of the electricity storage are respectively installed with individual current collecting terminals T101, T102 near to the middle, while two sides of the negative electrode plates P201 are respectively installed with individual current collecting terminals T201, T202 near to the middle. The positive and negative electrode plates are cross laminated, or multiple cross laminated plates are arranged in a row structure in a lateral direction for series or parallel combination, and an isolator plate I101 is installed between two neighboring electrode plates of different polarity. The two aforesaid current collecting terminals are combined with current collecting terminals of the electrode plates having the same polarities for current collection in parallel, or the two current collecting terminals are respectively series combined with neighboring electrode plates having different polarities to form two current circuits.

Figures 123, 124:
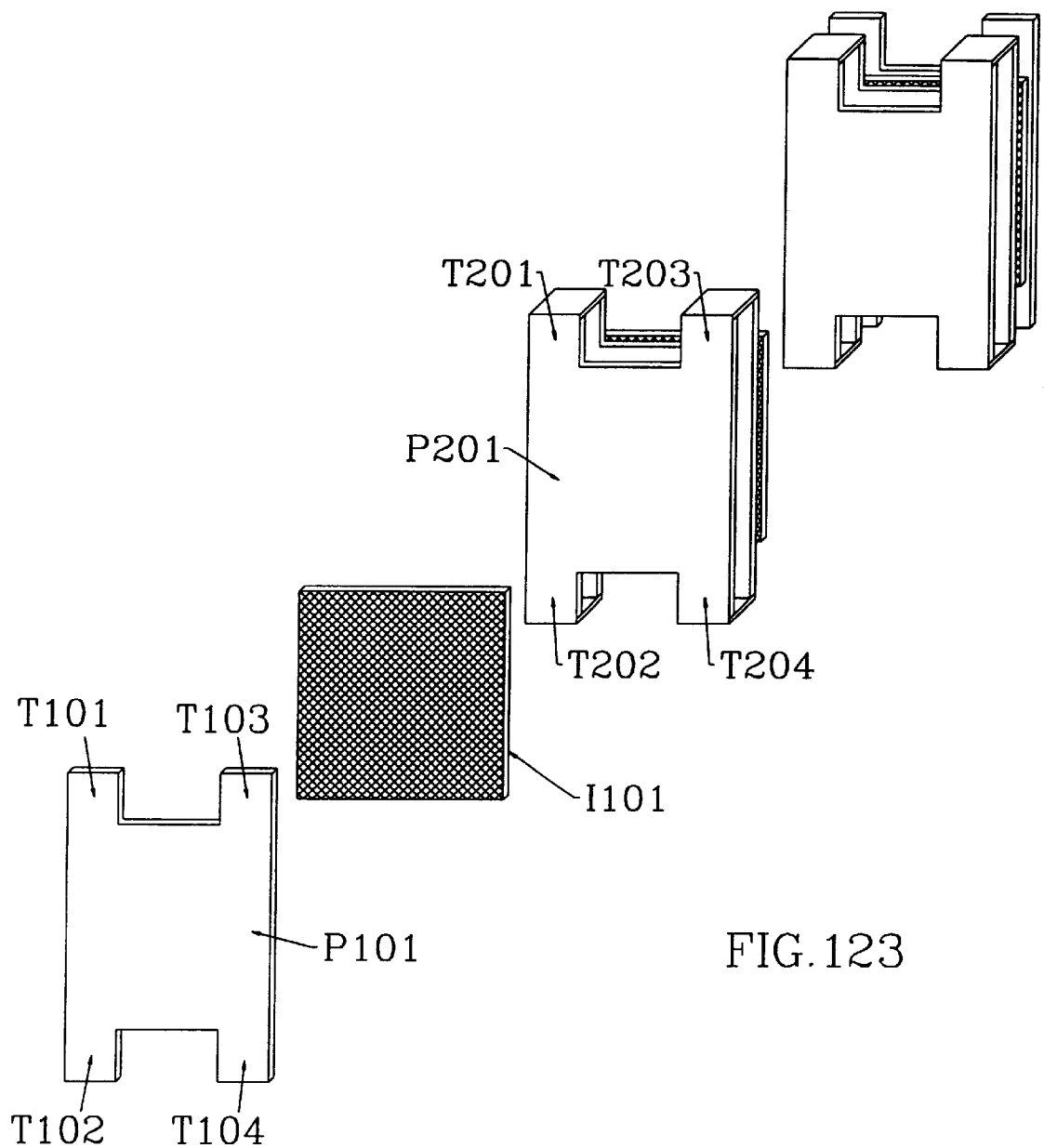

4) As illustrated in FIGS. 123 and 124, two sides of the positive electrode plates P101 of the electricity storage are respectively installed with two current collecting terminals T101, T102, T103, T104 near to both ends of the two sides, while two sides of the negative electrode plates P201 also are respectively installed with two current collecting terminals T201, T202, T203, T204 near to both ends of the two sides, i.e., each electrode plate individually has four current collecting terminals. The positive and negative electrode plates are cross laminated, or multiple cross laminated plates are arranged in a row structure in a lateral direction for series or parallel combination, and an isolator plate I101 is installed between two neighboring electrode plates of different polarity. The two aforesaid current collecting terminals are combined with the current collecting terminals of the electrode plates having the same polarities for current collection in parallel, or the four current collecting terminals are respectively series combined with neighboring electrode plates having different polarities to form four current circuits.

Figure 125:
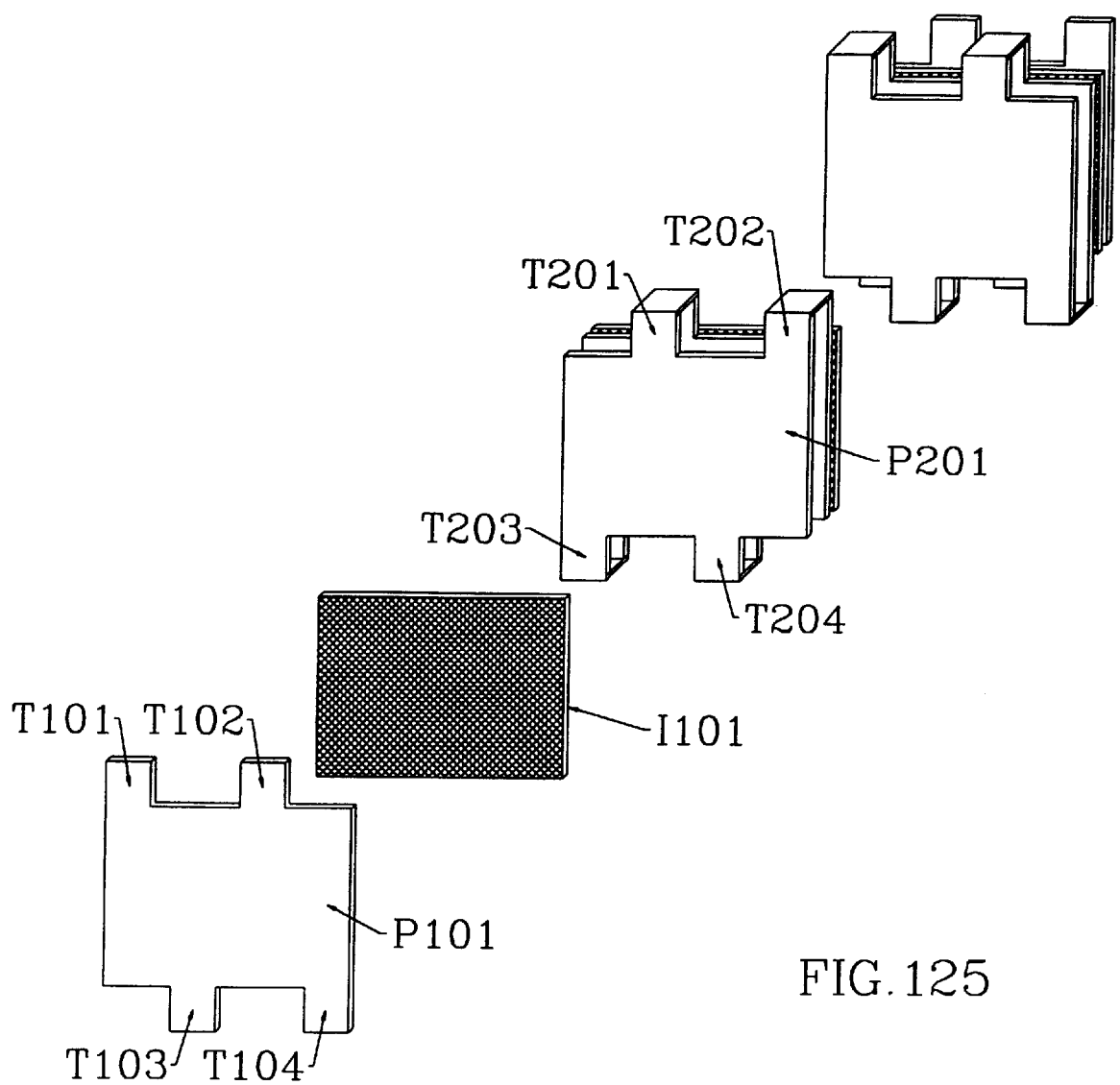
Figure 126:
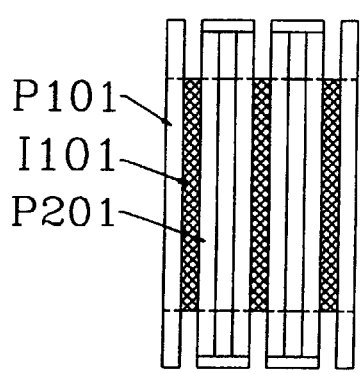

5) As illustrated in FIGS. 125 and 126, two sides of the positive electrode plates P101 of the electricity storage are respectively cross installed with two current collecting terminals T101, T102, T103, T104, while two sides of the negative electrode plates P201 are respectively cross installed with two current collecting terminals T201, T202, T203, T204, i.e., each electrode plate individually has four current collecting terminals. The positive and negative electrode plates are cross laminated, or multiple cross laminated plates are arranged in a row structure in a lateral direction for series or parallel combination, and an isolator plate I101 is installed between each two neighboring electrode plates of different polarity. The two aforesaid current collecting terminals are combined with the current collecting terminals of electrode plates having the same polarities for current collection in parallel, or the four current collecting terminals are respectively series combined with neighboring electrode plates having different polarities to form four current circuits.

Figure 127:
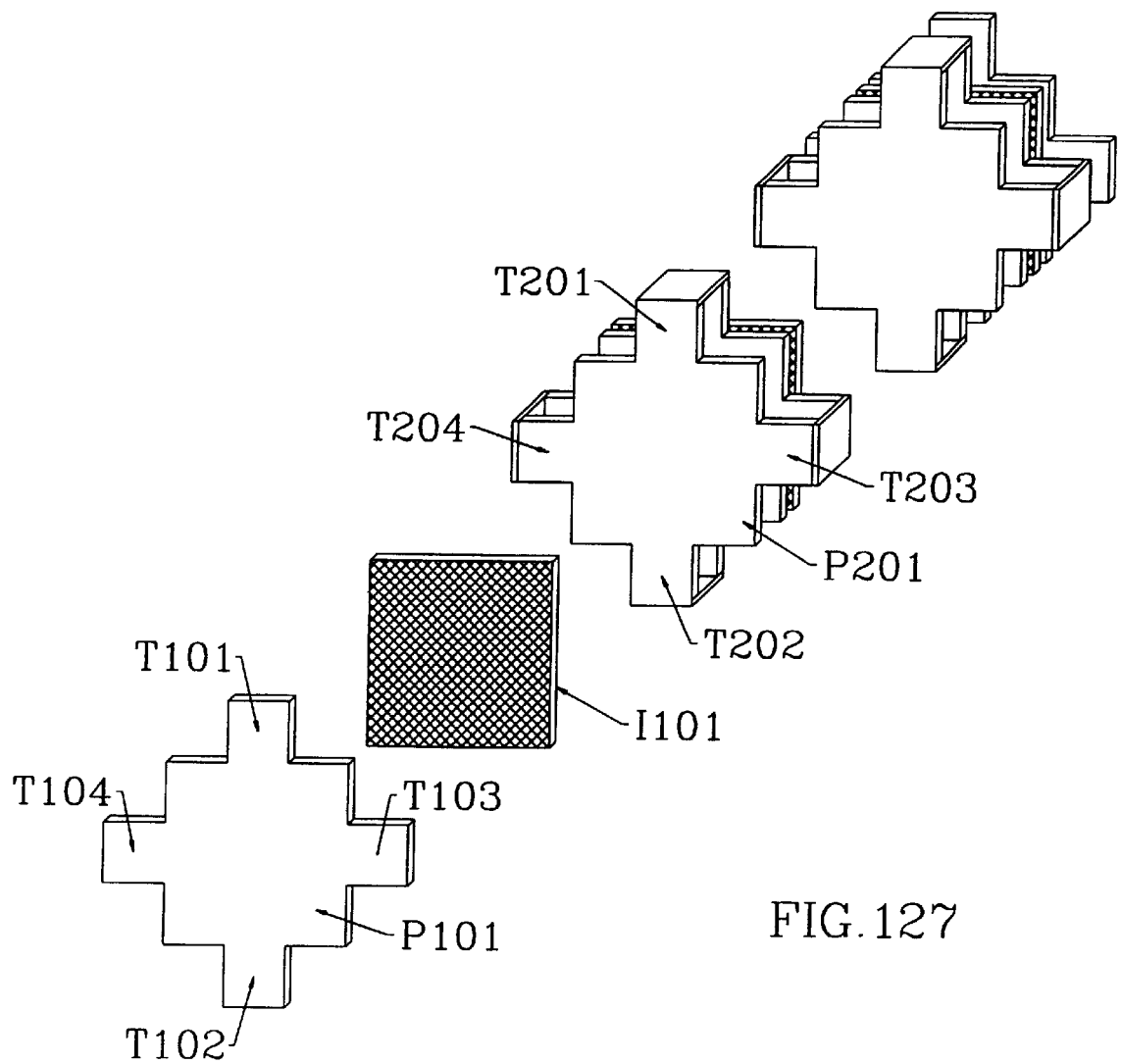
Figure 128:
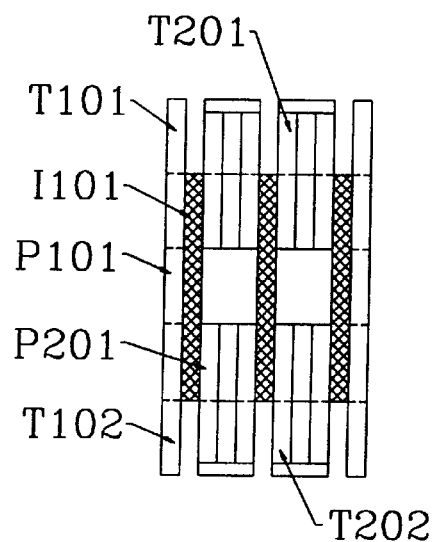

6) As illustrated in FIGS. 127 and 128, four sides of the positive electrode plates P101 of the electricity storage are respectively cross installed with current collecting terminals T101, T102, T103, T104 at the middle of one side, while four sides of the negative electrode plates P201 are respectively cross installed with current collecting terminals T201, T202, T203, T204 at the middle of one side, i.e., each electrode plate individually has four current collecting terminals. The positive and negative electrode plates are cross laminated, or multiple cross laminated plates are arranged in a row structure in a lateral direction for series or parallel combination, and an isolator plate I101 is installed between two neighboring electrode plates of different polarity. The two aforesaid current collecting terminals are combined with current collecting terminals of the electrode plates having the same polarities for current collection in parallel, or the four current collecting terminals are respectively series combined with neighboring electrode plates having different polarities to form four current circuits.

The range of applications for the above-described design is not limited to the realistic examples given in FIGS. 117–128, or to practical applications using quadrilateral or quasi-quadrilateral electrode plates. For example, current collecting terminals can be installed on two sides or four sides, or the current collecting terminals also can be installed only on three sides. In addition to the quadrilateral shape, the geometric shape of the electrode plate can be constituted by circular or quasi-circular shapes, elliptical or quasi-elliptical shapes, and three sided or more than three sided configurations (including triangles, quadrilaterals, pentagons, hexagons, heptagons, octagons or polygons with more than eight sides), so long as each electrode plate is installed with two or more current collecting terminals to allow the electrode plate to be provided with two or more current circuits.

In summary, it will be noted that, in addition to the individual characteristics of the embodiments illustrated in FIGS. 1–128, each shares the following common characteristics:

The aforesaid positive and negative electrode plates include circular or quasi-circular, elliptical or quasi-elliptical, and three sided or more than three sided (including triangles, quadrilaterals, pentagons, hexagons, heptagons, octagons or polygons with more than eight sides) electrode plates having a low internal resistance current collecting structure in which (1) two or more sides of the electrode plates are respectively installed with one or more outwardly extending current collecting terminals; (2) one or more conductor through-holes are individually provided in the selected areas of two or more sides, or near to the central region of the positive or negative electrode plates, (3) selected areas of the two or more sides or central region of the aforesaid positive or negative electrode plates are respectively provided with one or more isolating spaces, notches or through-holes having a size larger than some of the conductor rods to be inserted so that the conductor rods do not make contact after the electrode plates are cross laminated, thereby permitting the electrode plates to have two or more input or output current circuits, thus lowering the internal resistance of the electricity storage device.

For the electricity storage/discharge device of the invention to be applied in non-polarized electricity storage and discharge devices (such as capacitors), the aforesaid positive and negative electrode plates may be replaced by a pole-less primary side electrode plate and a secondary side electrode plate.

Figure 129:
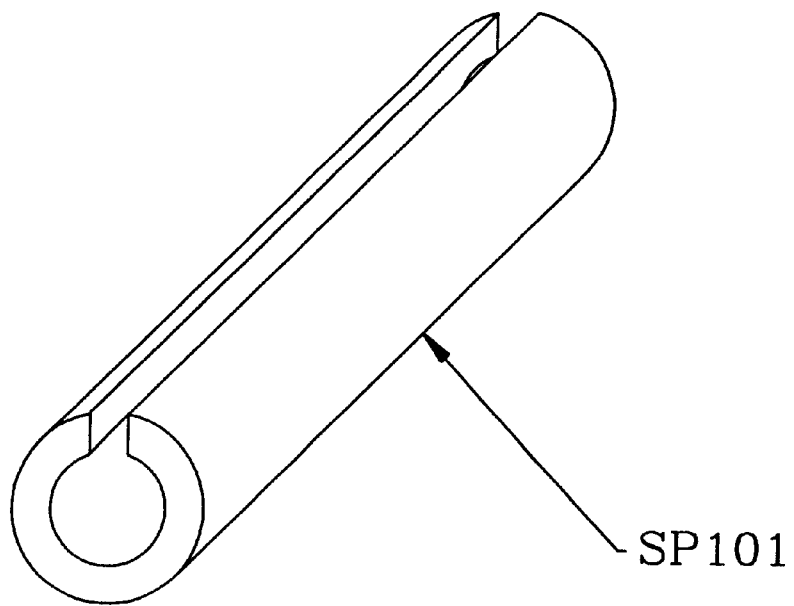

The conductor rods are inserted through and joined with the conductor through-holes on the electrode plates so that the conductor rods and electrode plates form a good electrical connection, the conductor rods being made up of solid or hollow tube shape conductor rods having circular, square, or other geometric shapes, or that are in the form of a non-closed elastic hollow tube conducting structure with an axial opening clearance, as shown in FIG. 129.

Two ends of the conductor rods in the aforesaid structure can be further respectively installed with protruding bonnets, screws, nuts, unidirectional press washers, or insulator pressing plates, etc., for press fitting with the electrode plate to improve mechanical stability.

The conductor rods in the aforesaid structure are arranged to be inserted through the electrode plates of the same polarity to provide parallel combined current collection, or to be inserted through the conductor through-holes of different polarities to provide series combined functions, or the conduction rods may be inserted through electrodes having the same polarity and electrodes of different polarities to provide parallel and series combination functions.

For conductor rods having a hollow tube structure, the gaseous or liquid fluid pump and cooling radiators (or a heating device) can be further installed to pump the gaseous or liquid fluid through the tubular shape conductor rod for regulating the cooling or heating temperatures.

For conductor rods having current collecting structure, if the previously-mentioned temperature regulating fluid is an insulating fluid, then the tubular conductor rod on electrodes at the same voltage level can be directly presented in series combined or parallel combined current circuit structures.

For conductor rods to be used for parallel combined current collection or series combination functions, the conductor rods at different voltage levels can be series combined or parallel combined by the insulation conduits to introduce temperature cooling or heat modulating insulation gaseous or liquid state fluids.

Figure 130:
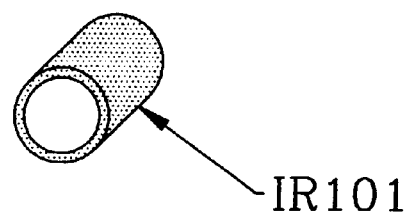

Insulation ring shape or tubular shape insulators can be inserted between the conductor rods and the conductor through-holes as shown in FIG. 130 to ensure the insulation and to further improve the structural stability between the electrode plates.

Insulation blocks can be installed between the conductor rods and electrode plate isolator notches through which the conductor rods pass to ensure insulation and to further improve the structure stability between the electrode plates.

Space settling blocks can be installed between the conductor rod and corresponding electrode plate insulating spaces to further improve the structural stability between the electrode plates.

The two or more than two individual externally extending current collecting terminals are installed on the two or more sides of individual electrode plates for multiple circuits parallel combination of electrode plates having the same polarities, or series combination of electrode plates having different polarities, thereby permitting each electrode plate in the electricity storage and discharge device to have two or more circuits during the current input or output, reducing the internal resistance of the electricity storage and discharge device.

The isolator body may be in the form of isolator plates or films (or isolator sheets) installed in layers between electrode plates of different polarities; if the isolator body is an inserted structure, it can be inserted on the positive and negative electrode plates simultaneously, or inserted on the electrode plates of either polarity.

The casing may be used as a container to accommodate the electricity storage and discharge device as well as for electrode plate protection, and may therefore be constituted by insulation material or non-insulation material. If it is made of non-insulation material, insulation shall be additionally provided between the inside casing and the internal electrodes.

As described in the previous sections, the low internal resistance current collector structure of the invention is an innovative design, wherein the solid or hollow tube shape conductor rods are inserted through electrode plates having the same polarity for parallel combination or electrode plates having different polarities for series combination, or a mixture of parallel and series combinations. In addition, the two or more individual outwardly extending current collecting terminals may be installed on two or more sides of the individual electrode plates for multiple circuit parallel combination between electrode plates having the same polarity or series combination between electrode plates having different polarities, thereby reducing the internal resistance within the electricity storage device. The collecting structure of the electricity storage device thus not only is innovative, but also represents a practical improvement on the electrode plate current collecting structure of conventional electricity storage devices.

What is claimed is:

1. An electricity storage/discharge device, comprising:
a first pair of electrode plates including a first electrode plate and a second electrode plate, the first electrode plate including at least two first current collecting terminals respectively extending outwardly from opposite sides of said first electrode plate, and the second of said electrode plates including at least two second current collecting terminals respectively extending outwardly from opposite sides of said second electrode plate;

a first isolator member positioned between the first electrode plate and the second electrode plate of said first pair of electrode plates to form a first storage/discharge cell;

a third electrode plate including at least two third current collecting terminals extending outwardly from opposite sides of said third electrode plate;

a fourth electrode plate including at least two fourth current collecting terminals extending outwardly from opposite sides of said fourth electrode plate; and a second isolator member positioned between said third electrode plate and said fourth electrode plate to form a second storage/discharge cell, wherein said second and third current collecting terminals are electrically connected to each other to form a series connection between said first and second storage/discharge cells, and wherein at least two of said first current collecting terminals and at least two of said fourth current collecting terminals are arranged as input/output terminals for said series-connected first and second storage/discharge cells.

2. An electricity storage/discharge device as claimed in claim 1, wherein at least two of said current collecting terminals are situated at corners of said electrode plates.

3. An electricity storage/discharge device as claimed in claim 1, wherein said first and second storage/discharge cells are electrically connected by plate-shaped conductors.

4. An electricity storage/discharge device as claimed in claim 1, further comprising at least a fifth electrode plate including outwardly extending fifth current collecting terminals, a sixth electrode plate including outwardly extending sixth current collecting terminals, and a third isolator member positioned between said fifth and sixth electrode plated to form at least one additional storage/dishcarge cell, said fourth and fifth current collecting terminals being electrically connected to each other to form a series connection between said second and third storage discharge cells.

5. An electricity storage/discharge device as claimed in claim 4, wherein said first and second storage/discharge cells, and wherein said second and third storage discharge cells, are electrically connected by plate-shaped conductors.

6. An electricity storage/discharge device, comprising:

a first pair of electrode plates including a first electrode plate and a second electrode plate, the first electrode plate including at least two first current collecting terminals respectively extending outwardly from opposite sides of said first electrode plate, and the second of said electrode plates including at least two second current collecting terminals respectively extending outwardly from opposite sides of said second electrode plate; and a first isolator member positioned between the first electrode plate and the second electrode plate of said first pair of electrode plates to form a first storage/discharge cell.

7. A electricity storage/discharge device as claimed in claim 1 or 6, comprising at least one additional storage/discharge cell connected in series with said first storage/discharge cell by at least two current collecting terminals extending outwardly on opposite sides of a plate of said additional storage/discharge cell, said plate of said additional storage/discharge cell having a polarity that is opposite to a polarity of the plate of the first storage/discharge cell to which the plate of the additional storage/discharge cell is connected, wherein said at least two current collecting terminals extending outwardly on opposite sides of the plate of the said additional storage/discharge cell being further connected to a charging power supply or to a load to thereby serve as input/output terminals for said first and additional storage cells.

8. An electricity storage/discharge device as claimed in claim 6, comprising at least one additional storage/discharge cell connected in parallel with said first storage/discharge cell by at least two current collecting terminals extending outwardly on opposite sides of a plate of said additional storage/discharge cell, said plate of said additional storage/discharge cell having a same polarity as the plate of the first storage/discharge cell to which the plate of the additional storage/discharge cell is connected.

9. An electricity storage/discharge device as claimed in claim 1 or 6, further comprising at least one additional current collecting terminal on each said side of each of said plates, whereby each of said current collecting terminals on each of said plates serves as an input/output terminal for its respective plate.

10. An electricity storage device as claimed in claims 1 or 6, further comprising at least one additional current collecting terminal on at least one additional side of each said plate.

11. An electricity storage/discharge device as claimed in claim 1 or 8, wherein said first and additional storage discharge cells are electrically connected by plate-shaped conductors extending between current collecting terminals of each of said cells.

* * * * *